US012812570B2

(12) United States Patent
Ghanbarinejad et al.

(10) Patent No.: US 12,812,570 B2
(45) Date of Patent: Nov. 24, 2026

(54) TIMING ALIGNMENT IN INTEGRATED ACCESS AND BACKHAUL

(71) Applicant: Lenovo (Singapore) Pte. Ltd., New Tech Park (SG)

(72) Inventors: Majid Ghanbarinejad, Chicago, IL (US); Hyejung Jung, Northbrook, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 471 days.

(21) Appl. No.: 17/999,481

(22) PCT Filed: May 19, 2021

(86) PCT No.: PCT/IB2021/054288
§ 371 (c)(1),
(2) Date: Nov. 21, 2022

(87) PCT Pub. No.: WO2021/234581
PCT Pub. Date: Nov. 25, 2021

(65) Prior Publication Data
US 2023/0309032 A1 Sep. 28, 2023

Related U.S. Application Data

(60) Provisional application No. 63/027,257, filed on May 19, 2020.

(51) Int. Cl.
*H04W 56/00* (2009.01)

(52) U.S. Cl.
CPC ....... *H04W 56/001* (2013.01); *H04W 56/005* (2013.01)

(58) Field of Classification Search
CPC ............ H04W 56/001; H04W 56/005; H04W 56/0045
See application file for complete search history.

(56) References Cited

U.S. PATENT DOCUMENTS

2020/0059879 A1 2/2020 Nam et al.
2020/0145952 A1 * 5/2020 Keskitalo ............ H04W 56/007
(Continued)

OTHER PUBLICATIONS

PCT/IB2021/054288, "Notification of Transmittal of the International Search Report and the Written Opinion of the International Searching Authority", International Searching Authority, Sep. 15, 2021, pp. 1-18.
(Continued)

*Primary Examiner* — Thomas R Cairns
*Assistant Examiner* — Raenita Ann Fenner
(74) *Attorney, Agent, or Firm* — Kunzler Needham Hilton

(57) ABSTRACT

Apparatuses, methods, and systems are disclosed for timing alignment in integrated access and backhaul. A method includes obtaining, for an integrated access backhaul ("IAB") node of a wireless communication network, a first uplink transmission time, a downlink transmission time, and a second uplink transmission time. The method includes determining a timing alignment mode for the IAB node. The method includes transmitting an uplink signal from the IAB node according to one of the first uplink transmission time, the downlink transmission time, and the second uplink transmission time based on the timing alignment mode for the IAB node.

20 Claims, 29 Drawing Sheets

(56) References Cited

U.S. PATENT DOCUMENTS

| | | | | |
|---|---|---|---|---|
| 2021/0084606 | A1* | 3/2021 | Abedini | H04W 80/02 |
| 2023/0276389 | A1* | 8/2023 | Ko | H04W 72/04 370/350 |

OTHER PUBLICATIONS

OPPO, "Discussion of backhaul link enhancement for IAB", 3GPP TSG RAN WG1 Meeting #93 R1-1806859, May 21-25, 2018, pp. 1-5.
Ericsson, "Physical-layer aspects related to IAB", 3GPP TSG-RAN WG1 Meeting #93 R1-1807221, May 21-25, 2018, pp. 1-3.
CMCC, "Discussions on enhancements to support NR Backhaul links", 3GPP TSG RAN WG1 Meeting #94 R1-1808836, Aug. 20-24, 2018, pp. 1-9.
Huawei et al., "Physical layer design for NR IAB", 3GPP TSG RAN WG1 Meeting #94bis R1-1810130, Oct. 8-12, 2018, pp. 1-18.
Nokia et al., "NR enhancements to support IAB", 3GPP TSG RAN WG1 Meeting #94-bis R1-1810673, Oct. 8-12, 2018, pp. 1-6.
ZTE et al., "Discussion on physical layer enhancements for NR IAB", 3GPP TSG RAN WG1 Meeting #94bis R1-1811160, Oct. 8-12, 2018, pp. 1-10.
Asustek, "Discussion on Timing Alignment for IAB nodes", 3GPP TSG RAN WG1 Meeting #94bis R1-1811166, Oct. 8-12, 2018, pp. 1-3.
LG Electronics, "Discussions on mechanisms to support NR IAB scenarios", 3GPP TSG RAN WG1 Meeting #95 R1-1812564, Nov. 12-16, 2018, pp. 1-5.
Nokia et al., "IAB Case #1 timing", 3GPP TSG RAN WG1#96 R1-1902434, Feb. 25-Mar. 1, 2019, pp. 1-3.
Intel Corp., "Mechanisms to Support the Case #1 OTA Timing Alignment", 3GPP TSG RAN WG1 #98-Bis R1-1910647, Oct. 14-20, 2019, pp. 1-4.
Nokia et al., "Open items with IAB Case #1 timing", 3GPP TSG RAN WG1#98bis R1-1911195, Oct. 14-20, 2019, pp. 1-5.
Qualcomm, "New WID on Enhancements to Integrated Access and Backhaul", 3GPP TSG RAN Meeting #86 RP-193251, Dec. 9-12, 2019, pp. 1-5.
3GPP, "3rd Generation Partnership Project; Technical Specification Group Radio Access Network; NR; Requirements for support of radio resource management (Release 16)", 3GPP TS 38.133 V16.3.0, Mar. 2020, pp. 1-1169.
3GPP, "3rd Generation Partnership Project; Technical Specification Group Radio Access Network; NR; Physical channels and modulation (Release 16)", 3GPP TS 38.211 V16.1.0, Mar. 2020, pp. 1-130.
3GPP, "3rd Generation Partnership Project; Technical Specification Group Radio Access Network; NR; Physical layer procedures for control (Release 16)", 3GPP TS 38.213 V16.1.0, Mar. 2020, pp. 1-156.
3GPP, "3rd Generation Partnership Project; Technical Specification Group Radio Access Network; NR; Physical layer procedures for data (Release 16)", 3GPP TS 38.214 V16.1.0, Mar. 2020, pp. 1-151.
3GPP, "3rd Generation Partnership Project; Technical Specification Group Radio Access Network; NR; Physical layer measurements (Release 16)", 3GPP TS 38.215 V16.1.0, Mar. 2020, pp. 1-22.
3GPP, "3rd Generation Partnership Project; Technical Specification Group Radio Access Network; NR; Medium Access Control (MAC) protocol specification (Release 16)", 3GPP TS 38.321 V16.0.0, Mar. 2020, pp. 1-141.
3GPP, "3rd Generation Partnership Project; Technical Specification Group Radio Access Network; NR; Study on Integrated Access and Backhaul; (Release 16)", 3GPP TR 38.874 V16.0.0, Dec. 2018, pp. 1-111.

* cited by examiner

TIMING ALIGNMENT IN INTEGRATED ACCESS AND BACKHAUL

CROSS-REFERENCES TO RELATED APPLICATIONS

This application claims priority to U.S. Provisional Patent Application No. 63/027,257 entitled "APPARATUSES, METHODS, AND SYSTEMS FOR TIMING ALIGNMENT IN INTEGRATED ACCESS AND BACKHAUL" and filed on May 19, 2020, for Majid Ghanbarinejad, which is incorporated herein by reference.

FIELD

The subject matter disclosed herein relates generally to wireless communications and more particularly relates to timing alignment in integrated access and backhaul.

BACKGROUND

In certain wireless communication systems, a User Equipment device ("UE") is able to connect with a fifth-generation ("5G") core network (i.e., "5GC") in a Public Land Mobile Network ("PLMN") In wireless networks, timing errors in integrated access and backhaul may exist.

BRIEF SUMMARY

Disclosed are procedures for timing alignment in integrated access and backhaul. Said procedures may be implemented by apparatus, systems, methods, and/or computer program products. In this disclosure, methods for transmit and receive timing alignment in IAB systems are proposed. Several embodiments for configuration and signaling are provided for each case of transmit and receive alignment at an IAB node. The methods can be extended to a unified framework and signaling where different timing alignment methods can be configured, based on the nodes' capabilities, and applied locally based on scheduling needs.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
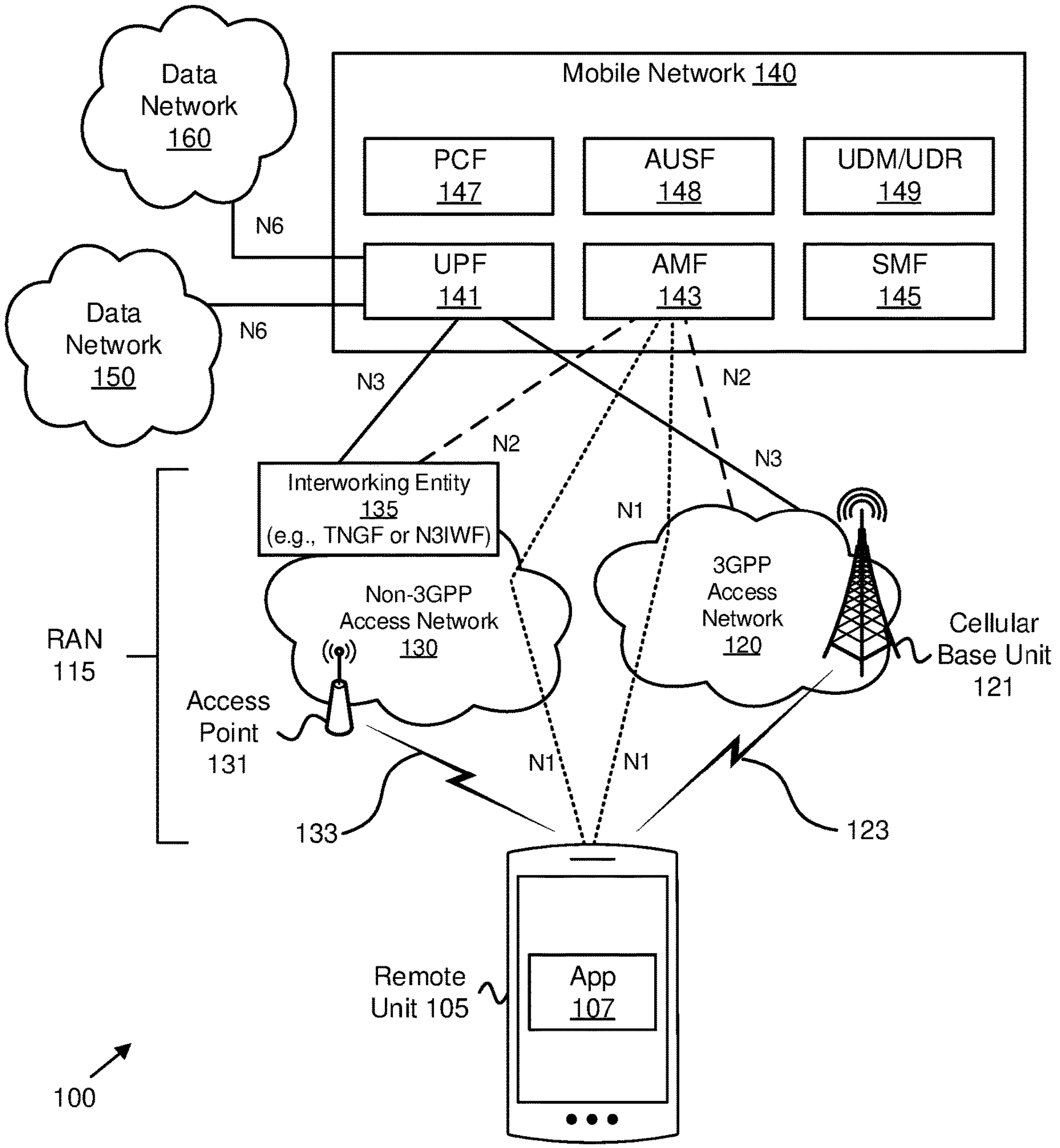
FIG. 1 is a schematic block diagram illustrating one embodiment of a wireless communication system for timing alignment in integrated access and backhaul.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred to hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to emphasize their implementation independence more particularly. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together but may include disparate instructions stored in different locations which, when joined logically together, include the module, and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for timing alignment in integrated access and backhaul. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Integrated access and backhaul ("IAB") was specified for new radio access technology ("NR") Release 16 ("Rel-16"). The IAB technology aims at increasing deployment flexibility and reducing 5G rollout costs. It allows service providers to reduce cell planning and spectrum planning efforts while utilizing the wireless backhaul technology.

Although the IAB specification in Rel-16 is not limited to a specific multiplexing and duplexing scheme, the focus is on time-division multiplexing ("TDM") between upstream communications (with a parent IAB node/donor) and downstream communications (with a child IAB node or a UE).

It was approved in RAN #86 to enhance duplexing for Rel-17 to support simultaneous operations (transmissions and/or receptions) in downstream and upstream by an IAB node. The duplexing enhancements should allow the IAB node to communicate with a parent node and a child node simultaneously, which require timing alignment enhancements beyond what was specified in Rel-16, known as timing alignment Case-1, which only aligns downlink transmission times at the slot level.

A more elaborate problem statement will be presented after the background section. Then, systems and methods for timing alignment for enhanced duplexing in IAB systems are proposed. The disclosure is in line with the following objectives approved for the WI in Release 17 [RP-193251] (emphasis added):

Duplexing enhancements [RAN1-led, RAN2, RAN3, RAN4]:

a. Specification of enhancements to the resource multiplexing between child and parent links of an IAB node, including:
   i. Support of simultaneous operation (transmission and/or reception) of IAB-node's child and parent links (i.e., mobile terminal ("MT") transmission ("Tx")/distributed terminal ("DU") Tx, MT Tx/DU reception ("Rx"), MT Rx/DU Tx, MT Rx/DU Rx).
   ii. Support for dual-connectivity scenarios defined by RAN2/RAN3 in the context of topology redundancy for improved robustness and load balancing.
b. Specification of IAB-node timing mode(s), extensions for DL/UL power control, and CLI and interference measurements of BH links, as needed, to support simultaneous operation (transmission and/or reception) by IAB-node's child and parent links.

In this disclosure, methods for Tx and Rx timing alignment in IAB systems are proposed. Several embodiments for configuration and signaling are provided for each of the two cases of Tx and Rx alignment at an IAB node, which are the main candidates for IAB timing alignment for duplexing enhancements in Rel-17. The methods can be extended to a unified framework and signaling where different timing alignment methods can be configured, based on the nodes' capabilities, and applied locally based on scheduling needs.

FIG. 1 depicts a wireless communication system 100 for timing alignment in integrated access and backhaul, according to embodiments of the disclosure. In one embodiment, the wireless communication system 100 includes at least one remote unit 105, a Fifth-Generation Radio Access Network ("5G-RAN") 115, and a mobile core network 140. The 5G-RAN 115 and the mobile core network 140 form a mobile communication network. The 5G-RAN 115 may be composed of a 3GPP access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the Third Generation Partnership Project ("3GPP") specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, an IAB donor, an IAB node, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (i.e., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the AMF 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N31WF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF ("UPF") 141. The mobile core network 140 also includes multiple control plane functions including, but not limited to, an Access and Mobility Management Function ("AMF") 143 that serves the 5G-RAN 115, a Session Management Function ("SMF") 145, a Policy Control Function ("PCF") 146, an Authentication Server Function ("AUSF") 147, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 146 is responsible for unified policy framework, providing policy rules to CP functions, access subscription information for policy decisions in UDR. The AUSF 147 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as an MME, S-GW, P-GW, HSS, and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfoxx, and the like. For example, in an 4G/LTE variant involving an EPC, the AMF 143 may be mapped to an MME, the SMF mapped to a control plane portion of a PGW and/or to an MME, the UPF 141 may be mapped to an SGW and a user plane portion of the PGW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

Figure 2A:
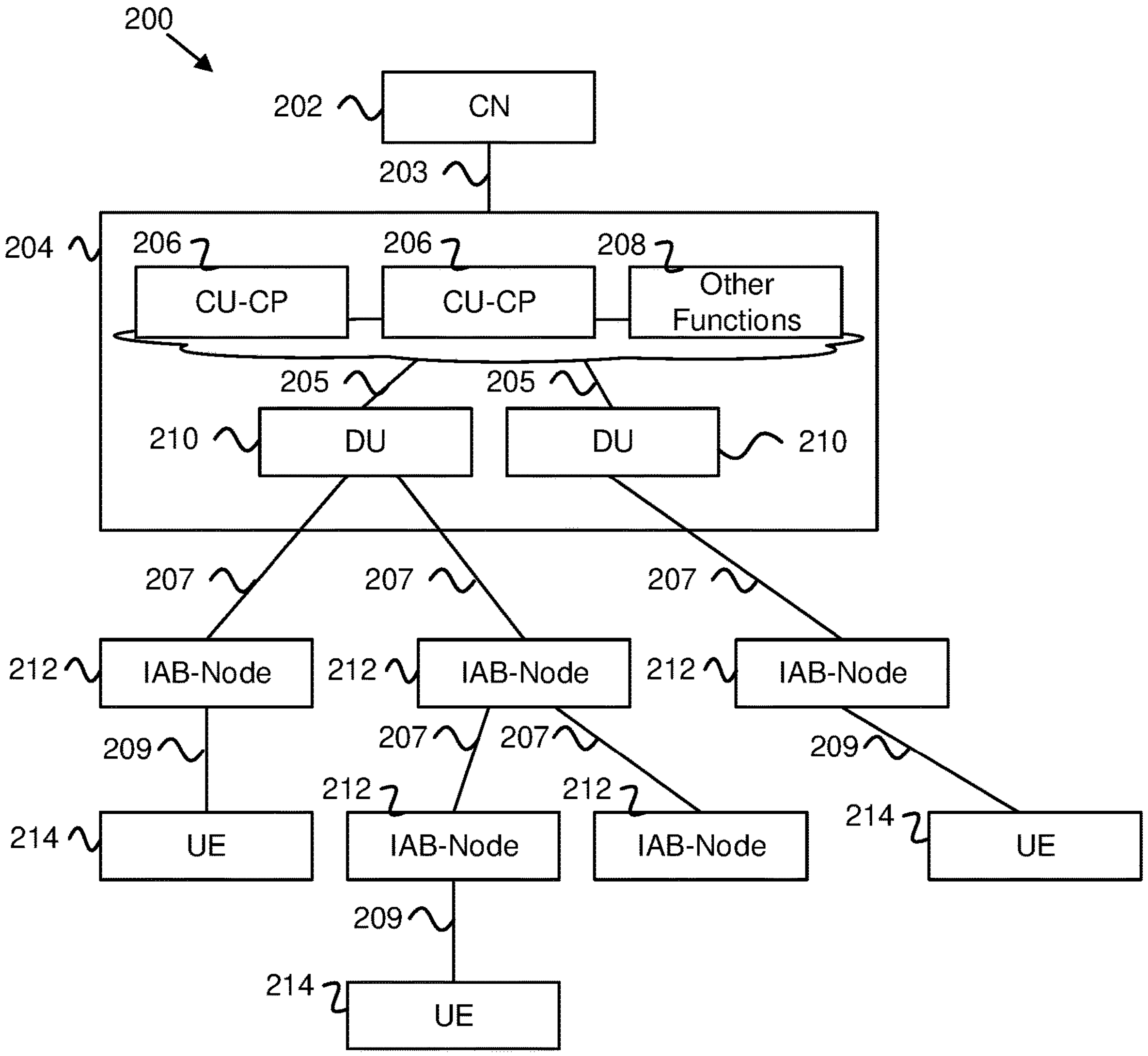
FIG. 2A is an example of an integrated access and backhaul (IAB) system (in standalone mode) for timing alignment in integrated access and backhaul.

FIG. 2A is an example of an integrated access and backhaul ("IAB") system 200 (in standalone mode). The core network 202 is connected to an IAB donor 204 of an IAB system 200 through a backhaul link 203, which is typically wired. The IAB donor 204 comprises a central unit ("CU") 206 that communicates with all the distributed units ("DUs") 210 in the system through an F1 interface 205. The IAB donor 204 is a single logical node that may comprise a set of functions 208 such as gNB-DU, gNB-CU-CP, gNB-CU-UP, and so on. In a deployment, the IAB donor 204 can be split according to these functions, which can all be either collocated or non-collocated.

Each IAB node 212 is functionally split into at least a distributed unit ("DU") and a mobile terminal ("MT"). An MT of an IAB node 212 is connected to a DU 210 of a parent node, which may be another IAB node 212 or an IAB donor 204.

A Uu link between an MT of an IAB node 212 (called an IAB-MT) and a DU 210 of a parent node (called an IAB-DU) is called a wireless backhaul link 207. In the wireless backhaul link 207, in terms of functionalities, the MT is similar to user equipment ("UE") 214 and the DU 210 of the parent node is similar to a base station in a conventional cellular wireless access link. Therefore, a link from an MT to a serving cell that is a DU 210 of a parent link is called an uplink, and a link in the reverse direction is called a downlink. For the sake of brevity, in the rest of this disclosure, embodiments may simply refer to an uplink or a downlink between IAB nodes 212, an upstream link or a downstream link of an IAB node 212, a link between a node and its parent node, a link between a node and its child node, and so on without a direct reference to an IAB-MT, IAB-DU, serving cell, and so on.

Each IAB donor 204 or IAB node 212 may serve UEs 214 through access links 209. IAB systems 200 are designed to allow multi-hop communications, i.e., a UE 214 may be connected to the core network 202 through an access link 209 and multiple backhaul links 207 between IAB nodes 212 and an IAB donor 204. For the rest of this disclosure, unless stated otherwise, an "IAB node" may generally refer to an IAB node 212 or an IAB donor 204 as long as a connection between a CU 206 and a core network 202 is not concerned.

Figure 2B:
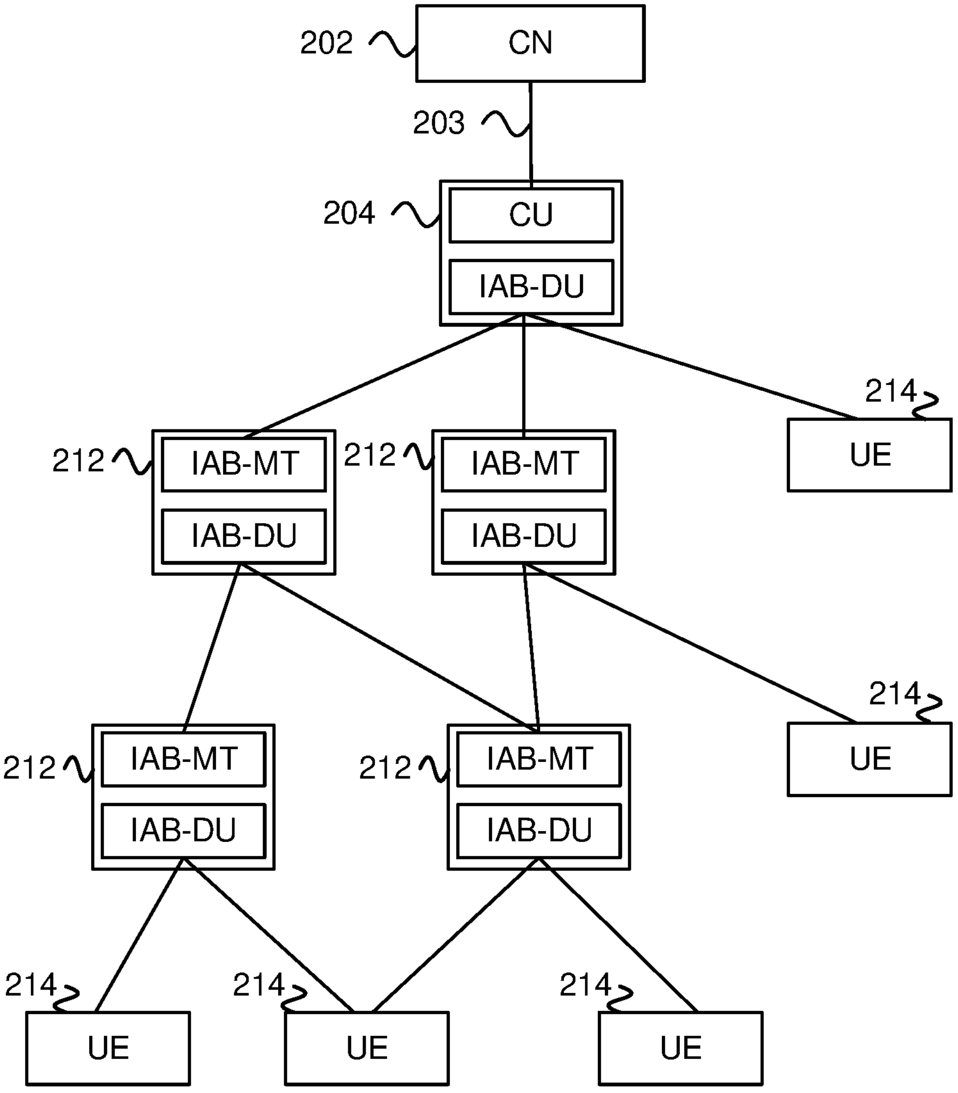
FIG. 2B is a block diagram illustrating one embodiment of a summary of a CU/DU split in an IAB donor and a DU/MT split in IAB nodes for timing alignment in integrated access and backhaul.

FIG. 2B is a block diagram illustrating one embodiment of a summary of a CU/DU split in an IAB donor 204 and a DU/MT split in IAB nodes 212. FIG. 2B illustrates the functional splits of an IAB donor 204 and IAB nodes 212.

In this figure, an IAB node 212 or a UE 214 can be served by more than one serving cell as they support dual connectivity ("DC").

A node, link, or the like, closer to the IAB donor 204 and/or the core network 202 is called an upstream node or link. For example, a parent node of a subject node is an upstream node of the subject node and the link to the parent node is an upstream link with respect to the subject node. Similarly, a node or link farther from the IAB donor 204 and/or the core network 202 is called a downstream node or link. For example, a child node of a subject node is a downstream node of the subject node and the link to the child node is a downstream link with respect to the subject node.

The following table summarizes the terminology used in this disclosure for the sake of brevity versus the description that may appear in the standard specifications.

TABLE 1

| Phrase | Description |
|---|---|
| Wireless backhaul link | A connection between an MT of an IAB node and a DU of a serving cell |
| Wireless access link | A connection between a UE and (a DU of) a serving cell |
| IAB-node | RAN node that supports NR access links to UEs and NR backhaul links to parent nodes and child nodes |
| IAB-MT | IAB-node function that terminates the Uu interface to the parent node |
| IAB-DU | gNB-DU functionality supported by the IAB-node to terminate the NR access interface to UEs and next-hop IAB-nodes, and to terminate the F1 protocol to the gNB-CU functionality on the IAB-donor |
| IAB-donor | gNB that provides network access to UEs via a network of backhaul and access links |
| Parent [IAB] node | An IAB node or IAB donor that comprises a serving cell of the subject node. In some examples, IAB-node-MT's next hop neighbour node; the parent node can be an IAB-node or an IAB-donor-DU. |
| Child [IAB] node | An IAB node that identifies the subject node as a serving cell. In some examples, IAB-node-DU's next hop neighbour node; the child node is also an IAB-node. |
| Sibling [IAB] node | An IAB node that has a common parent with the subject node |
| Uplink (of a wireless backhaul link) | A link from an MT to a DU of a parent node |
| Downlink (of a wireless backhaul link) | A link from a DU to an MT of a child node |
| Upstream node/link/etc. | A node/link/etc. (topologically) closer to the IAB donor/core network. Direction toward parent node in IAB-topology |
| Downstream node/link/etc. | A node/link/etc. (topologically) farther from the IAB donor/core network. Direction toward child node or UE in IAB-topology |

Furthermore, an "operation" or a "communication," where appropriate, may refer to a transmission or a reception in an uplink (or upstream) or a downlink (or downstream). Then, the terms "simultaneous operation" or "simultaneous communications" may refer to multiplexing/duplexing transmissions and/or receptions by a node through one or multiple antennas/panels. Details of the simultaneous operation should be understood from the context.

Regarding timing alignment, seven timing alignment cases include:

TABLE 2

| | | |
|---|---|---|
| Case #1 | DL transmission timing alignment across IAB-nodes and IAB-donors<br>If DL TX and UL RX are not well aligned at the parent node, additional information about the alignment is needed for the child node to properly set its DL TX timing for OTA based timing & synchronization | Supported for both access and backhaul link transmission |
| Case #2 | DL and UL transmission timing is aligned within an IAB-node | Not supported |
| Case #3 | DL and UL reception timing is aligned within an IAB-node | Not supported |
| Case #4 | within an IAB-node, when transmitting using Case #2 while when receiving using Case #3 | Not supported |
| Case #5 | Case #1 for access link timing and Case #4 for backhaul link timing within an IAB-node in different time slots | Not supported |
| Case #6 | Case#1 DL transmission timing + Case #2 UL transmission timing<br>The DL transmission timing for all IAB-nodes is aligned with the parent IAB-node or donor DL timing<br>The UL transmission timing of an IAB-node can be aligned with the IAB-node's DL transmission timing | If supported, under control of parent/network |

TABLE 2-continued

| | | |
|---|---|---|
| Case #7 | Case#1 DL transmission timing + Case #3 UL reception timing<br>The DL transmission timing for all IAB-nodes is aligned with the parent IAB-node or donor DL timing<br>The UL reception timing of an IAB-node can be aligned with the IAB-node's DL reception timing<br>If DL TX and UL RX are not well aligned at the parent node, additional information about the alignment is needed for the child node to properly set its DL TX timing for OTA based timing & synchronization | Compatible with Rel-15 UEs by introducing an "effective" negative TA |

Case-1 was approved to be specified for IAB Rel-16, which focused on TDM. Case-2/3/4/5 are not to be supported. Case-6 and Case-7 are candidates for enhanced timing alignment to facilitate and improve the performance of FDM/SDM between simultaneous upstream and downstream operations.

Figure 3:
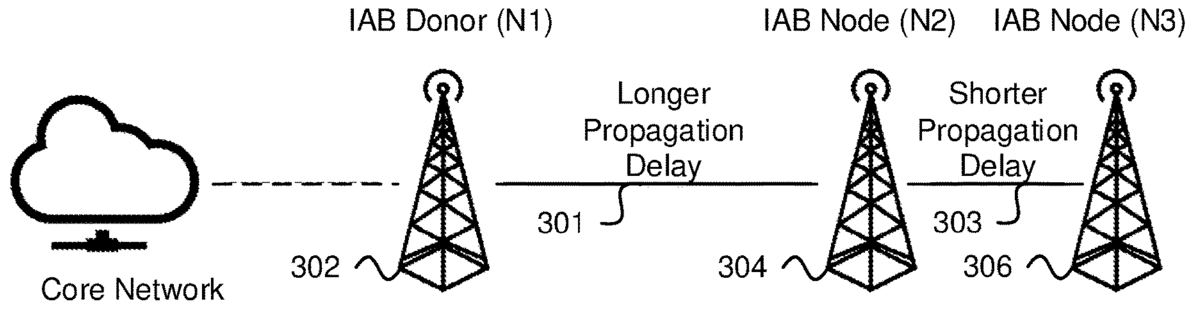
FIG. 3 is a diagram illustrating one embodiment of a scenario for timing alignment in integrated access and backhaul.

FIG. 3 is a diagram illustrating one embodiment of a scenario for timing alignment. In this example, the IAB donor/node N1 302 is a parent node of the IAB node N2 304, which is a parent node of the IAB node N3 306. The link 301 between N1 and N2 experiences a longer propagation delay than the link 303 between N2 and N3, in this example.

Figure 4A:
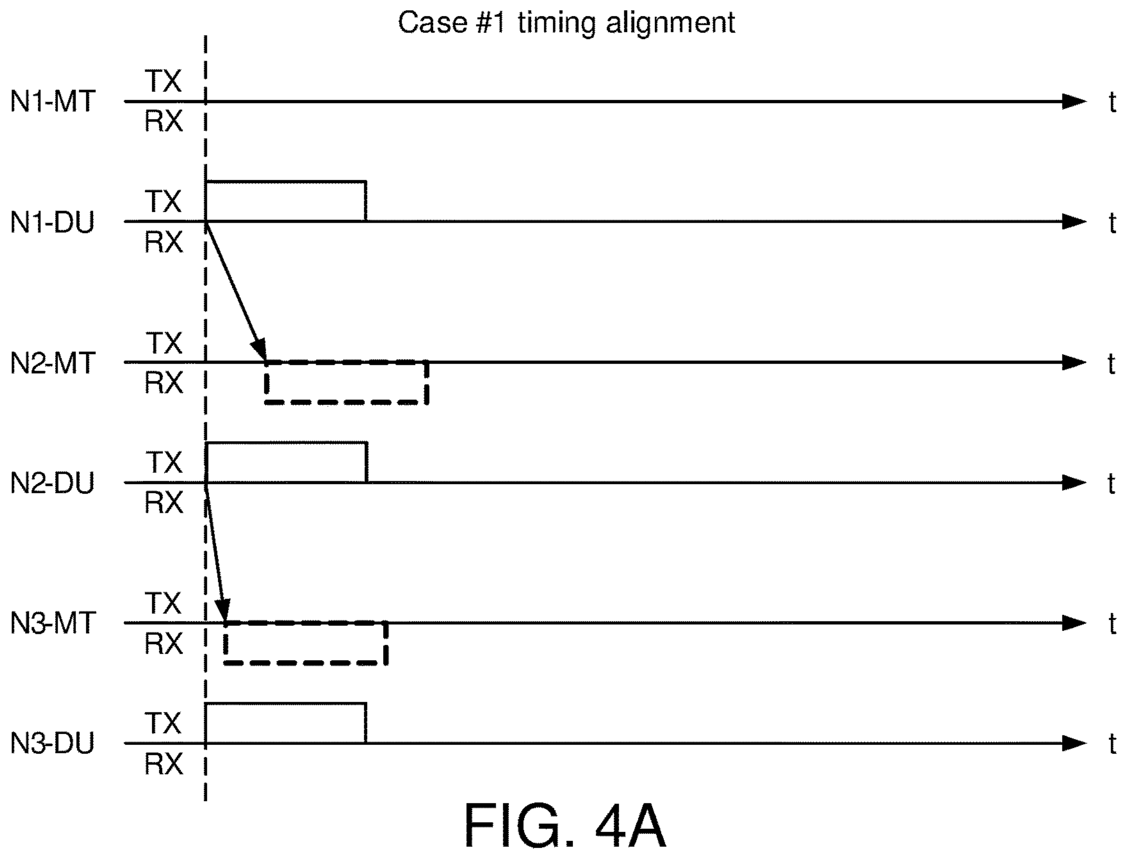
FIG. 4A is a diagram illustrating one embodiment of principle timing alignment for Case-1.
Figure 4B:
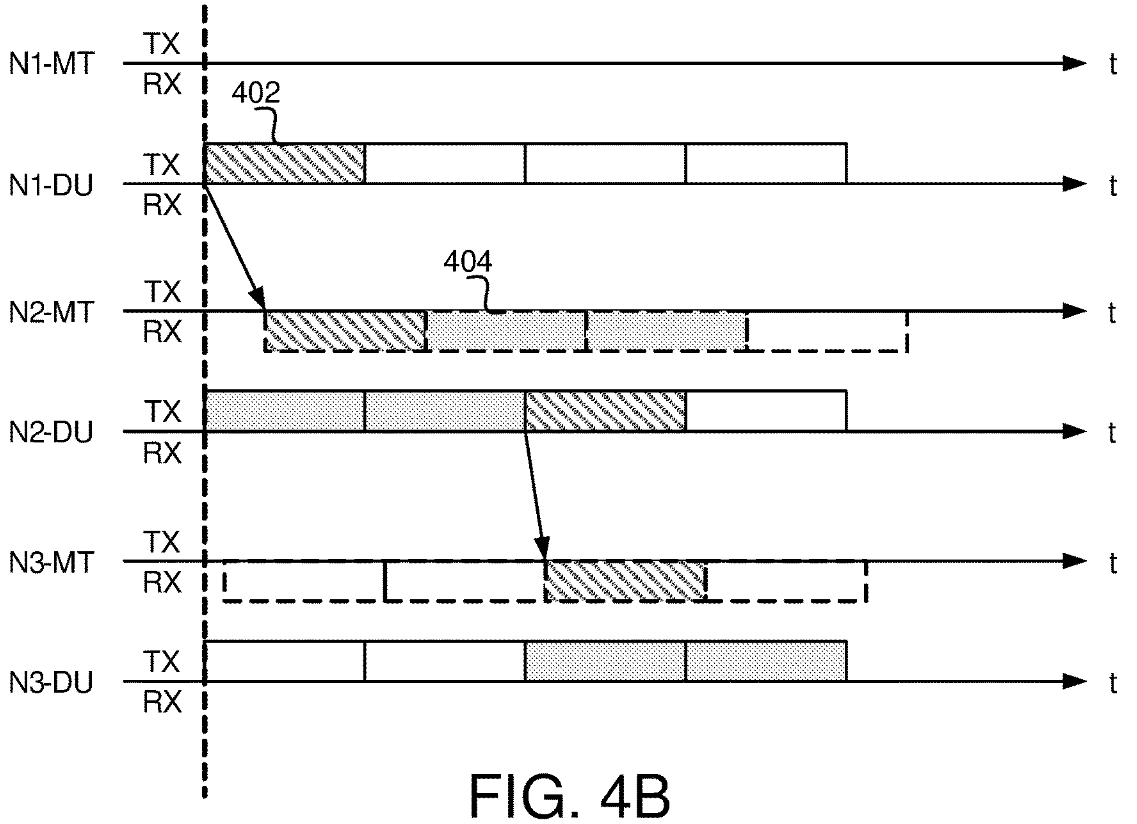
FIG. 4B is a diagram illustrating one embodiment of an example timing alignment for Case-1.

Regarding timing alignment Case-1, FIGS. 4A and 4B are diagrams illustrating one embodiment of timing alignment Case-1: principle (4A) and example timeline (4B). In this case, timing of downlink transmissions across IAB nodes 212 are aligned. In the example shown in FIG. 4B, a rectangle with lines 402 illustrates an operation (e.g., transmission or reception) in a slot, while a shaded rectangle 404 illustrates a lack of operation due to half-duplex constraints. Also, solid rectangles represent transmissions and dashed rectangles represent receptions.

Case-1 timing alignment is realized by setting downlink transmission timing ahead of downlink reception timing by TA/2+T_delta, where:

i. TA is the instantaneous value of timing advance ("TA"), e.g., as specified in NR Rel-15. It should be set to the most recent time interval (e.g., gap) at the child IAB node (e.g., N2) between the start of an uplink transmission frame i and the start of a downlink reception frame i.

ii. T_delta is a parameter specified in IAB Rel-16 that should be set to (−½) of the time interval at the parent node (e.g., N1) between the start of an uplink reception frame i from the child node (e.g., N2) and the start of a downlink transmission frame i to the child node (e.g., N2).

Figure 5:
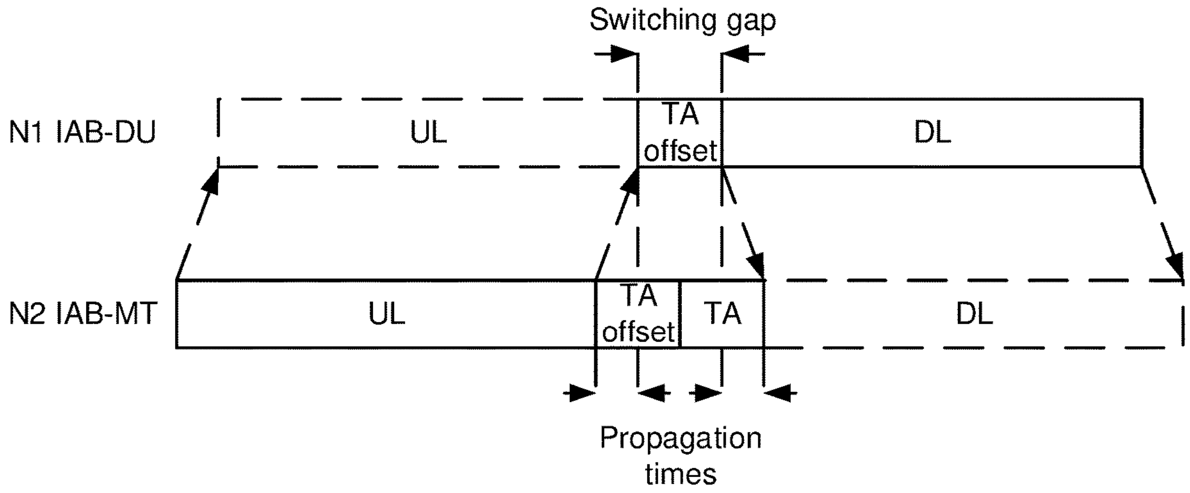
FIG. 5 is a diagram illustrating one embodiment of a timeline for applying Case-1 timing alignment.

FIG. 5 is a diagram illustrating one embodiment of a timeline for applying Case-1 timing alignment. Notes on timing alignment for IAB Rel-16:

a. T_delta is sent by the parent node to the child node via MAC-CE signaling. T_delta has a finer granularity that TA and the signaling is aperiodic. It was discussed in the SI phase to consider separate value ranges/granularities for T_delta in FR1 and T_delta in FR2.

b. If the value of TA/2+T_delta at an IAB node is negative, the IAB node should not adjust its downlink transmission timing.

c. From RAN1 perspective, Rel-16 NR IAB did not introduce signaling of accuracy/quality measure for IAB node downlink transmission timing.

d. In Rel-16, an IAB node is not expected to receive T_delta when not in RRC_Connected mode.

e. An IAB node with multiple parents treats each parent as a separate synchronization source. How the IAB node determines its downlink transmission timing from multiple values of tentative downlink transmission timing is up to implementation.

Although Case-6 and Case-7 are considered candidates for timing alignment for enhanced duplexing in IAB Rel-17, signaling and addressing issues are yet to be specified. In the next section, we review signaling methods to enable Case-6 and Case-7 and address related issues.

Figure 6:
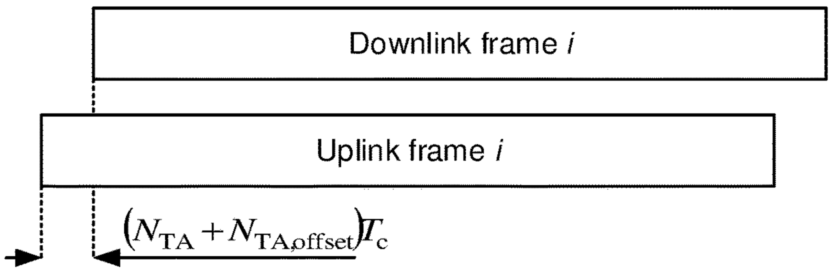
FIG. 6 is a diagram illustrating one embodiment of an uplink-downlink timing relation.

Regarding transmission timing adjustments in physical layer specifications, FIG. 6 is a diagram illustrating one embodiment of an uplink-downlink timing relation. The following procedures specified for a UE are applicable to an IAB-MT as well. Uplink frame number i for transmission from the UE shall start $T_{TA}=(N_{TA}+N_{TA,offset})T_c$ before the start of the corresponding downlink frame at the UE where $N_{TA,offset}$ is given by [38.213], except for msgA transmission on PUSCH where $T_{TA}=0$ shall be used.

A UE can be provided a value $N_{TA,\ offset}$ of a timing advance offset for a serving cell by n-TimingAdvanceOffset for the serving cell. If the UE is not provided n-TimingAdvanceOffset for a serving cell, the UE determines a default value $N_{TA,\ offset}$ of the timing advance offset for the serving cell as described in [38.133].

Upon reception of a timing advance command for a TAG, the UE adjusts uplink timing for PUSCH/SRS/PUCCH transmission on all the serving cells in the TAG based on a value $N_{TA,\ offset}$ that the UE expects to be same for all the serving cells in the TAG and based on the received timing advance command where the uplink timing for PUSCH/SRS/PUCCH transmissions is the same for all the serving cells in the TAG.

For a SCS of $2^{\mu}\cdot 15$ kHz, the timing advance command for a TAG indicates the change of the uplink timing relative to the current uplink timing for the TAG in multiples of $16\cdot 64\cdot T_c/2^{\mu}$.

In other cases, a timing advance command, $T_A$, for a TAG indicates adjustment of a current $N_{TA}$ value, $N_{TA\_old}$, to the new $N_{TA}$ value, $N_{TA\_new}$, by index values of $T_A=0$, 1, 2, . . . , 63, where for a SCS of $2^{\mu}\cdot 15$ kHz, $N_{TA\_new}=N_{TA\_old}+(T_A-31)\cdot 16\cdot 64/2^{\mu}$.

If a UE has multiple active UL BWPs in a same TAG, including UL BWPs in two UL carriers of a serving cell, the timing advance command value is relative to the largest SCS of the multiple active UL BWPs. The applicable $N_{TA\_new}$ value for an UL BWP with lower SCS may be rounded to align with the timing advance granularity for the UL BWP with the lower SCS while satisfying the timing advance accuracy requirements in [38.133].

Adjustment of an $N_{TA}$ value by a positive or a negative amount indicates advancing or delaying the uplink transmission timing for the TAG by a corresponding amount, respectively.

For a timing advance command received on uplink slot n and for a transmission other than a PUSCH scheduled by a RAR UL grant or a PUCCH with HARQ-ACK information in response to a successRAR, the corresponding adjustment of the uplink transmission timing applies from the beginning of uplink slot n+k+1 where $$k = \lceil N_{slot}^{subframe,\mu} \cdot (N_{T,1} + N_{T,2} + N_{TA,max} + 0.5)/T_{sf} \rceil,$$

$N_{T,1}$ is a time duration in msec of $N_1$ symbols corresponding to a PDSCH processing time for UE processing capability 1 when additional PDSCH DM-RS is configured, $N_{T,2}$ is a time duration in msec of $N_2$ symbols corresponding to a PUSCH preparation time for UE processing capability 1 [38.214], $N_{TA\_max}$ is the maximum timing advance value in msec that can be provided by a TA command field of 12 bits, $$N_{slot}^{subframe,\mu}$$

is the number of slots per subframe, and $T_{sf}$ is the subframe duration of 1 msec. $N_1$ and $N_2$ are determined with respect to the minimum SCS among the SCSs of all configured UL BWPs for all uplink carriers in the TAG and of all configured DL BWPs for the corresponding downlink carriers. For μ=0, the UE assumes $N_{1,0}$=14 [38.214]. Slot n and $$N_{slot}^{subframe,\mu}$$

are determined with respect to the minimum SCS among the SCSs of all configured UL BWPs for all uplink carriers in the TAG. $N_{TA,max}$ is determined with respect to the minimum SCS among the SCSs of all configured UL BWPs for all uplink carriers in the TAG and for all configured initial UL BWPs provided by initialUplinkBWP. The uplink slot n is the last slot among uplink slot(s) overlapping with the slot(s) of PDSCH reception assuming $T_{TA}$=0, where the PDSCH provides the timing advance command and $T_{TA}$ is defined in [38.211].

If a UE changes an active UL BWP between a time of a timing advance command reception and a time of applying a corresponding adjustment for the uplink transmission timing, the UE determines the timing advance command value based on the SCS of the new active UL BWP. If the UE changes an active UL BWP after applying an adjustment for the uplink transmission timing, the UE assumes a same absolute timing advance command value before and after the active UL BWP change.

If the received downlink timing changes and is not compensated or is only partly compensated by the uplink timing adjustment without timing advance command as described in [38.133], the UE changes $N_{TA}$ accordingly.

If two adjacent slots overlap due to a TA command, the latter slot is reduced in duration relative to the former slot.

Regarding timing alignment in IAB, if an IAB-node is provided a value $T_{delta}$ from a serving cell, the IAB-node may assume that $(N_{TA}+N_{TA,offset})\cdot T_c/2+T_{delta}$ is a time difference between a DU transmission of a signal from the serving cell and a reception of the signal by the IAB-node MT when $(N_{TA}+N_{TA,offset})\cdot T_c/2+T_{delta}>0$, where $N_{TA}$ and $N_{TA,offset}$ are obtained as for a "UE" as described in the previous section for the TAG containing the serving cell. The IAB-node may use the time difference to determine a DU transmission time.

Regarding change request ("CR") status, in the CR R1-2003175, the above specification is proposed to change to the following.

If an IAB-node is provided an index $T_{delta}$ in a Timing Delta MAC CE [11, TS 38.321] from a serving cell, the IAB-node may assume that $(N_{TA}/2++N_{delta}+T_{delta}\cdot G_{step})\cdot T_c$ is a time difference between a DU transmission of a signal from the serving cell and a reception of the signal by the IAB-node MT when $(N_{TA}/2++N_{delta}+T_{delta}\cdot G_{step}>0$ , where $N_{TA}$ is obtained as for a "UE" in Clause 4.2 for the TAG containing the serving cell and $N_{delta}$ and $G_{step}$ are determined as:

a. $N_{delta}$=70528 and $G_{step}$=64, if the serving cell providing the Timing Delta MAC CE operates in FR1, b. $N_{delta}$=−17664 and $G_{step}$=32, if the serving cell providing the Timing Delta MAC CE operates in FR2.

Figure 7A:
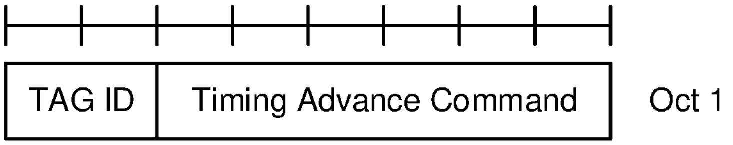
FIG. 7A is a diagram illustrating one embodiment of Timing Advance Command MAC CE.

FIG. 7A is a diagram illustrating one embodiment of Timing Advance Command MAC CE. The Timing Advance Command MAC CE is identified by MAC subheader with LCID=61. It has a fixed size and consists of a single octet defined as follows:

a. TAG Identity (TAG ID): This field indicates the TAG Identity of the addressed TAG. The TAG containing the SpCell has the TAG Identity 0. The length of the field is 2 bits.

b. Timing Advance Command: This field indicates the index value $T_A$ (0, 1, 2 . . . 63) used to control the amount of timing adjustment that MAC entity must apply as specified in [38.213]. The length of the field is 6 bits.

Figure 7B:
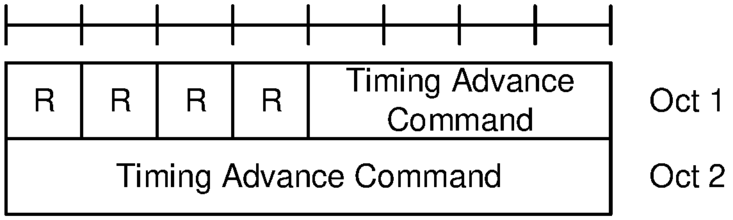
FIG. 7B is a diagram illustrating one embodiment of Absolute Timing Advance Command MAC CE.

FIG. 7B is a diagram illustrating one embodiment of Absolute Timing Advance Command MAC CE. The Absolute Timing Advance Command MAC CE is identified by MAC subheader with LCID=38. It has a fixed size and consists of two octets defined as follows:

a. Timing Advance Command: This field indicates the index value TA used to control the amount of timing adjustment that the MAC entity has to apply in [38.213]. The size of the field is 12 bits;

b. R: Reserved bit, set to "0".

Figure 7C:
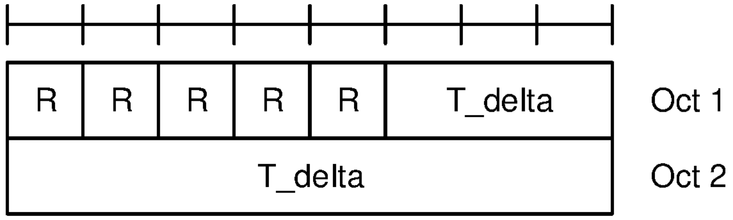
FIG. 7C is a diagram illustrating one embodiment of Timing Delta MAC CE.

FIG. 7C is a diagram illustrating one embodiment of Timing Delta MAC CE. The Timing Delta MAC CE is identified by MAC subheader with LCID=46. It has a fixed size and consists of two octets defined as follows:

a. R: Reserved bit, set to 0;

b. T_delta: This field indicates the index value of Tdelta (0, 1, 2, . . . , 1199) used to control the amount of timing adjustment that MAC entity indicates as specified in [38.213]. The length of the field is 11 bits.

Regarding RRC specifications, the RRC field n-TimingAdvanceOffset is defined in two RRC IEs as follows:

```
ServingCell ConfigCommon ::=      SEQUENCE {
  ...
  n-TimingAdvanceOffset           ENUMERATED { n0, n25600,
                                  n39936 }
OPTIONAL,   -- Need S
  ...
}
```

n-TimingAdvanceOffset
The N_TA-Offset to be applied for all uplink transmissions on this serving cell. If the field is absent, the UE applies the value defined for the duplex mode and frequency range of this serving cell. See [38.133], table 7.1.2-2.

```
ServingCell ConfigCommonSIB ::=      SEQUENCE {
  ...
  n-TimingAdvanceOffset               ENUMERATED { n0, n25600,
                                      n39936 }
OPTIONAL, -- Need S
  ...
}
```

n-TimingAdvanceOffset
The N_TA-Offset to be applied for random access on this serving cell. If the field is absent, the UE applies the value defined for the duplex mode and frequency range of this serving cell. See [38.133], table 7.1.2-2.

Regarding IAB-node synchronization and timing alignment, the feasibility of over-the-air ("OTA") synchronization and the impact of timing misalignment on IAB performance (e.g., the number of supportable hops) was studied. With the assumption of a <=3 us timing requirement across IAB-nodes within overlapping coverage, TA-based OTA synchronization can support a multi-hop IAB network (up to 5 hops) for FR2. TA-based OTA synchronization may not be sufficient to support multiple hops in FR1.

The following levels of alignment between IAB-nodes/IAB-donors or within an IAB-node were studied:

a. Slot-level alignment;
b. Symbol-level alignment;
c. No alignment.

Mechanisms for timing alignment across multi-hop IAB networks were studied. IAB supports TA-based synchronization between IAB-nodes, including across multiple backhaul hops Enhancements to existing timing alignment mechanisms were studied, including the TA required for IAB-nodes to support different transmission timing alignment cases.

The following cases of transmission timing alignment across IAB-nodes and IAB-donors have been considered as part of the study:

a. Case #1: DL transmission timing alignment across IAB-nodes and IAB-donors:
   i. If DL TX and UL RX are not well aligned at the parent node, additional information about the alignment is needed for the child node to properly set its DL TX timing for OTA based timing & synchronization.
b. Case #2: DL and UL transmission timing is aligned within an IAB-node;
c. Case #3: DL and UL reception timing is aligned within an IAB-node;
d. Case #4: within an IAB-node, when transmitting using case 2 while when receiving using case 3;
e. Case #5: Case #1 for access link timing and Case 4 for backhaul link timing within an IAB-node in different time slots;
f. Case #6 (Case #1 DL transmission timing+Case #2 UL transmission timing):
   i. The DL transmission timing for all IAB-nodes is aligned with the parent IAB-node or donor DL timing;
   ii. The UL transmission timing of an IAB-node can be aligned with the IAB-node's DL transmission timing.
g. Case #7 (Case #1 DL transmission timing+Case #3 UL reception timing):
   i. The DL transmission timing for all IAB-nodes is aligned with the parent IAB-node or donor DL timing;
   ii. The UL reception timing of an IAB-node can be aligned with the IAB-node's DL reception timing;
   iii. If DL TX and UL RX are not well aligned at the parent node, additional information about the alignment is needed for the child node to properly set its DL TX timing for OTA based timing & synchronization.

The impact of different cases on TDM/FDM/SDM multiplexing of access and backhaul links, potential impact of imperfect timing adjustment, overhead of required DL/UL switching gaps, cross-link interference, feasibility of the case when the IAB-node is connected to one or multiple parent nodes, and impact on access UEs (especially compatibility with Rel-15 UEs) were considered as part of the study.

Case #1 is supported for both access and backhaul link transmission timing alignment.

Cases #2-#5 are not supported for IAB.

The use of Case 6, if supported, at the IAB-node should be under control of the parent or network.

To enable alignment of DL transmissions among IAB-nodes, the following examples of solutions have been identified:

a. Alt. 1: The IAB-node may need to carry out parallel (always time multiplexed) case #1 and case #6 uplink transmissions;
b. Alt 2: Signaling between the parent and IAB-node of the time difference of the DL Tx and UL Rx timing at the parent node in order to correct potential misalignment of the DL Tx timing at the child node:
   i. The child IAB-node compares the corresponding difference of its own DL Tx timing and BH Rx timing; if the signaled difference of the parent node is larger than measured at the child node, the child node advances its TX timing, if smaller the TX timing is delayed.
c. Note: Alt 1 & Alt 2 may require maintenance of separate Rx timings at the parent node for Case 6 UL transmissions from different child nodes.

Case #7 is compatible with Rel-15 UEs by introducing an "effective" negative TA, and TDM between child IAB-nodes/Rel-16 UEs which support the new TA values and child IAB-nodes/UEs which do not support the new TA values. To enable alignment between DL and UL reception within the IAB-node the following examples of solutions have been identified:

a. Alt 1: Introduce negative initial time alignment (TA) for IAB-nodes, to be applied to child nodes of the IAB-node applying case #7 timing;
b. Alt 2: Apply a positive TA that enables symbol alignment, but not slot alignment, between the DL reception and the UL reception at the IAB-node;
c. Alt. 3: Signaling of a relative offset w.r.t the most recent TA value, to be applied to child nodes of the IAB-node applying case #7 timing to achieve an effective negative TA.

In addition to OTA synchronization, other techniques such as GNSS and PTP, can be used to achieve synchronization across IAB-nodes.

Figure 8:
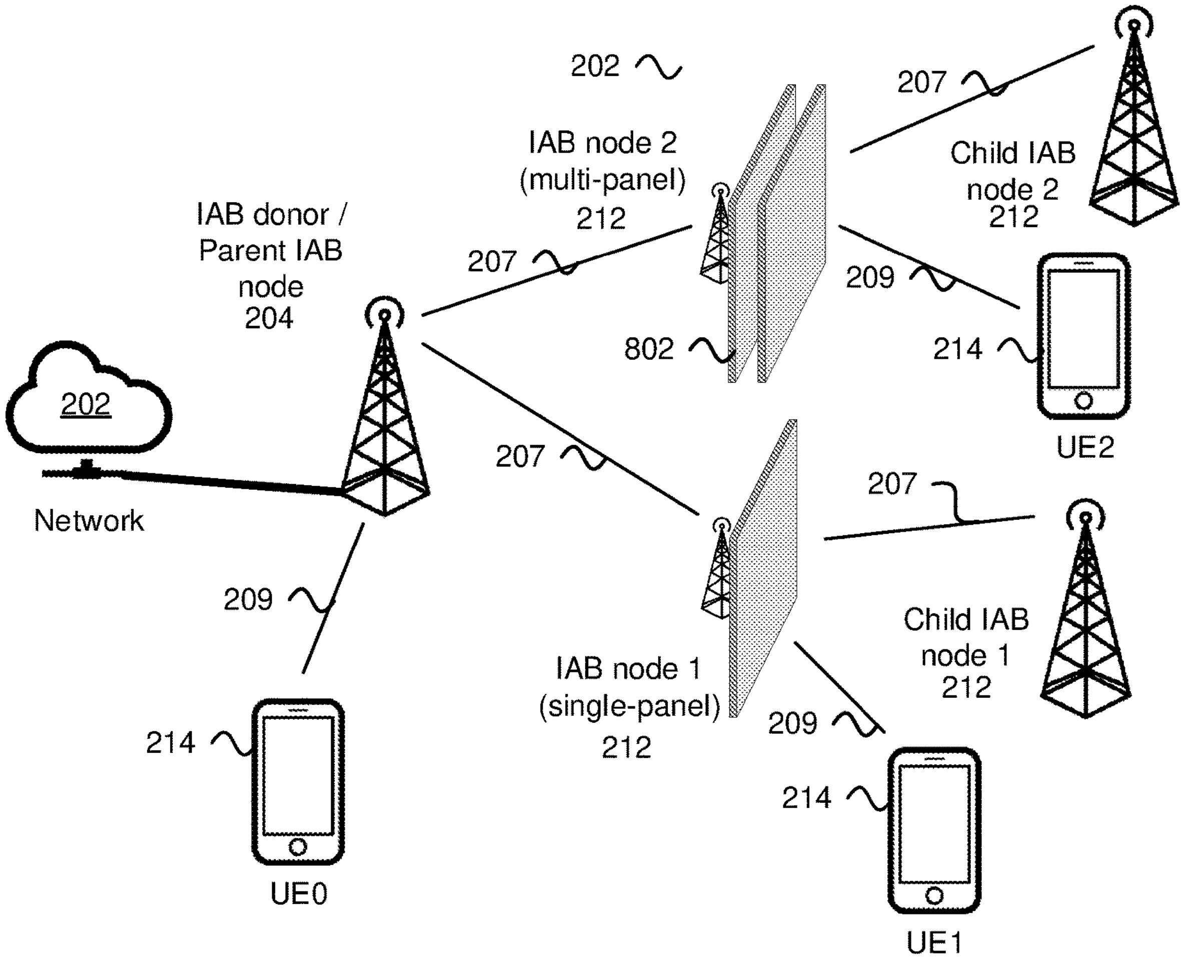
FIG. 8 is an example of an IAB system with single-panel and multi-panel IAB nodes for timing alignment in integrated access and backhaul.
Figure 9:
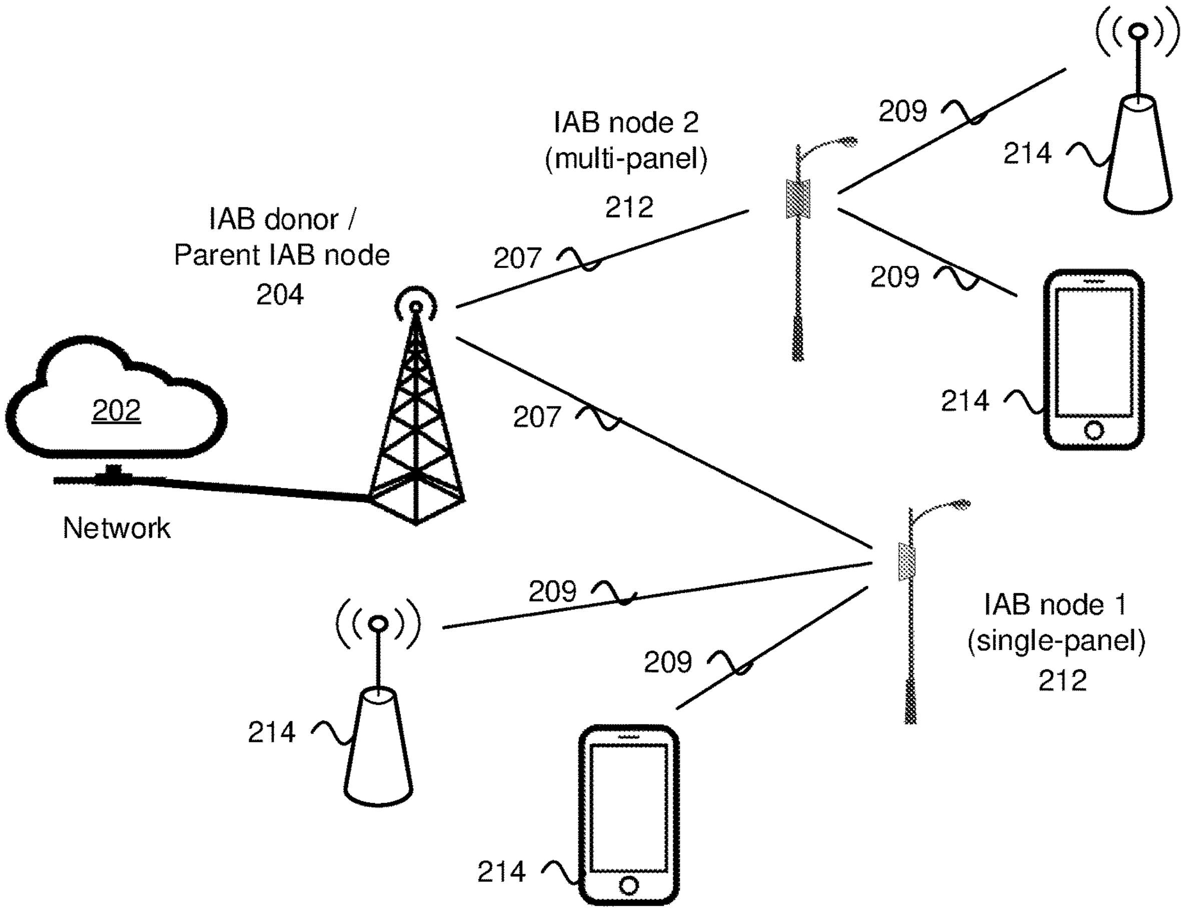
FIG. 9 is an example of an IAB system with single-panel and multi-panel IAB nodes.

FIG. 8 is an example of an IAB system with single-panel and multi-panel IAB nodes. FIG. 9 is an alternate example of an IAB system with single-panel and multi-panel IAB nodes. Consider an IAB network such as the one illustrated in FIGS. 8 and 9. An IAB network is connected to a core network 202 through one or multiple IAB donors 204. Each IAB node 212 may be connected to an IAB donor 204 and/or other IAB nodes 212 through wireless backhaul links 207. Each IAB donor 204/node 212 may also serve UEs 214.

There are various options with regards to the structure and multiplexing/duplexing capabilities of an IAB node 212. For example, each IAB node 212 may have one or multiple antenna panels 802, each connected to the baseband unit through an RF chain The one or multiple antenna panels 802 may be able to serve the whole spatial area of interest in a vicinity of the IAB node 212, or otherwise each antenna panel 802 or each group of antenna panels may provide a partial coverage such as in a sector. An IAB node 212 with multiple antenna panels 802, each serving a separate spatial area or sector, may still be referred to as a single-panel IAB node 212 as it behaves similarly to a single-panel IAB node 212 for communications in each of the separate spatial areas or sectors.

Furthermore, each antenna panel 802 may be half-duplex ("HD"), meaning that it is able to either transmit or receive signals in a frequency band at a time, or full-duplex ("FD"), meaning that it is able to both transmit and receive signals in a frequency band simultaneously. Unlike full-duplex radio, half-duplex radio is widely implemented and used in practice and is usually assumed as the default mode of operation in wireless systems.

The following table lists different duplexing scenarios of interest when multiplexing is not constrained to time-division multiplexing ("TDM"). In this table, IAB node 1 (N1) is a single-panel IAB node; IAB node 2 (N2) is a multi-panel IAB node; spatial-division multiplexing ("SDM") refers to either transmission or reception on downlink (or downstream) and uplink (or upstream) simultaneously; full duplex ("FD") refers to simultaneous transmission and reception by a same antenna panel in a frequency band; and multi-panel transmission and reception ("MPTR") refers to simultaneous transmission and reception by multiple antenna panels where each antenna panel either transmits or receives in a frequency band at a time.

TABLE 3

| Scenario | IAB-MT | IAB-DU | Type |
|---|---|---|---|
| S1, Case B | N1-DL-RX | N1-UL-RX | SDM |
| S2, Case D | N1-DL-RX | N1-DL-TX | FD |
| S3, Case A | N1-UL-TX | N1-DL-TX | SDM |
| S4, Case C | N1-UL-TX | N1-UL-RX | FD |
| S5, Case B | N2-DL-RX | N2-UL-RX | SDM |
| S6, Case D | N2-DL-RX | N2-DL-TX | MPTR/FD |
| S7, Case A | N2-UL-TX | N2-DL-TX | SDM |
| S8, Case C | N2-UL-TX | N2-UL-RX | MPTR/FD |

Figure 10A:
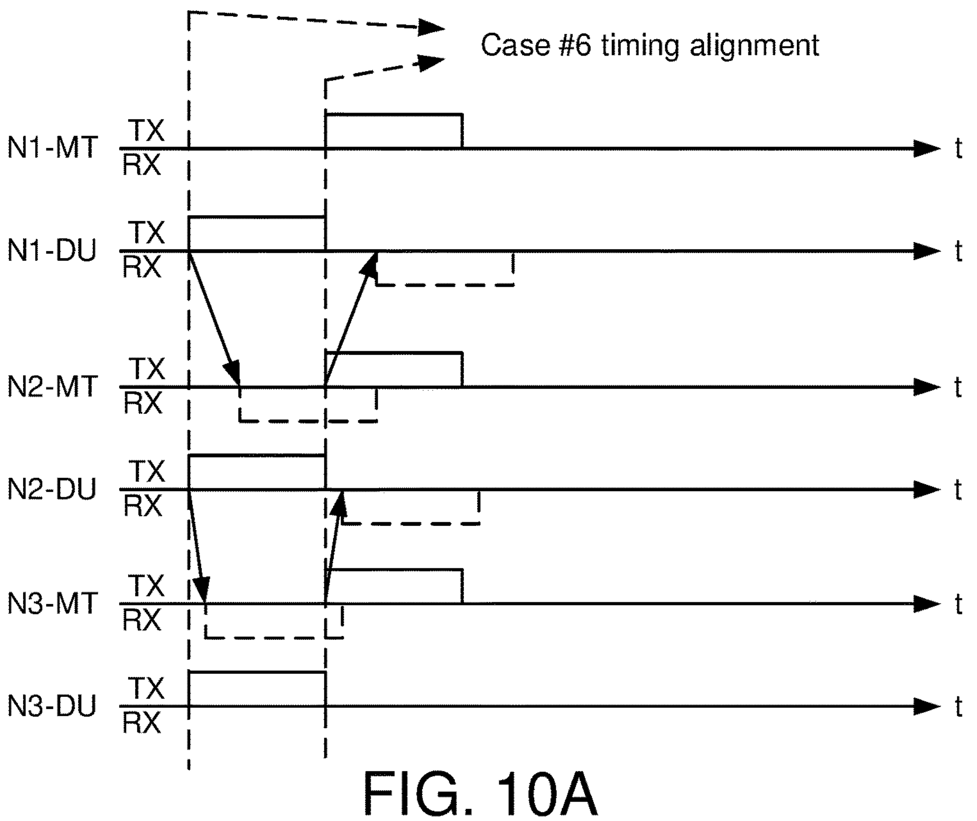
FIG. 10A is a diagram illustrating one embodiment of principle transmission timing alignment for Case-6.
Figure 10B:
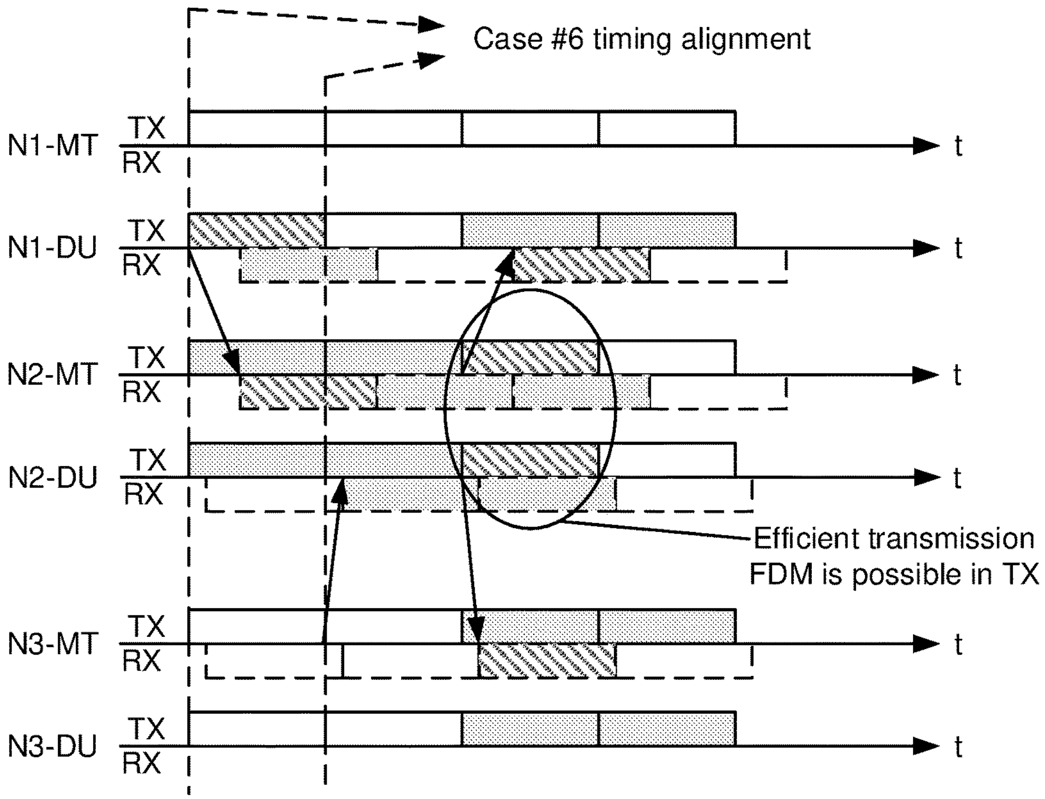
FIG. 10B is a diagram illustrating one embodiment of an example transmission timing alignment for Case-6.

FIGS. 10A and 10B are diagrams illustrating one embodiment of transmission timing alignment (Case-6): principle (10A) and example timeline (10B). One method for timing alignment within an IAB node is to align simultaneous downlink and uplink transmissions. This method is useful for realizing simultaneous transmissions, for example in an FDM scheme, at an IAB node with a single antenna panel connected to a single RF chain and baseband processing. Since timings of downlink transmissions are expected to be aligned across IAB nodes (i.e., Case-1), this leads to what was called timing alignment Case-6 in the IAB study item.

An example of transmission timing alignment is illustrated in FIGS. 10A and 10B where a constraint is applied to start a slot only at regular intervals of slot periods. Node N1, N2, N3 are as described with respect to FIG. 3.

A method for realizing TX timing alignment for an IAB node may comprise the following steps. First, the IAB node obtains DL RX timing, timing advance (TA), and $T_{delta}$ according to NR Rel-15 and IAB Rel-16. Then, the IAB node sets the UL TX timing to the DL TX timing as it would be obtained by Case-1 specified for IAB Rel-16. The method can be summarized as follows.

Method for the IAB node N2:

a. Obtain timing of DL RX ($T_{dl,rx}$) by receiving reference signals
b. Obtain timing advance (TA) for UL TX (e.g., via Timing Advance Command MAC CE)
c. Obtain a value of $T_{delta}$ (e.g., via RRC signaling)
d. Transmit uplink signals with timing $$T_{ul,tx} := T_{dl,rx} - \left(\frac{TA}{2} + T_{delta}\right)$$

Method for the parent node N1:

a. Transmit downlink reference signals with timing $$T_{dl,tx}^{PN}$$

b. Obtain $N_{TA,offset}$ (may be known in advance, or pre-defined)
c. Transmit a TA command comprising $N_{TA}$ (e.g., via MAC CE)
d. Transmit a value of $T_{delta}$ (e.g., via RRC signaling)
e. Transmit a control message to trigger/activate TX timing alignment (Case-6) (e.g., via RRC signaling and/or via MAC CE)
f. Set $TA_{offset}:=N_{TA,offset}\cdot T_c$
g. Receive uplink signals with timing $$T_{ul,rx}^{PN} := T_{dl,tx}^{PN} + \left(\frac{TA}{2} + T_{delta}\right)$$

In this method, the reference signals may be synchronization signal and physical broadcast channel ("SS/PBCH") blocks. TA is obtained by a method similar to NR Rel-15. That is, $TA=(N_{TA}+N_{TA,offset})\cdot T_c$, where $N_{TA}$ is an integer obtained by TA commands, $N_{TA,offset}$ is an integer offset determined by the standard/configuration, and $T_c$ is a time unit defined by the standard. In NR systems, we have $T_c$=0.509 ns. The parent node N1 acquires initial UL Rx timing and corresponding timing advance (TA) information (equivalently, estimating propagation delay) from a received PRACH preamble when the IAB-node N2 performs random access procedure. The parent node N1 may use the estimated propagation delay (e.g. obtained from PRACH preamble detection) and subsequently received UL signals (e.g. PUSCH DMRS) from the IAB-node N2 to further refine UL timing estimation. When the timing alignment scheme or mode, Case-6, is enabled for the IAB-node N2, the parent node N1 may set UL Rx timing $$T_{ul,rx}^{PN}$$

to $$T_{dl,tx}^{PN} + \left(\frac{TA}{2} + T_{delta}\right),$$

assuming that $$\frac{TA}{2} + T_{delta}$$

correspond to a latency including the propagation delay, the timing offset related to Tx-Rx switching time, and timing estimation errors.

The value of $T_{delta}$ may be signaled by a parent node, in this example by N1, according to IAB Rel-16. In some embodiments, a linear function of $T_{delta}$ such as $(N_{delta}+T_{delta}\cdot G_{step})$ may be used instead of $T_{delta}$, where the additive term $N_{delta}$ and the multiplicative factor $G_{step}$ may be obtained by signaling or by a specification and may be different for different frequency ranges and/or subcarrier spacings.

It is expected that an enhanced IAB system will be capable of applying different timing alignment modes. This will be explained with more details in the next sections. Meanwhile, we can augment the above methods with signaling that allows to enable or disable a timing alignment mode. The signaling can be through a MAC-CE message for semi-persistent activation or deactivation of the timing alignment mode, a downlink control information (DCI) message for triggering a timing alignment mode for a period, for example one or multiple slots, or other signaling.

An alternative embodiment for Rx timing at the parent node N1 is shown below. $T_{p,u}$ is the propagation delay between the IAB node (N2 in this example) and its upstream (parent, N1 in this example) node.

Method for parent node N1:

a. Transmit downlink reference signals with timing $$T_{dl,tx}^{PN}$$

b. Obtain $N_{TA,offset}$ c. Transmit a TA command comprising $N_{TA}$ d. Transmit a value of $T_{delta}$ e. Transmit a control message to trigger/activate TX timing alignment (Case-6)

f. Set $TA_{offset}:=N_{TA,offset}\cdot T_c$ g. Obtain a value of $T_{p,u}$ h. Receive uplink signals with timing $$T_{ul,rx}^{PN} := T_{dl,tx}^{PN} - \left(\frac{TA_{offset}}{2} + T_{delta}\right) + T_{p,u}$$

Method for IAB node N2:

a. Obtain timing of DL RX $T_{dl,rx}$ by receiving reference signals b. Obtain $N_{TA,offset}$ c. Receive a TA command comprising $N_{TA}$ d. Receive $T_{delta}$ e. Receive a control message triggering/activating TX timing alignment (Case-6)

f. Set $TA:=(N_{TA}+N_{TA,offset})\cdot T_c$ g. Transmit uplink signals with timing $$T_{ul,tx} := T_{dl,rx} - \left(\frac{TA}{2} + T_{delta}\right)$$

The control message triggering or activating the TX timing alignment mode may be a MAC-CE message, a DCI message, or a combination thereof.

In these methods, applying the TX timing alignment mode depends on receiving the control message that triggers or activates the mode. Therefore, the IAB node N2 may apply a default timing alignment mode for a resource/slot R such as a timing advance according to NR Rel-15 in the following cases:

a. The control message was not received.

b. The control message was received, but it is not associated with resource/slot R.

c. The control message was received, but it expired before transmission of resource/slot R because a timer associated with the control message expired.

d. The control message was received, but it expired because a deactivation control message was received afterwards. The deactivation control message may be a MAC-CE message, a DCI message, or a combination thereof.

It should be noted that in an IAB system, the downstream communications/operations (i.e., DL TX and/or UL RX) are performed by an IAB-DU in a parent IAB node or IAB donor, and the upstream communications/operations (i.e., DL RX and/or UL TX) are performed by an IAB-MT in an IAB node or by an enhanced UE.

Figure 11:
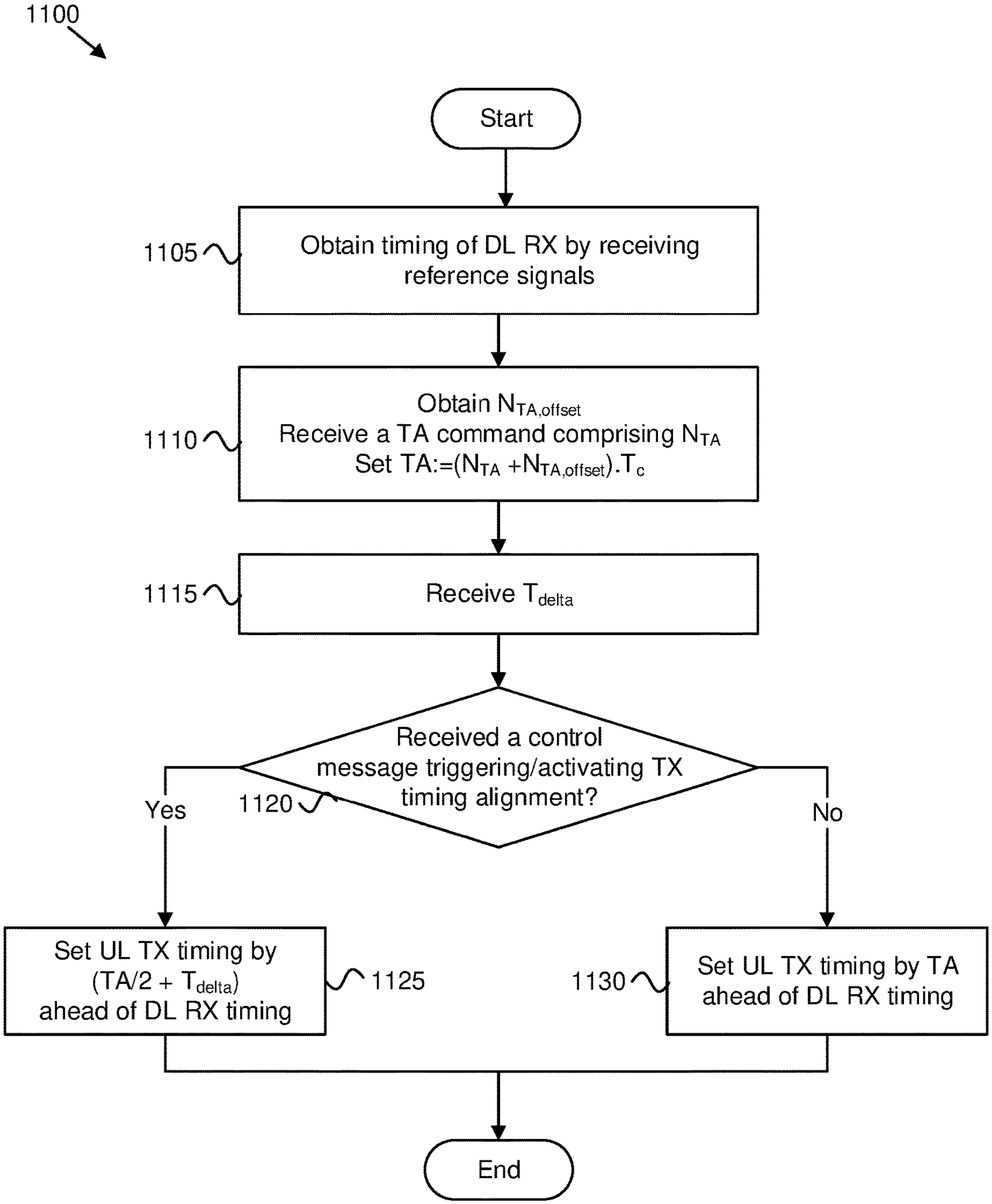
FIG. 11 is a block diagram illustrating one example embodiment of a method for TX timing alignment at an IAB node (N2)

FIG. 11 is a block diagram illustrating one example embodiment of a method 1100 for TX timing alignment at an IAB node (N2). In the example embodiment, the IAB node obtains 1105 timing of DL RX by receiving reference signals such as synchronization signals, similar to the method specified for NR Rel-15. Then, the IAB node obtains 1110 the value of timing advance (TA) similar to the method specified for NR Rel-15. Next, the IAB node receives 1115 a value for $T_{delta}$, which can be similar to the method specified in IAB Rel-16. Then, the IAB node determines 1120 if a TX timing alignment mode is activated or triggered.

If the TX timing alignment mode is activated or triggered, the IAB node performs 1125 UL TX with a timing set to $(TA/2+T_{delta})$ ahead of the obtained DL RX timing. Otherwise, the IAB node performs 1130 UL TX with a default timing such as a timing set to TA ahead of the obtained DL RX timing, and the method 1100 ends.

In any of the embodiments discussed in this section, a linear function of $T_{delta}$ such as $(N_{delta}+T_{delta}\cdot G_{step})$ may be used instead of $T_{delta}$, where the additive term $N_{delta}$ and the multiplicative factor $G_{step}$ may be obtained by signaling or by a specification and may be different for different frequency ranges and/or subcarrier spacings.

By extension, any timing alignment parameter T in this disclosure may be signaled or applied by a linear function of the parameter such as N+T·G, where the additive term N and/or the multiplicative factor G may be obtained by signaling or by a specification and may be different for different frequency ranges and/or subcarrier spacings.

Any of the timing alignment methods and embodiments proposed in this disclosure may be associated, via a configuration or a control message signaling, with a timing advance group ("TAG") identifier ("ID"). Then, an IAB node employing the timing alignment method uses timing advance ("TA") parameters associated with the TAG ID when applying the timing alignment method.

Regarding configurations, timing alignment modes such as the TX timing alignment mode proposed earlier may be fully specified by the standard and the capabilities may be mandatory by the standards specification. Alternatively, a timing alignment mode may be configured by the IAB system, for example by an IAB-CU, in order to become operational. First and foremost, since Rel-16 IAB nodes only support Case-1 timing alignment, TX timing alignment at an IAB node may depend on a capability parameter associated with N1 and/or N2 that shows the node(s) are enhanced according to Rel-17+ specifications. The configurations may also depend on other capabilities such as multi-panel or simultaneous-operation capabilities, which may be signaled to the IAB-CU or stored in the system offline.

For example, when timings are aligned for transmission at N2, reception of signals in upstream and downstream may not be aligned at N1. In this case, N1 may possess a multi-panel capability or support multiple fast Fourier transform ("FFT") windows for communicating orthogonal frequency-division multiplexing ("OFDM") signals. Otherwise, it may be required by N1 to receive signals either from an upstream/parent node N0 or from a downstream/child node N2 at a time.

In order to satisfy this requirement, N1 may handle the matter by proper scheduling. For example, N1 may trigger or activate a TX timing alignment mode at N2 only for resources that do not overlap in the time domain with an upstream operation at N1 with a parent node N0 of its own. This can be realized, for example, by associating a control message that triggers or activates a TX timing alignment mode with a semi-persistent scheduling ("SPS") at N2 whose resources do not overlap in the time domain with an upstream operation at N1.

In the case that the requirement is not satisfied, N1 may handle the misalignment by implementation or perform signaling for reporting an error.

A timing alignment configuration can be associated with a resource set, a set of slots, and so on. This can be realized, for example, by referring to a timing alignment configuration ID in a resource set configuration, or by referring to a resource set configuration ID in a timing alignment mode configuration. In an embodiment, a timing alignment configuration is associated with a semi-persistent scheduling (SPS). This can be realized, for example, by referring to a timing alignment ID in an SPS-Config IE extension, or by referring to an SPS configuration ID such as an sps-ConfigIndex-r16 in a timing alignment configuration. Alternatively, an association may be signaled by an activation or triggering message as described later.

Based on the above capabilities and considerations, a timing alignment configuration may be sent to IAB nodes such as the IAB node N2 and/or a parent node N1. The configuration may comprise:

- a. an identifier (ID),
- b. a type of timing alignment, e.g., a TX timing alignment mode,
- c. a parameter indicating whether the configuration is default,
- d. a parameter indicating that the timing alignment is:
  - i. periodic or semi-static,
  - ii. semi-persistent, e.g., to be activated or deactivated by MAC-CE signaling,
  - iii. aperiodic, e.g., to be triggered by DCI signaling,
- e. parameters for the MAC-CE or DCI signaling, e.g., a bit-width,
- f. parameters for validity timing, e.g., a slot offset, a number of slots, or an expiration value for a timer,
- g. an association with a set of resources, a set of slots, a semi-persistent scheduling (SPS), etc.
- h. parameters for resolution and/or range of timing alignment parameters.

Regarding activation/deactivation and triggering, as described earlier, a control message may activate or trigger a TX timing alignment mode. The control message may be a MAC-CE message for activation of a semi-persistent configuration or triggering an aperiodic configuration. In either case, a starting time such as a slot offset is determined by the standard and/or by a configuration. The validity period is also determined by the standard and/or by a configuration.

Alternatively, a timer may be specified by the standard and/or configured by the system that indicates the TX timing alignment mode is enabled/active until the timer expires. Upon expiration of the validity of the activation/triggering message or upon receiving a deactivation message, the IAB node may switch to a default timing alignment mode, which can be the Case-1 timing alignment mode specified in IAB Rel-16 or another default mode by the standard or by a configuration.

A timing alignment activation/triggering message may also associate a timing alignment mode or configuration with a resource set or a semi-persistent scheduling. In this case, the message may comprise information of the timing alignment mode or configuration such as a first ID, information of a resource set or a semi-persistent scheduling such as a second ID, information of validity timing, and so on.

It should be noted that switching from one timing alignment mode to another timing alignment mode may cause issues in resource boundaries such as slot boundaries. For example, if an IAB node is performing a timing alignment that requires to start a slot/symbol later followed by another timing alignment requires to start a slot/symbol relatively earlier, at least one symbol at the boundary of timing alignment switching may be left with a duration shorter than a symbol duration by an interval larger than a cyclic prefix (CP). This can result in an erroneous symbol. This issue can be fixed by implementation, for example, by proper resource allocation in scheduling, resource availability indication, and so on. Alternatively, or additionally, a configuration or control message may determine a corresponding IAB node's behavior. Consider an example where a first slot with a first timing alignment occurs right before a second slot with a second timing alignment. Then, a configuration or control message may specify to neglect the last symbol of the first slot or the first symbol of the second slot. The node that receives the configuration or control message may, then, decline to transmit or receive a signal on the neglected symbol or treat the symbol as not available (NA).

Regarding timing alignment with dual connectivity, when an IAB node has multiple parents, for example in the case of dual connectivity ("DC"), timing alignment with one parent node may result in timing misalignment with another parent node. If an IAB node communicates with one parent node at a time, the IAB node is expected to perform timing alignment with that parent node. However, if an IAB node communicates with multiple parent nodes simultaneously, for example in an FDM scheme, then there should be mechanisms in place to ensure proper timing alignment with the parent nodes.

Consider the example that an IAB node N2 is connected to two parent nodes: a master node (MN) N1 and a secondary node (SN) N1'. In such an embodiment, N2 always follows timing alignment with N1. This can continue as long as a link between N2 and N1 is operational. Upon a radio link failure (RLF) between N2 and N1, N2 may switch to follow timing alignment with N1'.

In another embodiment, N2 maintains timing alignment configurations with both N1 and N1'. For example, N2 maintains different values of $T_{delta}$ and other timing alignment parameters associated with the link between N2 and any of N1 and N1'. In the case of timing alignment configured by the RRC, N2 may maintain separate configurations with each of N1 and N1', or it may maintain a same configuration and reuse it for the link with N1', possibly with different parameters such as $T_{delta}$.

In an embodiment where communications between N2–N1 and N2–N1' links are multiplexed in time, a guard symbol may be applied as explained earlier, i.e., a last symbol of a first slot or a first symbol of a second slot may be neglected of the two slots are consecutive and associated with communications with different parent nodes.

Figure 12A:
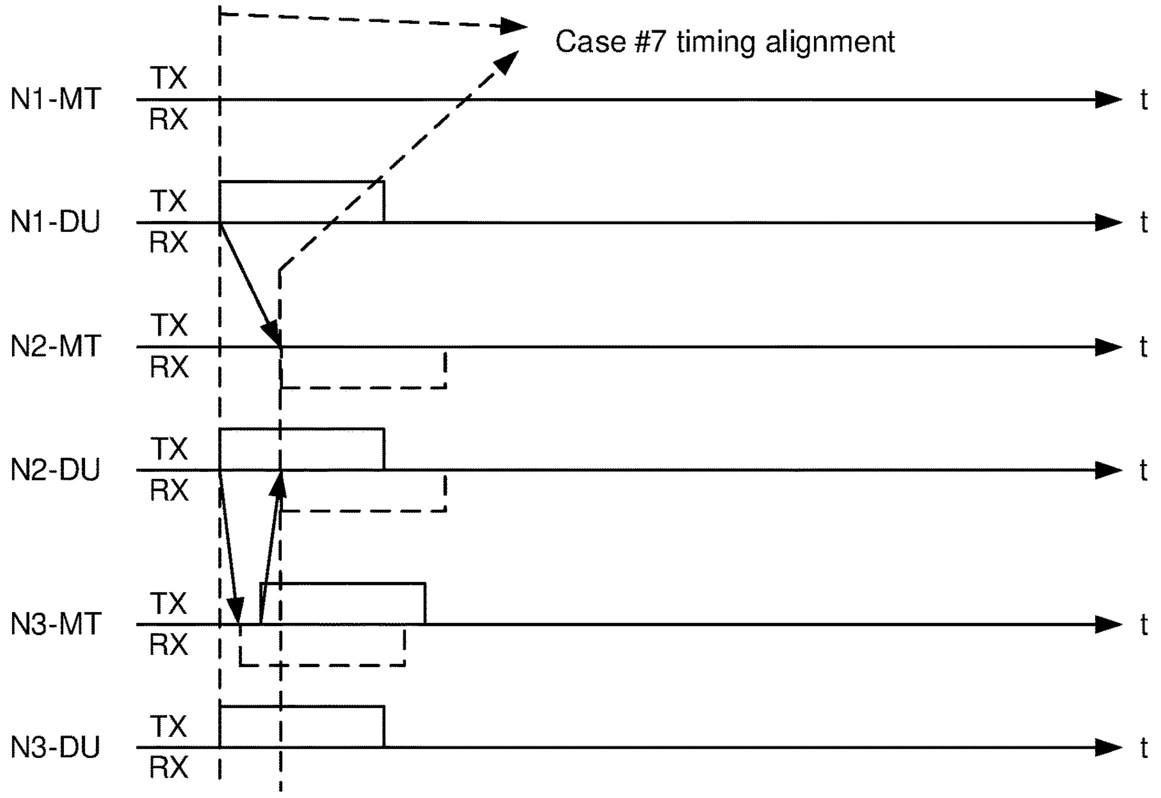
FIG. 12A is a diagram illustrating one embodiment of principle reception timing alignment for Case-7.
Figure 12B:
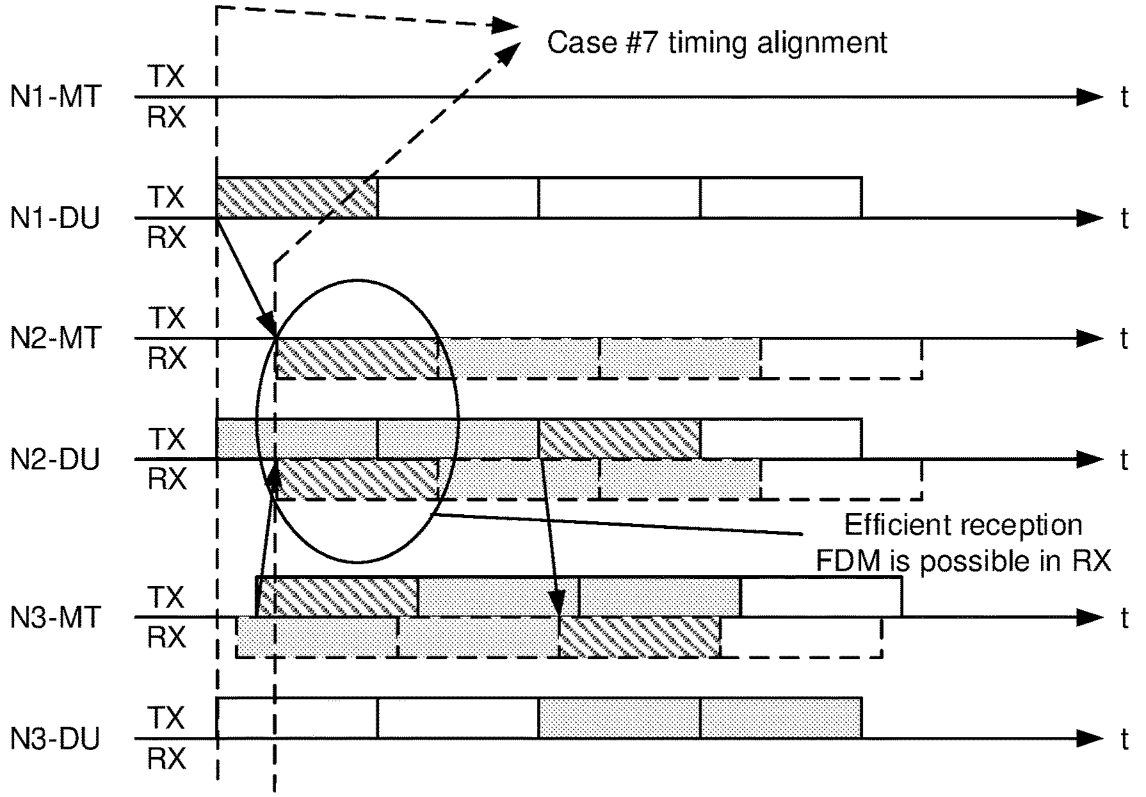
FIG. 12B is a diagram illustrating one embodiment of an example reception timing alignment for Case-7.

FIGS. 12A and 12B are diagrams illustrating one embodiment of reception timing alignment (Case-7): principle (12A) and example timeline (12B). Another method for timing alignment within an IAB node is to align simultaneous downlink and uplink receptions. This method is useful for realizing simultaneous receptions, for example in an FDM scheme, at an IAB node with a single antenna panel connected to a single RF chain and baseband processing. Since timings of downlink transmissions are expected to be aligned across IAB nodes (i.e., Case-1), this leads to what was called timing alignment Case-7 in the IAB study item.

Figure 13:
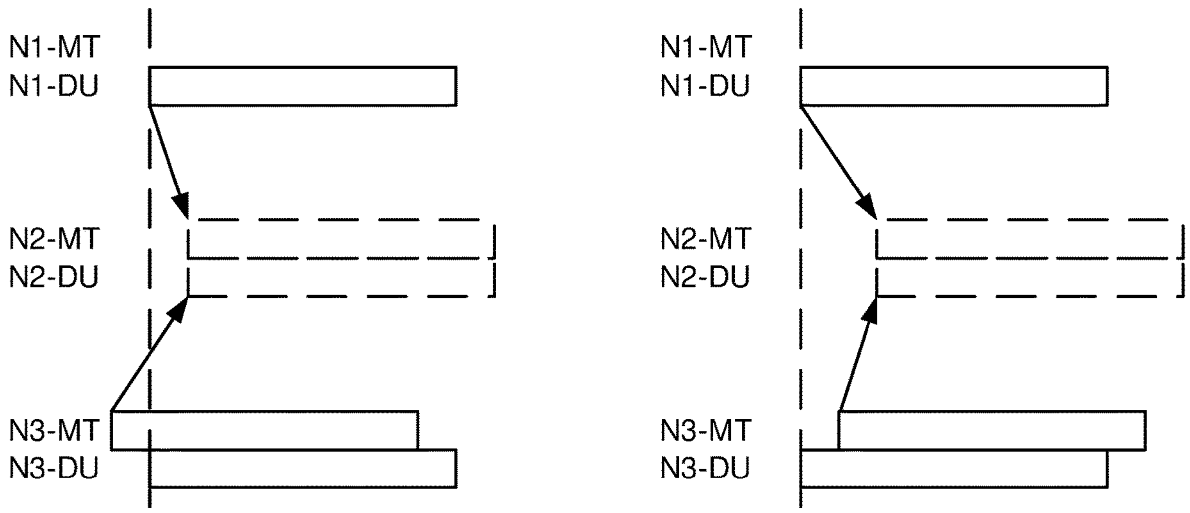
FIG. 13 is a diagram illustrating one embodiment of RX timing alignment by allowing negative TA.

FIG. 13 is a diagram illustrating one embodiment of RX timing alignment by allowing negative TA. In certain embodiments, Case-7 can be realized introducing a "negative TA." Essentially, if RX timing alignment is to be applied at N2, the timeline will be according to the following figure. The timing advance is positive in the example on the left while it is negative in the example on the right.

A method for realizing RX timing alignment for an IAB node may comprise the following steps. First, the IAB node obtains DL RX timing from a parent node and transmits timing advance (TA) and $T_{delta}$ to a child node according to NR Rel-15 and IAB Rel-16. Furthermore, the IAB node transmits an additional timing advance, which we abbreviate to ATA in this disclosure. Then, the child node sets its UL TX timing ahead of its DL RX timing by a value of ATA, TA+ATA, or $$\frac{TA}{2} + T_{delta} + ATA$$

in different embodiments. The methods for the IAB node and its child node can be summarized as follows.

Method for IAB node N2:

a. Obtain timing of DL RX ($T_{dl,rx}$) by receiving reference signals
b. Transmit a timing advance (TA) command
c. Transmit a value of $T_{delta}$
d. Transmit an additional timing advance (ATA) command
e. Receive downlink signals with timing $T_{dl,rx}$
f. Receive uplink signals with timing $T_{ul,rx}:=T_{dl,rx}$ Method for child node N3:

a. Receive timing advance (TA) command
b. Receive the value of $T_{delta}$
c. Receive an additional timing advance (ATA) command
d. Transmit uplink signals with timing advance of ATA or TA+ATA or $$\frac{TA}{2} + T_{delta} + ATA$$

Note that in the above methods:

a. processes for obtaining the DL TX timing alignment according to IAB Rel-16 (Case-1) are omitted for brevity;
b. the steps of obtaining TA and/or $T_{delta}$ may be omitted in the embodiments where those values are not added to the ATA in different embodiments.

In these methods, the reference signals may be synchronization signal and physical broadcast channel (SS/PBCH) blocks. TA is obtained by a method similar to NR Rel-15. That is, $TA=(N_{TA}+N_{TA,offset})\cdot T_c$, where $N_{TA}$ is an integer obtained by TA commands, $N_{TA,offset}$ is an integer offset determined by the standard/configuration, and $T_c$ is a time unit defined by the standard. In NR systems, we have $T_c=0.509$ ns.

The value of $T_{delta}$ may be signaled by a parent node, in this example by N1, according to IAB Rel-16. In some embodiments, a linear function of $T_{delta}$ such as $(N_{delta}+T_{delta}\cdot G_{step})$ may be used instead of $T_{delta}$, where the additive term $N_{delta}$ and the multiplicative factor $G_{step}$ may be obtained by signaling or by a specification and may be different for different frequency ranges and/or subcarrier spacings.

The child node N3 obtains a value of the additional/alternative timing advance $ATA=N_{ATA}\cdot T_c$, where $N_{ATA}$ is a parameter received from the IAB node N2. Possible values for $N_{ATA}$ may be positive, zero, or negative in general. The range and resolution of $N_{ATA}$ may be configured. A value of $N_{ATA}$ may be calculated based on a fixed or configurable table. A value of $N_{ATA}$ may be calculated as a summation of a first term and a second term, where the first term is a constant or a semi-statically configured variable while the second term is signaled dynamically.

We have the following embodiments for applying the value of ATA.

Embodiment A: Timing Alignment by ATA a. In an embodiment, the child node N3 applies a timing advance value of $ATA=N_{ATA}\cdot T_c$ directly, where $N_{ATA}$ is a parameter received from the IAB node N2.

Embodiment B: Timing Alignment by TA+ATA a. In another embodiment, the child node N3 applies a timing advance value of $ATA=N_{ATA}\cdot T_c$ as an additive term to the legacy timing advance value TA.

Embodiment C: Timing Alignment by $$\frac{TA}{2} + T_{delta} + ATA$$

a. In yet another embodiment, the child node N3 applies a timing advance value of $ATA=N_{ATA}\cdot T_c$ as an additive term to the DL TX timing as specified in IAB Rel-16 (Case-1).

In some embodiments, one of the Embodiments A, B, C may be determined by signaling.

As pointed out earlier, it is expected that an enhanced IAB system will be capable of applying different timing alignment modes. This will be explained with more details in the next sections. Meanwhile, we can augment the above methods with signaling that allows to enable or disable a timing alignment mode. The signaling can be through a MAC-CE message for semi-persistent activation or deactivation of the timing alignment mode, a downlink control information (DCI) message for triggering a timing alignment mode for a period, for example one or multiple slots, or other signaling.

Method for IAB node N2:

a. Obtain timing of DL RX ($T_{dl,rx}$) by receiving reference signals
b. Transmit a timing advance (TA) command
c. Transmit a value of $T_{delta}$
d. Transmit a control message to trigger/activate RX timing alignment (Case-7)
e. Transmit an additional timing advance (ATA) command
f. Receive downlink signals with timing $T_{dl,rx}$
g. Receive uplink signals with timing $T_{ul,rx}$:=$T_{dl,rx}$ Method for child node N3:

a. Receive timing advance (TA) command
b. Receive the value of $T_{delta}$
c. Receive a control message triggering/activating RX timing alignment (Case-7)
d. Receive an additional timing advance (ATA) command
e. Transmit uplink signals with timing advance of ATA or TA+ATA or $$\frac{TA}{2} + T_{delta} + ATA$$

Similar to the case of TX timing alignment, the control message triggering or activating the TX timing alignment mode may be a MAC-CE message, a DCI message, or a combination thereof.

In these methods, applying the RX timing alignment mode depends on receiving the control message that triggers or activates the mode. Therefore, the child node N3 may apply a default timing alignment mode for a resource/slot R such as a timing advance according to NR Rel-15 in the following cases:

a. The control message was not received.
b. The control message was received, but it is not associated to resource/slot R.
c. The control message was received, but it expired before transmission of resource/slot R because a timer associated with the control message expired.
d. The control message was received, but it expired because a deactivation control message was received afterwards. The deactivation control message may be a MAC-CE message, a DCI message, or a combination thereof.

Embodiments of the proposed method for a child node may be applicable to an enhanced UE as well.

It should be noted that in an IAB system, the downstream communications/operations (i.e., DL TX and/or UL RX) are performed by an IAB-DU in a parent IAB node or IAB donor, and the upstream communications/operations (i.e., DL RX and/or UL TX) are performed by an IAB-MT in an IAB node or by an enhanced UE.

Figure 14:
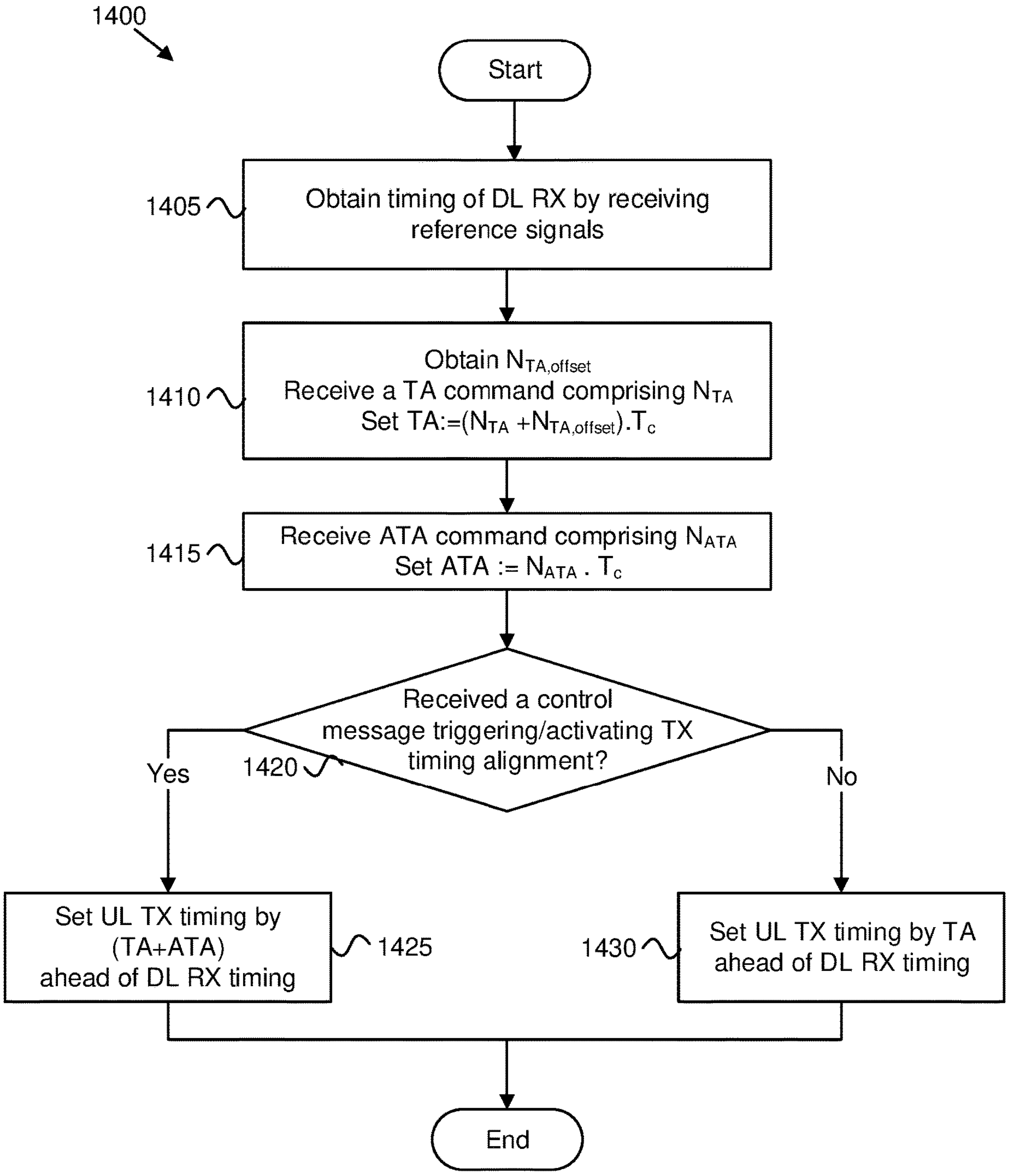
FIG. 14 is a block diagram illustrating one example embodiment of a method for RX timing alignment at a child node (N3) or enhanced UE.

FIG. 14 is a block diagram illustrating one example embodiment of a method for RX timing alignment at a child node (N3) or enhanced UE. Application of the ATA by a child node (CN) or an enhanced UE (eUE) in this example is assumed according to Embodiment B.

In this example, the method 1400 begins and the CN/eUE obtains 1405 timing of DL RX by receiving reference signals such as synchronization signals, similar to the method specified for NR Rel-15. Then, the CN/eUE obtains 1410 the value of timing advance (TA) similar to the method specified for NR Rel-15. Next, the CN/eUE receives 1415*a* value of additional timing advance (ATA).

Then, the CN/eUE determines 1420 if an RX timing alignment mode is activated or triggered. If the RX timing alignment mode is activated or triggered, the CN/eUE performs 1425 UL TX with a timing set to (TA+ATA) ahead of the obtained DL RX timing. Otherwise, the CN/eUE performs 1430 UL TX with a default timing such as a timing set to TA ahead of the obtained DL RX timing, and the method 1400 ends.

In any of the embodiments discussed in this section, a linear function of $T_{delta}$ such as ($N_{delta}+T_{delta}\cdot G_{step}$) may be used instead of $T_{delta}$, where the additive term $N_{delta}$ and the multiplicative factor $G_{step}$ may be obtained by signaling or by a specification and may be different for different frequency ranges and/or subcarrier spacings.

By extension, any timing alignment parameter T in this disclosure may be signaled or applied by a linear function of the parameter such as N+T·G, where the additive term N and/or the multiplicative factor G may be obtained by signaling or by a specification and may be different for different frequency ranges and/or subcarrier spacings.

Any of the timing alignment methods and embodiments proposed in this disclosure may be associated, via a configuration or a control message signaling, with a timing advance group ("TAG") identifier ("ID"). Then, an IAB node employing the timing alignment method uses timing advance ("TA") parameters associated with the TAG ID when applying the timing alignment method.

Regarding configurations, timing alignment modes such as the RX timing alignment mode proposed earlier may be fully specified by the standard and the capabilities may be mandatory by the standards specification. Alternatively, a timing alignment mode may be configured by the IAB system, for example by an IAB-CU, in order to become operational. First and foremost, since Rel-16 IAB nodes only support Case-1 timing alignment, RX timing alignment at an IAB node may depend on a capability parameter associated with N2 and/or N3 (or an enhanced UE) that shows the node(s) are enhanced according to Rel-17+ specifications. The configurations may also depend on other capabilities such as multi-panel or simultaneous-operation capabilities, which may be signaled to the IAB-CU or stored in the system offline.

For example, when timings are aligned for reception at N2, transmission of signals in upstream and downstream may not be aligned at N3. In this case, N3 may possess a multi-panel capability or support multiple fast Fourier transform (FFT) windows for communicating orthogonal frequency-division multiplexing (OFDM) signals. Otherwise, it may be required by N3 to transmit signals either to an upstream/parent node N2 or to a downstream/child node (N4 or UE) at a time.

In order to satisfy this requirement, an RX timing alignment mode is triggered or activated by N2 only for resources that do not overlap in the time domain with a downstream operation at N3 with a child node N4 of its own or a UE. For example, N2 may trigger or activate an RX timing alignment mode for resources that are indicated not available (NA). In this case, N3 is not expected to receive a control message from N2 that triggers or activates an RX timing alignment mode for hard resources or soft resources that are indicated available by an availability indication (AI) message from N2. In an embodiment, upon reception of a control message that triggers or activates an RX timing alignment for resources, N3 treats the said resource as if they are not available (NA).

Alternatively, N3 may handle the matter by proper scheduling. This can be realized, for example, by associating a control message from N2 that triggers or activates an RX timing alignment mode with a semi-persistent scheduling (SPS), such that N3 can avoid an overlap by proper scheduling.

In the case that the requirement is not satisfied, N3 may handle the misalignment by implementation or perform signaling for reporting an error.

A timing alignment configuration can be associated with a resource set, a set of slots, and so on. This can be realized, for example, by referring to a timing alignment configuration ID in a resource set configuration, or by referring to a resource set configuration ID in a timing alignment mode configuration. In an embodiment, a timing alignment configuration is associated with a semi-persistent scheduling (SPS). This can be realized, for example, by referring to a timing alignment ID in an SPS-Config IE extension, or by referring to an SPS configuration ID such as an sps-ConfigIndex-r16 in a timing alignment configuration. Alternatively, an association may be signaled by an activation or triggering message as described later.

Based on the above capabilities and considerations, a timing alignment configuration may be sent to IAB nodes such as the IAB node N2 and/or a child node N3. The configuration may comprise:

a. an identifier (ID),
b. a type of timing alignment, e.g., an RX timing alignment mode,
c. a parameter indicating whether the configuration is default,
d. a parameter indicating that the timing alignment is:
e. periodic or semi-static,
f. semi-persistent, e.g., to be activated or deactivated by MAC-CE signaling,
g. aperiodic, e.g., to be triggered by DCI signaling,
h. parameters for the MAC-CE or DCI signaling, e.g., a bit-width,
i. parameters for validity timing, e.g., a slot offset, a number of slots, or an expiration value for a timer,
j. an association with a set of resources, a set of slots, a semi-persistent scheduling (SPS), etc.
k. parameters for resolution and/or range of timing alignment parameters.

Regarding activation/deactivation and triggering, as described earlier, a control message may activate or trigger an RX timing alignment mode. The control message may be a MAC-CE message for activation of a semi-persistent configuration or triggering an aperiodic configuration. In either case, a starting time such as a slot offset is determined by the standard and/or by a configuration. The validity period is also determined by the standard and/or by a configuration.

Alternatively, a timer may be specified by the standard and/or configured by the system that indicates the RX timing alignment mode is enabled/active until the timer expires. Upon expiration of the validity of the activation/triggering message or upon receiving a deactivation message, the IAB node may switch to a default timing alignment mode, which can be the Case-1 timing alignment mode specified in IAB Rel-16 or another default mode by the standard or by a configuration.

A timing alignment activation/triggering message may also associate a timing alignment mode or configuration with a resource set or a semi-persistent scheduling. In this case, the message may comprise information of the timing alignment mode or configuration such as a first ID, information of a resource set or a semi-persistent scheduling such as a second ID, information of validity timing, and so on.

It should be noted that switching from one timing alignment mode to another timing alignment mode may cause issues in resource boundaries such as slot boundaries. For example, if an IAB node is performing a timing alignment that requires to start a slot/symbol later followed by another timing alignment requires to start a slot/symbol relatively earlier, at least one symbol at the boundary of timing alignment switching may be left with a duration shorter than a symbol duration by an interval larger than a cyclic prefix (CP). This can result in an erroneous symbol. This issue can be fixed by implementation, for example, by proper resource allocation in scheduling, resource availability indication, and so on. Alternatively, or additionally, a configuration or control message may determine a corresponding IAB node's behavior. Consider an example where a first slot with a first timing alignment occurs right before a second slot with a second timing alignment. Then, a configuration or control message may specify to neglect the last symbol of the first slot or the first symbol of the second slot. The node that receives the configuration or control message may, then, decline to transmit or receive a signal on the neglected symbol or treat the symbol as not available (NA).

Figure 15:
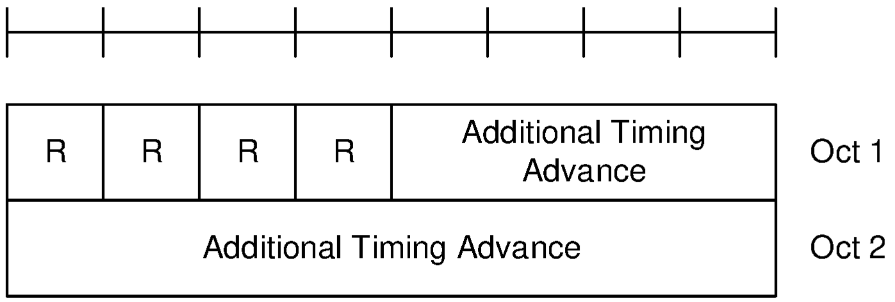
FIG. 15 is a diagram illustrating an example of additional timing advance command for timing alignment in integrated access and backhaul.

FIG. 15 is a diagram illustrating an example of additional timing advance command. The additional timing advance command may be a MAC-CE message. In this example, the MAC-CE message comprises two octets from which 12 bits are used for a value of $N_{ATA}$ and 4 bits are reserved ("R"). The standard may specify a number of octets, a number of bits for $N_{ATA}$, a number of reserved bits, a multiplicative factor and/or an additive term to calculate an ATA value, and/or how to apply the ATA value according to Embodiment A, Embodiment B, or Embodiment C as described earlier. The value of $N_{ATA}$ may be represent a signed integer to allow negative values for an ATA. The additional timing advance command MAC CE may be assigned with a separate logical channel identity ("LCID") value.

Regarding omitting and shifting symbols, it was shown earlier that, depending on propagation delays, a timing advance value for applying an RX timing alignment at a parent node may be negative. A negative timing advance is essentially a delayed UL TX with respect to a DL RX timing. Delaying the transmission of a slot may lead to a conflict with the next slot, especially if the delay exceeds a CP duration.

Let D denote the positive delay when the timing advance is negative, e.g., D=−ATA and D=−(TA+ATA), respectively, for "Embodiment A" and "Embodiment B" as described earlier.

In an embodiment, in the case of a negative timing advance by a child node N3, it may omit transmission of the last symbol. In the case of a delay longer than a symbol duration, N3 may omit transmission of $X=\lceil D/T_{sym} \rceil$ symbols, where $T_{sym}$, denotes the duration of a symbol including the CP.

In another embodiment, N3 omits transmission of the last symbol(s) only if it conflicts with an operation in next slot. Otherwise, it transmits the last symbol(s).

It may be undesirable to apply a negative timing advance, for example for compatibility reasons. Therefore, in an embodiment, a child node N3 may apply a positive timing advance $T_{sym}$−D, if D is not larger than a symbol duration $T_{sym}$, and shift channels and signals scheduled in the slot by one symbol duration later with respect to the start time of the slot. This shifting is essentially a delay of one symbol duration in order to correct reception timing at the IAB node N2. Since each symbol is delayed by one symbol duration, the last symbol of the slot may be omitted.

It is crucial to note that when signals are shifted by one symbol, the symbol indices used for computing the signals such as sounding reference signals ("SRS") must take the original symbol index values, i.e., the values before shifting. For example, for an SRS configured on symbol with index $\ell$, the symbol index used for SRS computations is still $\ell$, but the symbol used for transmission of the SRS is $\ell+1$. As mentioned earlier, the SRS transmission may be omitted in this example if $\ell$ is the index of the last symbol in the slot.

In the case that D is larger than a symbol duration $T_{sym}$, the proposed shifting method may be applied with X symbols rather than 1 symbol, where $X=\lceil D/T_{sym}\rceil$. In an alternative embodiment, a child node N3 may apply a positive timing advance $X \cdot T_{sym}$−D and shift channels and signals scheduled in the slot by X symbol durations later with respect to the start time of the slot. Since each symbol is delayed by X symbol durations, the last X symbols of the slot may be omitted. Similar to the special case described earlier, the symbol indices used for computing the signals such as sounding reference signals (SRS) must take the original symbol index values, i.e., the values before shifting. For example, for an SRS configured on symbol with index $\ell$, the symbol index used for SRS computations is still $\ell$, but the symbol used for transmission of the SRS is $\ell$+X. The SRS transmission may be omitted in this example if $\ell$+X falls beyond the slot boundary.

The process of converting a negative timing alignment to a positive timing alignment plus shifting may be handled by the IAB node N2 or the child node N3. The different embodiments are described below.

Figure 16:
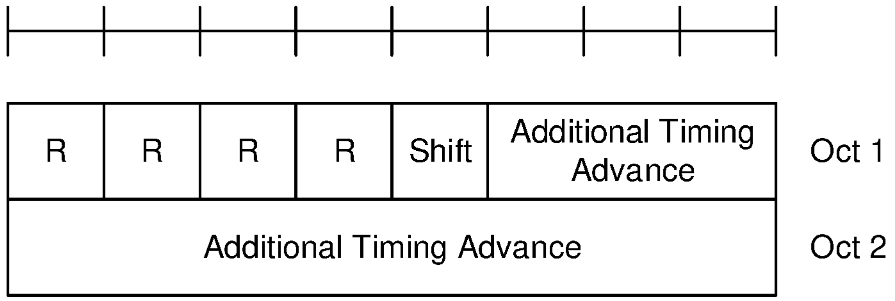
FIG. 16 is a diagram illustrating one example of additional timing advance command with a symbol shifting indication for timing alignment in integrated access and backhaul.

FIG. 16 is a diagram illustrating one example of additional timing advance command with a symbol shifting indication. In this embodiment, N2 ensures that the timing advance provided to the child node N3 is always nonnegative. In the case that a negative timing advance is needed, e.g., ATA is negative in "Embodiment A," N2 sends a positive timing advance value of $T_{sym}$+ATA along an indication to shift the symbols by one symbol duration. N3 may use a MAC-CE message as shown in FIG. 16.

In this example, N3 applies a positive timing advance according to the command. Furthermore, N3 shifts the symbols in a slot as described earlier if Shift='1'.

In the case of shifting for X symbols, N2 sends a positive timing advance value of $X \cdot T_{sym}$+ATA along an indication of a number of symbols X by which N3 should shift the symbols. In this case, the parameter shift may occupy more than one bit and represent the value of X.

In some embodiments, N3 is not expected to apply a negative timing advance value and applies a timing advance of zero if the timing advance value computed according to Embodiment A, Embodiment B, or Embodiment C is negative.

Figure 17:
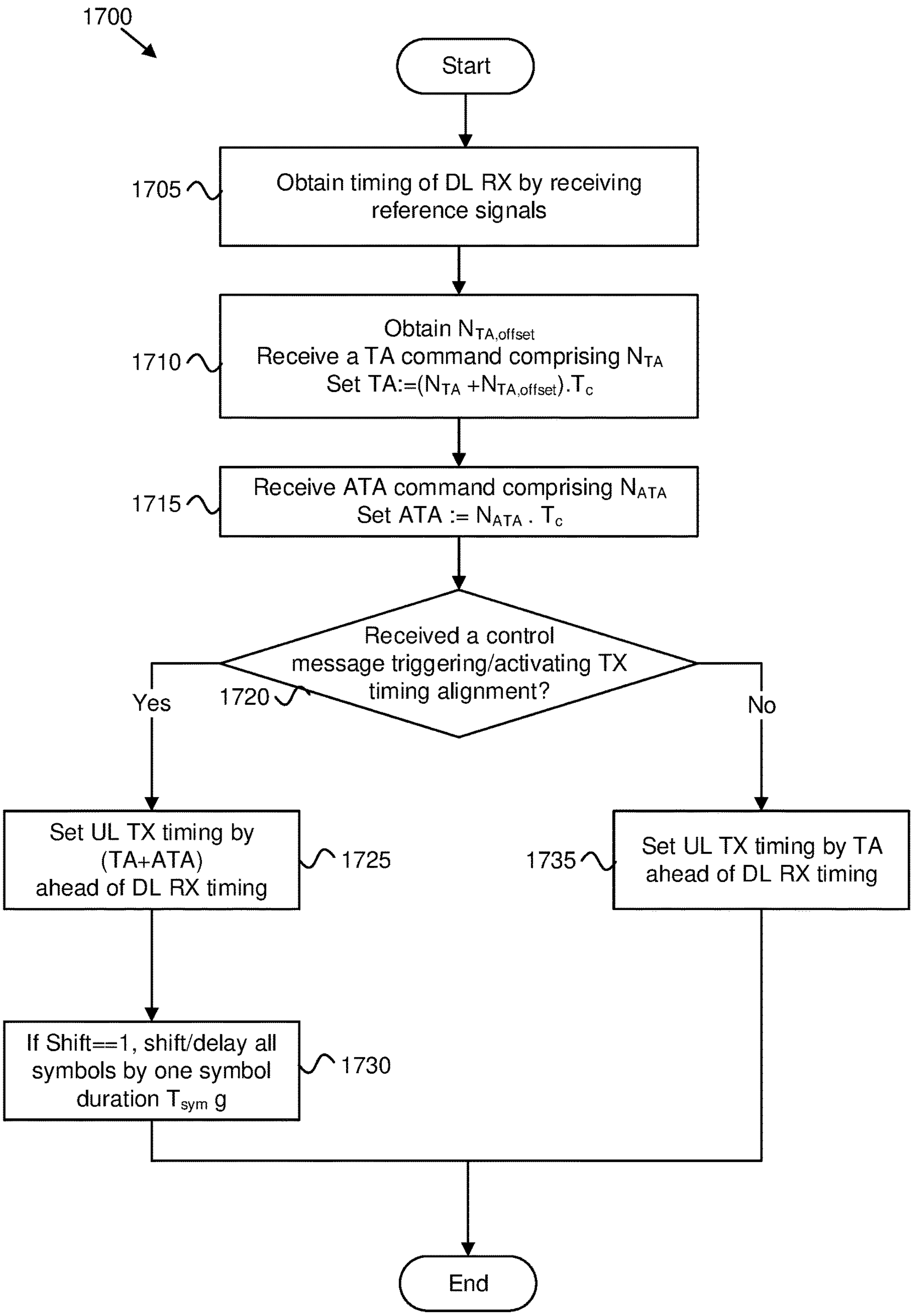
FIG. 17 is a block diagram illustrating one example embodiment of a method for RX timing alignment with symbol shifting at a child node (N3) or enhanced UE—conversion at N2.

FIG. 17 is a block diagram illustrating one example embodiment of a method for RX timing alignment with symbol shifting at a child node (N3) or enhanced UE—conversion at N2. The method may be substantially similar to the method depicted in FIG. 14, e.g., an example embodiment of the proposed method with "Conversion at N2", with an additional step 1730 for shifting for one symbol. Application of the ATA by a child node ("CN") or an enhanced UE (eUE) in this example is assumed according to Embodiment B.

In this example, the method 1700 begins and the CN/eUE obtains 1705 timing of DL RX by receiving reference signals such as synchronization signals, similar to the method specified for NR Rel-15. Then, the CN/eUE obtains 1710 the value of timing advance ("TA") similar to the method specified for NR Rel-15. Next, the CN/eUE receives 1715 a value of additional timing advance ("ATA").

Then, the CN/eUE determines 1720 if an RX timing alignment mode is activated or triggered. If the RX timing alignment mode is activated or triggered, the CN/eUE performs 1725 UL TX with a timing set to (TA +ATA) ahead of the obtained DL RX timing and if the shift==1, the CN/eUE shifts/delays 1730 all symbols by one symbol duration. Otherwise, the CN/eUE performs 1735 UL TX with a default timing such as a timing set to TA ahead of the obtained DL RX timing, and the method 1700 ends.

Figure 18:
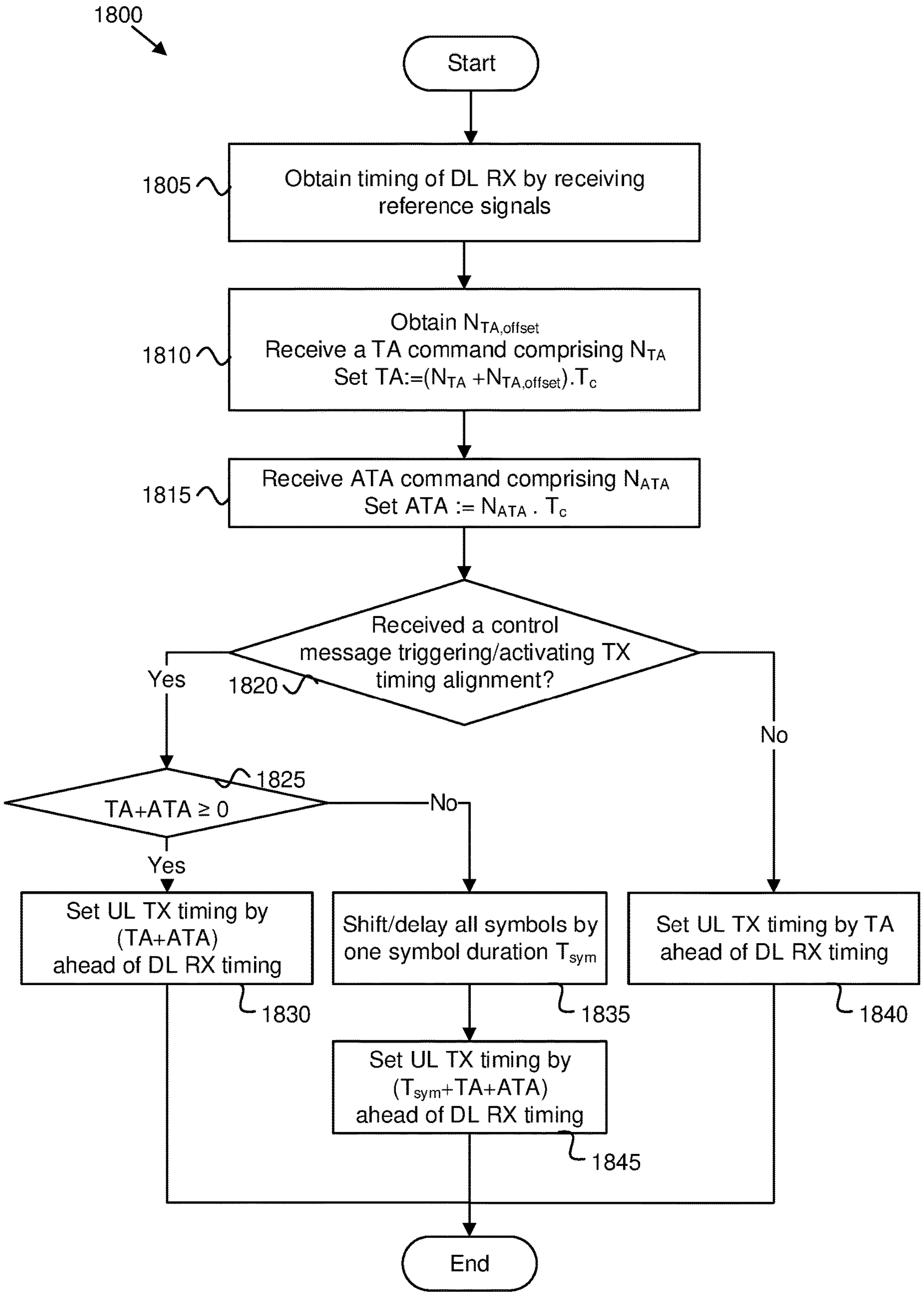
FIG. 18 is a block diagram illustrating one example embodiment of a method for RX timing alignment with symbol shifting at a child node (N3) or enhanced UE—conversion at N3.

FIG. 18 is a block diagram illustrating one example embodiment of a method for RX timing alignment with symbol shifting at a child node (N3) or enhanced UE—conversion at N3. In this embodiment, N2 transmits a value of additional timing advance that may result in a negative timing advance value as computed by N3 according to Embodiment A, Embodiment B, or Embodiment C. Then, N3 applies a timing advance of $T_{sym}$−D and shifts the symbols by one symbol duration as described earlier. In the case that D is larger than a symbol duration $T_{sym}$, N3 applies a timing advance of $X \cdot T_{sym}$ −D and shifts the symbols by X symbols as described earlier.

The figure depicts an example embodiment of the proposed method with "Conversion at N3" and shifting for one symbol. Application of the ATA by a child node ("CN") or an enhanced UE ("eUE") in this example is assumed according to Embodiment B.

In this example, the method 1800 begins and the CN/eUE obtains 1805 timing of DL RX by receiving reference signals such as synchronization signals, similar to the method specified for NR Rel-15. Then, the CN/eUE obtains 1810 the value of timing advance ("TA") similar to the method specified for NR Rel-15. Next, the CN/eUE receives 1815 a value of additional timing advance ("ATA").

Then, the CN/eUE determines 1820 if an RX timing alignment mode is activated or triggered. If the RX timing alignment mode is activated or triggered, the CN/eUE determines 1825 if TA+ATA≥0. If so, the CN/eUE performs 1830 sets the UL TX timing by (TA+ATA) ahead of DL RX timing. Otherwise, the CN/eUE performs 1835 a shift/delay for all symbols by one symbol duration. The CN/eUE then sets 1845 UL TX timing by ($T_{sym}$+TA+ATA) ahead of DL RX timing. Otherwise, the CN/eUE performs 1430 UL TX with a default timing such as a timing set to TA ahead of the obtained DL RX timing, and the method 1800 ends.

Regarding timing alignment with dual connectivity, when an IAB node has multiple parents, for example in the case of dual connectivity ("DC"), timing alignment with one parent node may result in timing misalignment with another parent node. If an IAB node communicates with one parent node at a time, the IAB node is expected to perform timing alignment with that parent node. However, if an IAB node communicates with multiple parent nodes simultaneously, for example in an FDM scheme, then there should be mechanisms in place to ensure proper timing alignment with the parent nodes.

Consider the example that a child node N3 is connected to two IAB nodes: a master node ("MN") N2 and a secondary node ("SN") N2'.

In an embodiment, N3 always follows timing alignment with N2. This can continue as long as a link between N3 and N2 is operational. Upon a radio link failure ("RLF") between N3 and N2, N3 may switch to follow timing alignment with N2'.

In another embodiment, N3 maintains timing alignment configurations with both N2 and N2'. For example, N3 maintains different values of ATA and other timing alignment parameters associated with the link between N3 and any of N2 and N2'. In the case of timing alignment configured by the RRC, N3 may maintain separate configurations with each of N2 and N2', or it may maintain a same configuration and reuse it for the link with N2', possibly with different parameters such as ATA.

In an embodiment where communications between N3–N3 and N3–N2' links are multiplexed in time, a guard symbol may be applied as explained earlier, i.e., a last symbol of a first slot or a first symbol of a second slot may be neglected of the two slots are consecutive and associated with communications with different parent nodes.

Regarding obtaining the value of ATA, the IAB node N2 acquires initial UL Rx timing and conventional timing advance (TA) information (equivalently, estimating propagation delay) from a received PRACH preamble when the child-node N3 performs random access procedure. The IAB-node N2 uses the estimated propagation delay (e.g., obtained from PRACH preamble detection) and subsequently received UL signals (e.g., PUSCH DMRS) from the child-node N3 to further align UL Rx timing to a reference UL timing. The conventional TA value is calculated based on the reference UL Rx timing, $T_{ul,rx}$, which is set to $T_{dl,tx}$.

When the timing alignment scheme, Case-7, is enabled for the IAB-node N2, the IAB-node N2 may set the reference UL Rx timing $T_{ul,rx}$ to the DL Rx timing $T_{dl,rx}$. The ATA is calculated based on the reference UL Rx timing $T_{ul,rx}$ set to $T_{dl,rx}$.

Regarding unified timing alignment framework, it can be seen thus far that the proposed timing alignment methods for TX and RX timing alignment modes may have commonalities in terms of configurations, signaling, and behavior. In this section, we provide a unified timing alignment framework that can be employed for different timing alignment modes.

Figure 19:
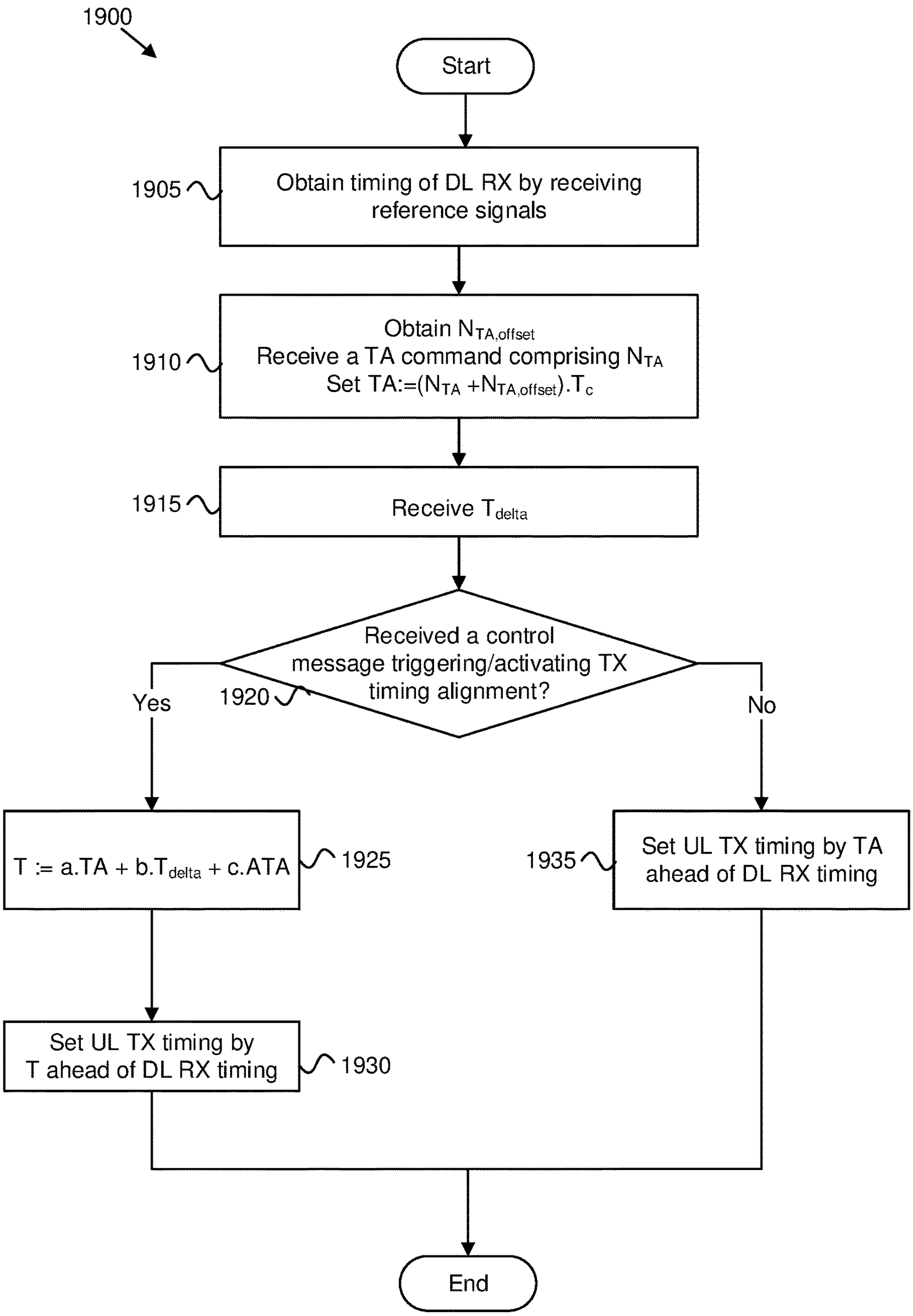
FIG. 19 is a block diagram illustrating one example embodiment of a method for a unified timing alignment at an IAB node.
Figure 20:
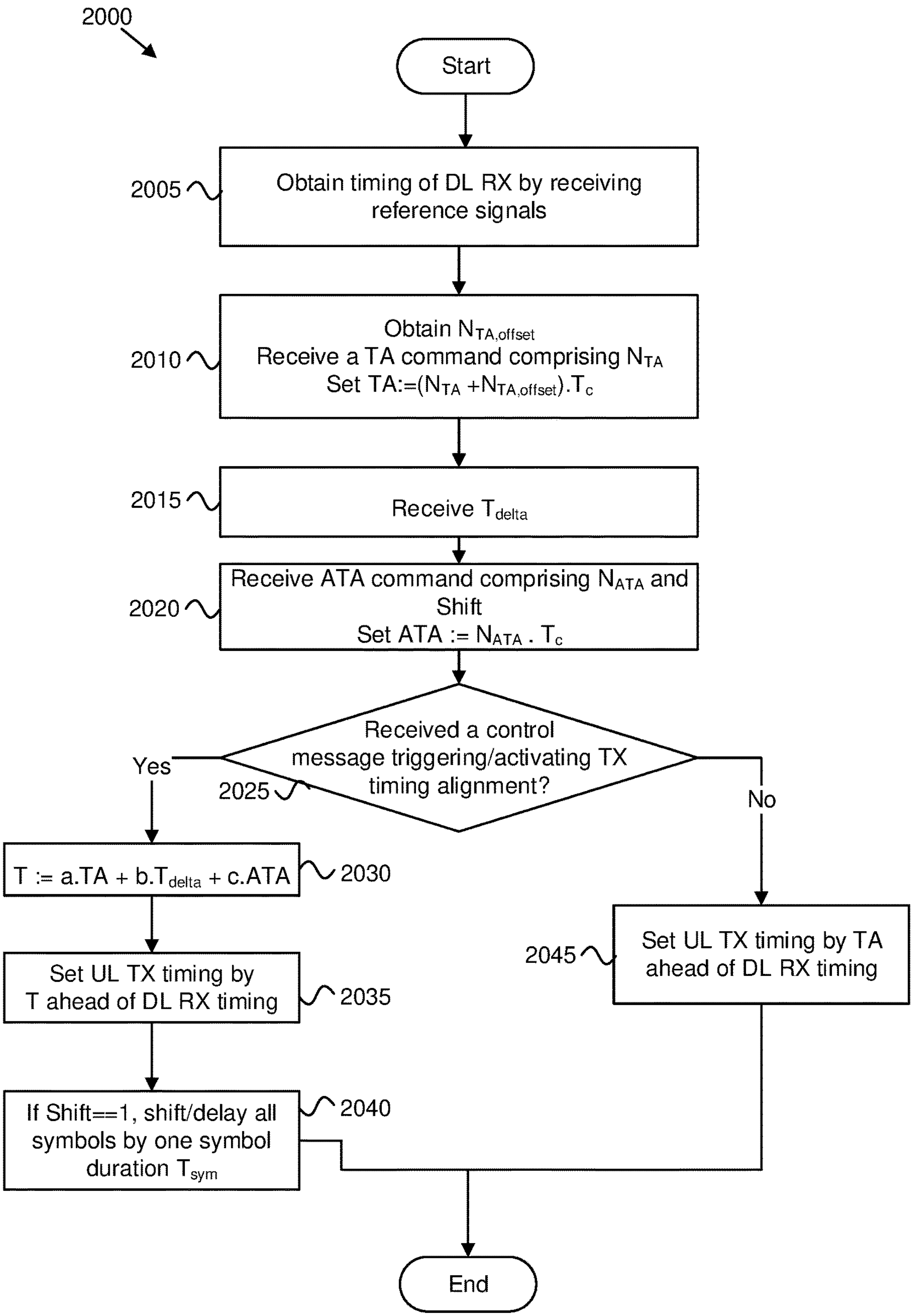
FIG. 20 is a block diagram illustrating one example embodiment of a method for a unified timing alignment at an IAB node with symbol shifting and conversion at a parent node of the IAB node.
Figure 21:
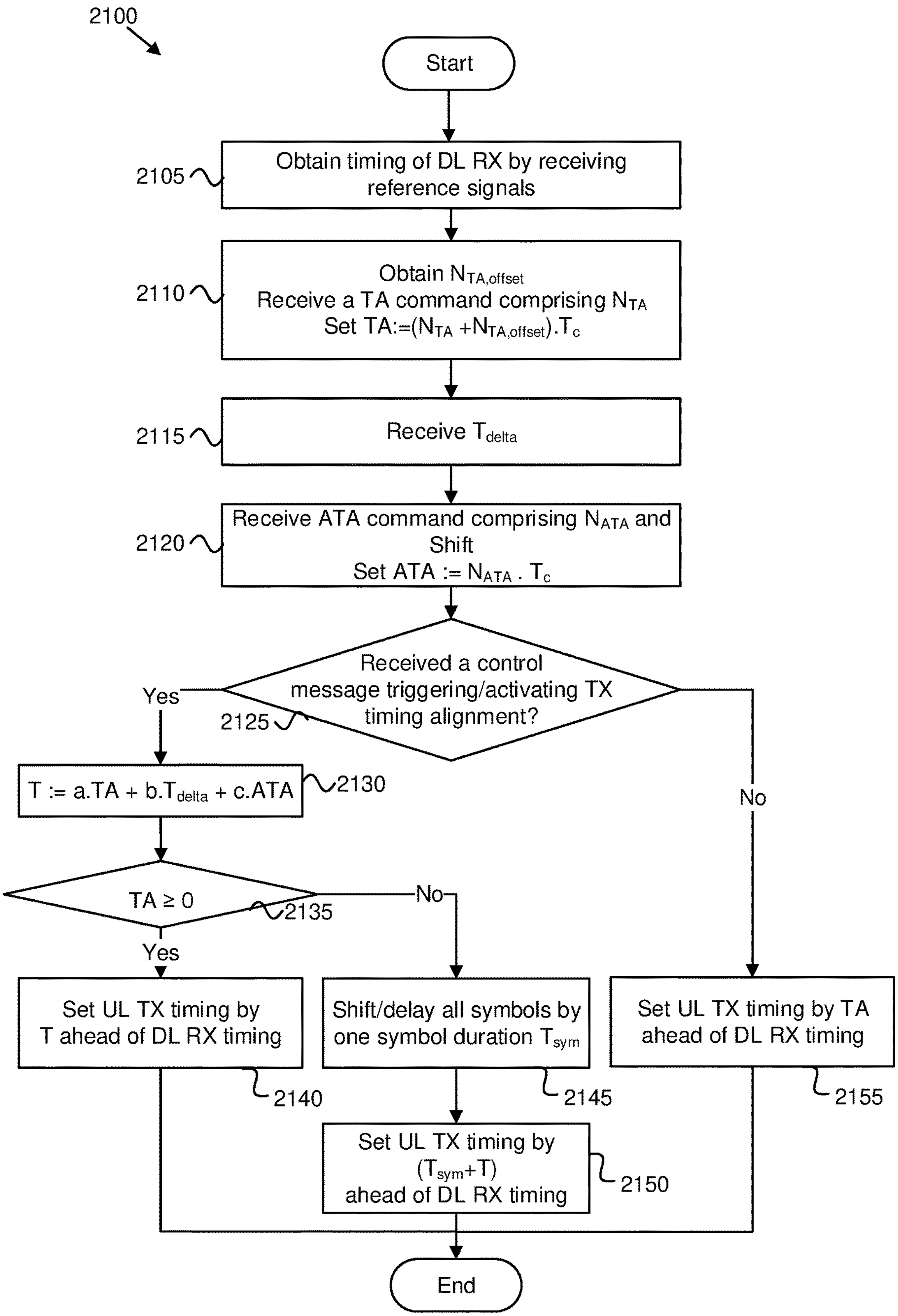
FIG. 21 is a block diagram illustrating one example embodiment of a method for a unified timing alignment at an IAB node with symbol shifting and conversion at the IAB node.

The methods proposed previously can be extended to a unified timing alignment method such as the example embodiments depicted in FIGS. 19-21. FIG. 19 is a block diagram illustrating one example embodiment of a method for a unified timing alignment at an IAB node.

In this example, the method 1900 begins and the CN/eUE obtains 1905 timing of DL RX by receiving reference signals such as synchronization signals, similar to the method specified for NR Rel-15. Then, the CN/eUE obtains 1910 the value of timing advance ("TA") similar to the method specified for NR Rel-15. Next, the CN/eUE receives 1915 a value of $T_{delta}$.

Then, the CN/eUE determines 1920 if an RX timing alignment mode is activated or triggered. If the RX timing alignment mode is activated or triggered, the CN/eUE determines 1925 $T:=a \cdot TA+b \cdot T_{delta}+c \cdot ATA$. The CN/eUE sets 1930 UL TX timing by T ahead of DL RX timing. Otherwise, the CN/eUE performs 1735 UL TX with a default timing such as a timing set to TA ahead of the obtained DL RX timing, and the method 1900 ends.

FIG. 20 is a block diagram illustrating one example embodiment of a method for unified timing alignment at an IAB node with symbol shifting and conversion at a parent node of the IAB node.

In this example, the method 2000 begins and the CN/eUE obtains 2005 timing of DL RX by receiving reference signals such as synchronization signals, similar to the method specified for NR Rel-15. Then, the CN/eUE obtains 2010 the value of timing advance (TA) similar to the method specified for NR Rel-15. Next, the CN/eUE receives 2015 a value of $T_{delta}$ and receives 2020 ATA command comprising $N_{ATA}$ and shift and sets $ATA:=N_{ATA} \cdot T_c$.

Then, the CN/eUE determines 2025 if an RX timing alignment mode is activated or triggered. If the RX timing alignment mode is activated or triggered, the CN/eUE determines 2030 $T:=a \cdot TA+b \cdot T_{delta}+c \cdot ATA$. The CN/eUE sets 2035 UL TX timing by T ahead of DL RX timing. The CN/eUE shifts/delays 2040 all symbols by one symbol duration $T_{sym}$. Otherwise, the CN/eUE performs 2045 UL TX with a default timing such as a timing set to TA ahead of the obtained DL RX timing, and the method 2000 ends.

FIG. 21 is a block diagram illustrating one example embodiment of a method for a unified timing alignment at an IAB node with symbol shifting and conversion at the IAB node.

In this example, the method 2100 begins and the CN/eUE obtains 2105 timing of DL RX by receiving reference signals such as synchronization signals, similar to the method specified for NR Rel-15. Then, the CN/eUE obtains 2110 the value of timing advance (TA) similar to the method specified for NR Rel-15. Next, the CN/eUE receives 2115 a value of $T_{delta}$ and receives 2120 ATA command comprising $N_{ATA}$ and shift and sets $ATA:=N_{ATA} \cdot T_c$.

Then, the CN/eUE determines 2125 if an RX timing alignment mode is activated or triggered. If the RX timing alignment mode is activated or triggered, the CN/eUE determines 2130 $T:=a \cdot TA+b \cdot T_{delta}+c \cdot ATA$. The CN/eUE determines 2135 if $TA \geq 0$. If so, the CN/eUE sets 2035 UL TX timing by T ahead of DL RX timing. Otherwise, the CN/eUE shifts/delays 2145 all symbols by one symbol duration $T_{sym}$, and sets 2150 UL TX timing by $(T_{sym}+T)$ ahead of DL RX timing. Otherwise, the CN/eUE performs 2155 UL TX with a default timing such as a timing set to TA ahead of the obtained DL RX timing, and the method 2100 ends.

In these examples, the IAB node may obtain the values of a, b, and c by a standard specification, a configuration and/or control signaling. Example values are provided in the table below.

TABLE 4

| a | b | c | Method |
|---|---|---|---|
| 1 | 0 | 0 | Legacy timing advance (possibly Case-1) |
| 0.5 | 1 | 0 | TX timing alignment (Case-6) |
| 0 | 0 | 1 | RX timing alignment (Case-7), Embodiment A |
| 1 | 0 | 1 | RX timing alignment (Case-7), Embodiment B |
| 0.5 | 1 | 1 | RX timing alignment (Case-7), Embodiment C |

Regarding configurations, a timing alignment mode may be fully specified by the standard and the capabilities may be mandatory by the standards specification. Alternatively, it may be configured by the IAB system, for example by an IAB-CU, in order to become operational. Below are examples of capabilities/features that can be reported to an IAB-CU by RRC messages (or stored in the system offline) for timing alignment configurations.

TABLE 5

| Capability/feature | Example field name | Description |
|---|---|---|
| IAB node indication and release number | iab-NodeIndication-r17 | An IAB node enhanced according to Rel-17+ may be capable of performing enhanced timing alignment methods. |
| Enhanced duplexing | IAB-Enh-Duplexing | In order to configure a TX timing alignment mode for an IAB node, an IAB-CU may require both the IAB node and any or all its parent nodes to report iab-NodeIndication-r17 or IAB-Enh-Duplexing equal to 'true'. The requirement may be extended to all the child nodes of the parent node(s). In order to configure an RX timing alignment mode for an IAB node, an IAB-CU may require both the IAB node and any or all of its child nodes to report iab-NodeIndication-r17 or IAB-Enh-Duplexing equal to 'true'. |
| TX timing alignment | IAB-TX-TimeAlignment | The IAB node is capable of performing TX timing alignment and/or signaling a TX timing alignment mode to a child node or enhanced UE. In order to configure a TX timing alignment mode for an IAB node, an IAB-CU may require both the IAB node and any or all its parent nodes to support the TX timing alignment mode. The requirement may be extended to all the child nodes of the parent node(s). |
| RX timing alignment | IAB-RX-TimeAlignment | The IAB node is capable of performing RX timing alignment and/or signaling an RX timing alignment mode to a child node or enhanced UE. In order to configure an RX timing alignment mode for an IAB node, an IAB-CU may require both the IAB node and any or all of its child nodes to support the RX timing alignment mode. |
| Negative timing advance allowed | IAB-Negative-TA-Allowed | The IAB node is capable of performing negative timing advance for an RX timing alignment at its parent node. |
| Symbol shifting allow | IAB-Symbol-Shift-Allowed | The IAB node is capable of shifting signals such as the sounding reference signals (SRS) for timing alignment. |
| Maximum number of timing alignment configurations | IAB-Max-Nrof-TimeAlignment | An IAB node may be capable of maintaining a limited number of configurations (associated with different modes, resource sets, SPSs, etc.) or parameters for timing alignment as indicated by this field. |
| Maximum number of FFT windows | Max-Nrof-FFT-Windows | An IAB-CU may require more than one FFT window at an IAB node in order to configure a TX timing alignment mode at its child node. Similarly, an IAB-CU may require more than one FFT window at an IAB node in order to configure an RX timing alignment mode at its parent node. |
| Number of antenna panels/ simultaneous operations | Nrof-Antenna-Panels | An IAB-CU may require more than one antenna panel at an IAB node in order to configure a TX timing alignment mode at its child node. Similarly, an IAB-CU may require more than one antenna panel at an IAB node in order to configure an RX timing alignment mode at its parent node. |

A timing alignment configuration from an IAB-CU may be an RRC IE comprising:

a. an identifier (ID),
b. a type of timing alignment, e.g., a TX or RX timing alignment mode,
c. a parameter indicating whether the configuration is default,
d. a parameter indicating that the timing alignment is:
e. periodic or semi-static,
f. semi-persistent, e.g., to be activated or deactivated by MAC-CE signaling,
g. aperiodic, e.g., to be triggered by DCI signaling,
h. parameters for the MAC-CE or DCI signaling, e.g., a bit-width,
i. parameters for validity timing, e.g., a slot offset, a number of slots, or an expiration value for a timer,
j. an association with a set of resources, a set of slots, a semi-persistent scheduling (SPS), etc.
k. parameters for resolution and/or range of timing alignment parameters,
l. a parameter indicating whether a negative timing advance is allowed,
m. parameters for indicating a behavior for shifting/delaying symbols, omitting symbols, a number of guard symbols, etc.

Regarding timing adjustment for cross-link interference ("CLI") management, CLI management was specified in NR Rel-16 in a separate work item ("WI") from IAB. The specification provides means for UE-UE interference measurement and reporting. A UE can be configured to monitor either or both of the following:

a. Sounding reference signals ("SRS") transmitted by another UE in order to measure a reference signal received power ("RSRP").
b. A set of time-frequency resources in order to measure a received signal strength indicator ("RSSI").

For the first case, in principle, the measuring UE may need to know the needs to be aligned with the UE transmitting the SRS. It was, however, concluded in the CLI Rel-16 WI that timing alignment for CLI measurements would be a matter of implementation with no specification in the standard. A main reason for that conclusion was the signaling overhead required to obtain timing information between two UEs.

Given that, unlike UEs, IAB node MTs are parts of the backhaul system, and transmit and receive signals for traffic from a potentially large number of UEs, CLI measurement accuracy is of significantly higher importance in order to ensure efficient communications in ultra-dense deployments. This motivates signaling for accurate timing alignment for CLI management across an IAB network.

CLI management is to be extended for IAB in future releases. Similar to UE-UE CLI management, MT-MT CLI management can be specified with minimum specification impact if timing alignment is left to implementation. However, the limitation for obtaining timing alignment information between UEs may not be applicable to MTs. An IAB node transmits synchronization signals (SS) in the downlink through its DU. If the relationship between timing of a DU and an MT in an IAB node is known, it provides a source of timing information for CLI management that is not available to UEs. Then, the remaining problem is that this timing information may be sufficient for receiving downlink signals from an IAB node, but not necessarily for uplink signals given that different downlink and uplink timing alignments are possible at the IAB node.

In this section, we propose systems and methods to address the problem of obtaining timing alignment for CLI in IAB networks. In the embodiments for acquiring timing alignment for receiving uplink reference signals, uplink timing acquisition is assisted by downlink timing information obtained from synchronization signals.

As background information, the SRS resources defined in Clause 6.4.1.4 of [4, TS 38.211] may be configured for SRS-RSRP measurement for CLI, as defined in Clause 5.1.19 of [7, TS 38.215]. The UE is not expected to measure SRS-RSRP with a subcarrier spacing other than the one configured for the active BWP confining the SRS resource. The UE is not expected to measure more than 32 SRS resources, and the UE is not expected to receive more than 8 SRS resources in a slot.

As used herein, SRS reference signal received power ("SRS-RSRP") may refer to a linear average of the power contributions (in [W]) of the resource elements carrying sounding reference signals ("SRS"). SRS-RSRP shall be measured over the configured resource elements within the considered measurement frequency bandwidth in the configured measurement time occasions.

For frequency range 1, the reference point for the SRS-RSRP shall be the antenna connector of the UE. For frequency range 2, SRS-RSRP shall be measured based on the combined signal from antenna elements corresponding to a given receiver branch. For frequency range 1 and 2, if receiver diversity is in use by the UE, the reported SRS-RSRP value shall not be lower than the corresponding SRS-RSRP of any of the individual receiver branches. It has applicability for RRC_CONNECTED intra-frequency.

As used herein, CLI Received signal strength indicator ("CLI-RSSI") may refer to CLI Received Signal Strength Indicator ("CLI-RSSI"), is defined as linear average of the total received power (in [W]) observed only in the configured OFDM symbols of the configured measurement time resource(s), in the configured measurement bandwidth from all sources, including co-channel serving and non-serving cells, adjacent channel interference, thermal noise etc.

For frequency range 1, the reference point for the RSSI shall be the antenna connector of the UE. For frequency range 2, CLI-RSSI shall be measured based on the combined signal from antenna elements corresponding to a given receiver branch. For frequency range 1 and 2, if receiver diversity is in use by the UE, the reported CLI-RSSI value shall not be lower than the corresponding CLI-RSSI of any of the individual receiver branches. It has applicability for RRC_CONNECTED intra-frequency.

Figure 22:
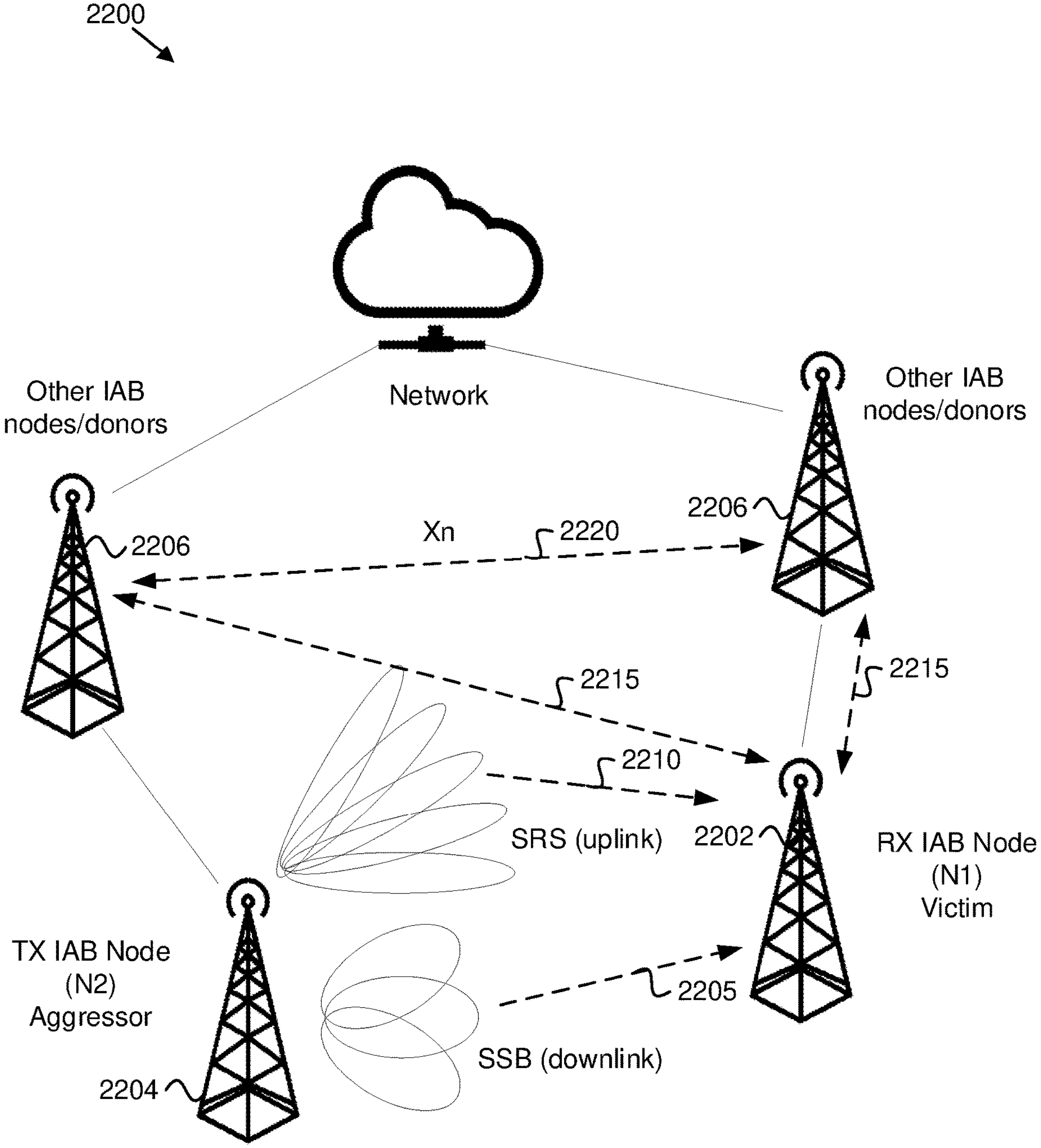
FIG. 22 is a diagram illustrating one example embodiment of a scenario of an IAB system.

FIG. 22 is a diagram illustrating one example embodiment of a scenario of an IAB system 2200. Consider the scenario where an IAB node N1 (victim) 2202 is configured to monitor an SRS resource from an IAB node N2 (aggressor) 2204, as illustrated in the figure. Uplink transmissions and downlink transmissions of N2 2204, particularly the transmissions containing SSBs (and/or CSI-RS (e.g., periodic CSI-RS such as TRS—Tracking RS)) and SRS, may be misaligned according to a timing alignment method as illustrated in in FIG. 23.

Figure 23:
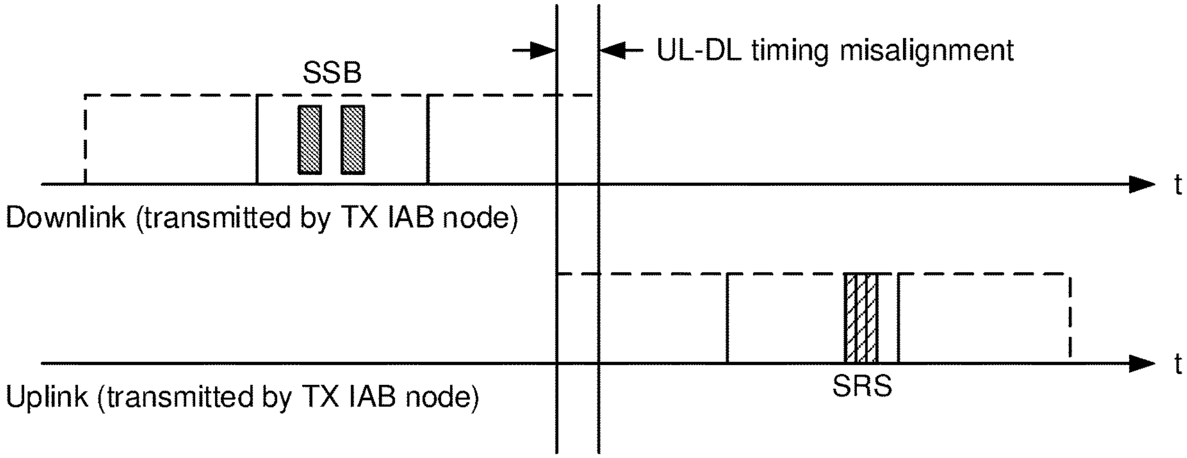
FIG. 23 is a diagram illustrating one example embodiment of timing misalignment between uplink and downlink transmissions.

FIG. 23 is a diagram illustrating one example embodiment of timing misalignment between uplink and downlink transmissions. Note that the uplink and downlink transmissions may or may not be on the same frequency according to a time-division duplex ("TDD") or a frequency-division duplex ("FDD") setting.

Referring to FIG. 22, N1 2202 may be interested to detect a synchronization signal block ("SSB") (and/or CSI-RS (e.g., periodic CSI-RS such as TRS—Tracking RS)) from N2 2204 in order to obtain downlink timing information ("DLTI") from N2 2204. An SSB may comprise synchronization signals ("SS"), such as a primary synchronization signal ("PSS") and a secondary synchronization signal ("SSS"), as well as a physical broadcast channel ("PBCH") containing system information. Furthermore, N1 2202 may be interested to obtain uplink timing information ("ULTI") from N2 2204 as well. Once N1 2202 obtains the latter, it can perform proper timing alignment to measure uplink signal power from N2 2204 such as an SRS-RSRP.

There are two cases regarding whether N1 2202 is configured with an SSB-based measurement timing configuration ("SMTC") that overlaps with an SSB transmission configuration ("STC") for N2 2204. If an N1-SMTC and an N2-STC overlap, N1 2202 can obtain DLTI from N2 2204. Then, N1 2202 should obtain information of timing misalignment between an N2 2204 downlink transmission containing SSBs and an N2 2204 uplink transmission containing an SRS that N1 2202 is configured to measure. For example, this information can be computed and transmitted by N2 2204.

Once N1 2202 obtains the misalignment information, it can apply the information and perform measurements on the SRS transmitted by N2 2204. In another example, N1 2202 may be configured with a measurement gap that overlaps with a CSI-RS (e.g., periodic CSI-RS such as TRS—Tracking RS) transmission configuration for N2 2204 to determine the DL TI from N2 2204.

Examples of the relationship between the timings are as follows:

a. For Case-1, compatible with IAB Rel-16 at the aggressor node N2:

i. SSB Tx timing at N2-DU:

$$T_{dl,tx} = T_{dl,rx} - \left(\frac{TA}{2} + T_{delta}\right)$$

ii. SRS Tx timing at N2-MT: $T_{ul,tx}=T_{dl,rx}-TA$ b. For Case-6 (TX timing aligned at N2):
   i. SSB Tx timing at N2-DU:

$$T_{dl,tx} = T_{dl,rx} - \left(\frac{TA}{2} + T_{delta}\right)$$

ii. SRS Tx timing at N2-MT:

$$T_{ul,tx} = T_{dl,rx} - \left(\frac{TA}{2} + T_{delta}\right)$$

c. For Case-7 (RX timing aligned at a parent node of N2), Embodiment A:
   i. SSB Tx timing at N2-DU:

$$T_{dl,tx} = T_{dl,rx} - \left(\frac{TA}{2} + T_{delta}\right)$$

ii. SRS Tx timing at N2-MT: $T_{ul,tx}=T_{dl,rx}-ATA$ d. For Case-7 (RX timing aligned at a parent node of N2), Embodiment B:
   i. SSB Tx timing at N2-DU:

$$T_{dl,tx} = T_{dl,rx} - \left(\frac{TA}{2} + T_{delta}\right)$$

ii. SRS Tx timing at N2-MT: $T_{ul,tx}=T_{dl,rx}-(TA+ATA)$ e. For Case-7 (RX timing aligned at a parent node of N2), Embodiment C:
   i. SSB Tx timing at N2-DU:

$$T_{dl,tx} = T_{dl,rx} - \left(\frac{TA}{2} + T_{delta}\right)$$

ii. SRS Tx timing at N2-MT:

$$T_{ul,tx} = T_{dl,rx} - \left(\frac{TA}{2} + T_{delta} + ATA\right)$$

Similar to the previous embodiments, $T_{delta}$ may appear as $(N_{delta}+T_{delta}\cdot G_{step})\cdot T_c$ in practice. Each equation determines a reference timing for a slot boundary, which means that for a given numerology with a slot duration $T_{slot}$, the ':=' sign for a transmission timing of a signal may mean that the start time of a slot containing the signal is equal to the right hand side of the equation or may be different by an integer multiple of $T_{slot}$. This may be, in general, applicable to all timing assignments in the present disclosure.

By comparing DL TX timing (for an SSB transmission) and UL TX timing (for an SRS transmission), it can be seen that:

a. For TX timing alignment (Case-6) at an aggressor node N2 2204, no dynamic signaling is required for CLI measurements at a victim node N1 2202 in addition to semi-static configuration information.

b. For IAB Rel-16 timing (Case-1) and RX timing alignment (Case-7) at an aggressor node N2 2204, additional signaling may be required to inform a victim node N1 2202 of a timing adjustment between the DL TX timing and UL TX timing of the aggressor node N2 2204.

Therefore, in an embodiment, a victim node N1 2202 may receive a control message such as a MAC-CE message or a DCI message from a parent node, the control message including information of a timing adjustment $T_{ul-dl}$ between a timing obtained by receiving an SSB from an aggressor node N2 2204 and a timing to perform measurements on an SRS from the aggressor node N2 2204. For the above examples, the value of the timing adjustment/misalignment may be as follows:

a. For Case-1, compatible with IAB Rel-16 at an aggressor node N2 2204:

$$T_{ul-dl} = TA - \left(\frac{TA}{2} + T_{delta}\right) = \frac{TA}{2} - T_{delta} \quad \text{i.}$$

b. For Case-6 (TX timing aligned) at an aggressor node N2 2204 (dynamic signaling may not be needed):

$$T_{ul-dl} = \left(\frac{TA}{2} + T_{delta}\right) - \left(\frac{TA}{2} + T_{delta}\right) = 0 \quad \text{i.}$$

c. For Case-7 (RX timing aligned) at a parent node of an aggressor node N2 2204, Embodiment A:

$$T_{ul-dl} = ATA - \left(\frac{TA}{2} + T_{delta}\right) \quad \text{i.}$$

d. For Case-7 (RX timing aligned) at a parent node of an aggressor node N2 2204, Embodiment B:

$$T_{ul-dl} = (TA + ATA) - \left(\frac{TA}{2} + T_{delta}\right) = ATA + \frac{TA}{2} - T_{delta} \quad \text{i.}$$

e. For Case-7 (RX timing aligned) at a parent node of an aggressor node N2 2204, Embodiment C:

$$T_{ul-dl} = \left(\frac{TA}{2} + T_{delta} + ATA\right) - \left(\frac{TA}{2} + T_{delta}\right) = ATA \quad \text{i.}$$

A field in a control message determining a value of $T_{ul-dl}$ may appear as a linear combination comprising an additive term and/or a multiplicative factor. They may be specified by the standard and/or determined by a specification and may depend on a frequency range ("FR") and/or a numerology/SCS.

According to one embodiment, a victim IAB node (e.g., N1 2202 shown in FIG. 22) receives information of $T_{delta}$ and a Timing Advance value associated with an aggressor IAB node (e.g., N2 2204 shown in FIG. 22) from a serving cell (e.g., a parent IAB node of the victim IAB node). In one implementation, $T_{delta}$ information of the aggressor IAB-node is provided to the victim IAB-node via dedicated RRC signaling. In another implementation, the TA value of the aggressor IAB-node is provided to the victim IAB-node via a dedicated PDSCH including a new MAC CE carrying the aggressor TA information. The victim IAB-node may be configured with one or more aggressor IAB node identities. The new MAC CE for the aggressor TA information may include an aggressor identity and the corresponding aggressor TA information, the new RRC information element for the aggressor $T_{delta}$ information may include an aggressor identity and the corresponding aggressor $T_{delta}$ information.

In another embodiment, the timing adjustment/misalignment information may be broadcast by the aggressor node N2 2204, for example in a system information block in a broadcast channel such as a PBCH, and not necessarily to an individual receiver. Specifically, the timing adjustment/misalignment information may be included in the PBCH comprised by the SSB or a system information block ("SIB") addressed in the PBCH that is comprised by the SSB.

The timing misalignment value could be sent to the parent node of the aggressor 2204, the IAB donor that configures the aggressor, and/or the like. Thus, in the example embodiment depicted in FIG. 22, the aggressor node N2 2204 may send timing misalignment values to other IAB nodes/donors 2206 connected to aggressor node N2 2204. The timing misalignment information may then be forwarded to the other IAB nodes/donors 2206 connected to the aggressor node N2 2202 (e.g., over connection 2220), and then forwarded to the victim node N1 2202 (e.g., over connections 2215).

Figure 24:
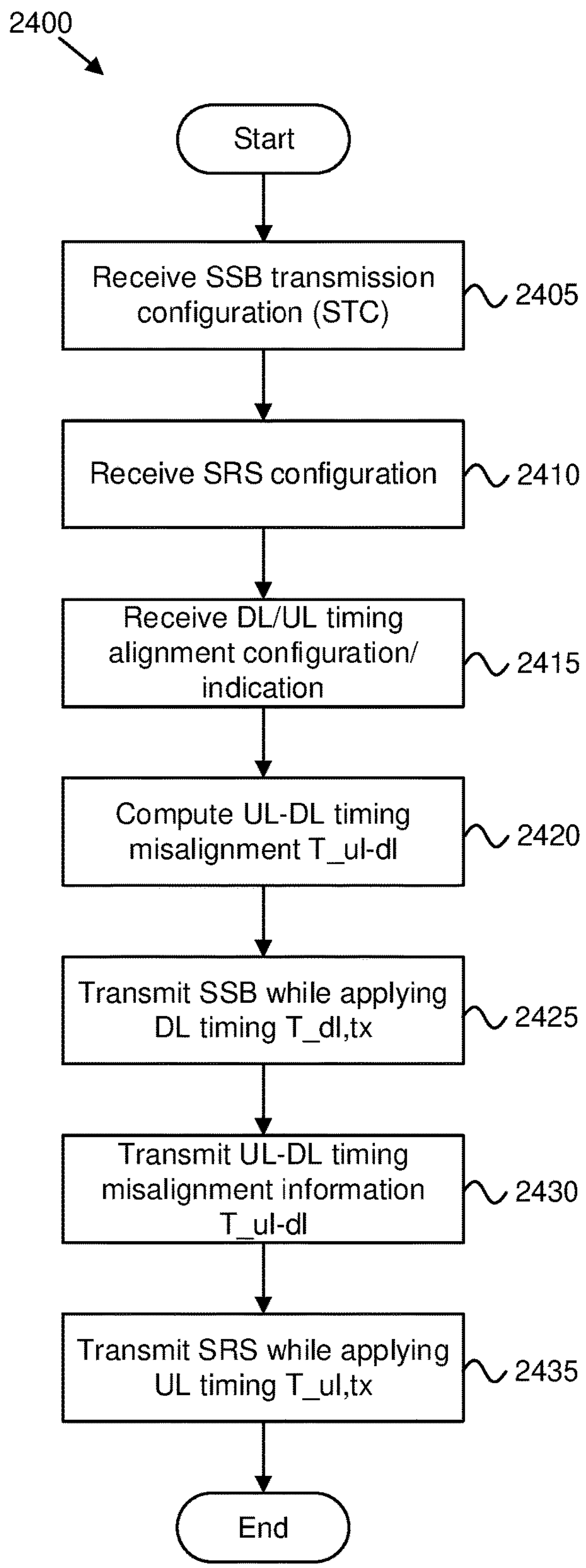
FIG. 24 is a block diagram illustrating an example embodiment of a method for TX IAB node.

FIG. 24 is a block diagram illustrating a method for TX IAB node (e.g., aggressor node). In one embodiment, the method 2400 begins and the IAB node receives 2405 an STC from the network. The STC may be received from a radio resource control ("RRC") layer of a parent node or may be produced by a central unit ("CU") of an IAB donor connecting the IAB network to a core network. The IAB node receives 2410 an SRS configuration containing parameters for generating and transmitting sounding reference signals. The configuration may include a seed for generating an SRS, resource allocation for the SRS, hopping information, quasi-collocation ("QCL") information, and so on. The configuration may further specify that the SRS is for cross-link interference ("CLI") management and may further indicate an association with the STC configuration.

The IAB node obtains 2415 timing alignment configurations and/or indications for its downlink transmission and/or uplink transmission. The timing alignment configurations and/or indications may or may not be associated with the STC configuration (for downlink) and SRS configuration (for uplink). The IAB node may obtain this information from the IAB network or may be preconfigured. The timing alignment information may contain a case of timing alignment (e.g., Case-1, Case-6, or Case-7, as specified in the standard) or contain an indication of a method to obtain timing alignment information. In the case that an RX timing alignment method (Case-7) is employed at the IAB node, a symbol shifting may further be applied to the SRS as proposed in the previous sections.

Given timing alignment information for downlink and uplink, the IAB node computes 2420 a value of timing misalignment T_(ul−dl) between downlink and uplink. The IAB node may employ one of the timing alignment methods proposed in the previous sections. The IAB node transmits 2425 one or more SSBs according to the received STC. Since SSB transmission occurs in downlink, the IAB node applies downlink timing alignment according to the information obtained earlier.

The IAB node may further transmit 2430 information of an uplink-downlink adjustment/misalignment T_(ul−dl). The information may be broadcast, e.g., as a part of system information broadcast by the IAB node. Alternatively, this step may be omitted if the information is transmitted to RX IAB node (victim node) by an IAB-CU or in the case that the IAB node is employing a TX timing alignment (Case-6).

Finally, the IAB node transmits 2435 SRS according to the received SRS configuration. Since SRS transmission occurs in uplink, the IAB node applies downlink timing alignment according to the information obtained earlier. A misalignment between downlink transmissions containing the SSB(s) and uplink transmissions containing the SRS is expected to be equal to the computed value of timing misalignment. The misalignment may be a difference between the start times of slots containing the SSB(s) and slots containing the SRS, possibly plus or minus an integer multiple of a slot duration associated with a numerology/SCS, and the method 2400 ends.

Figure 25:
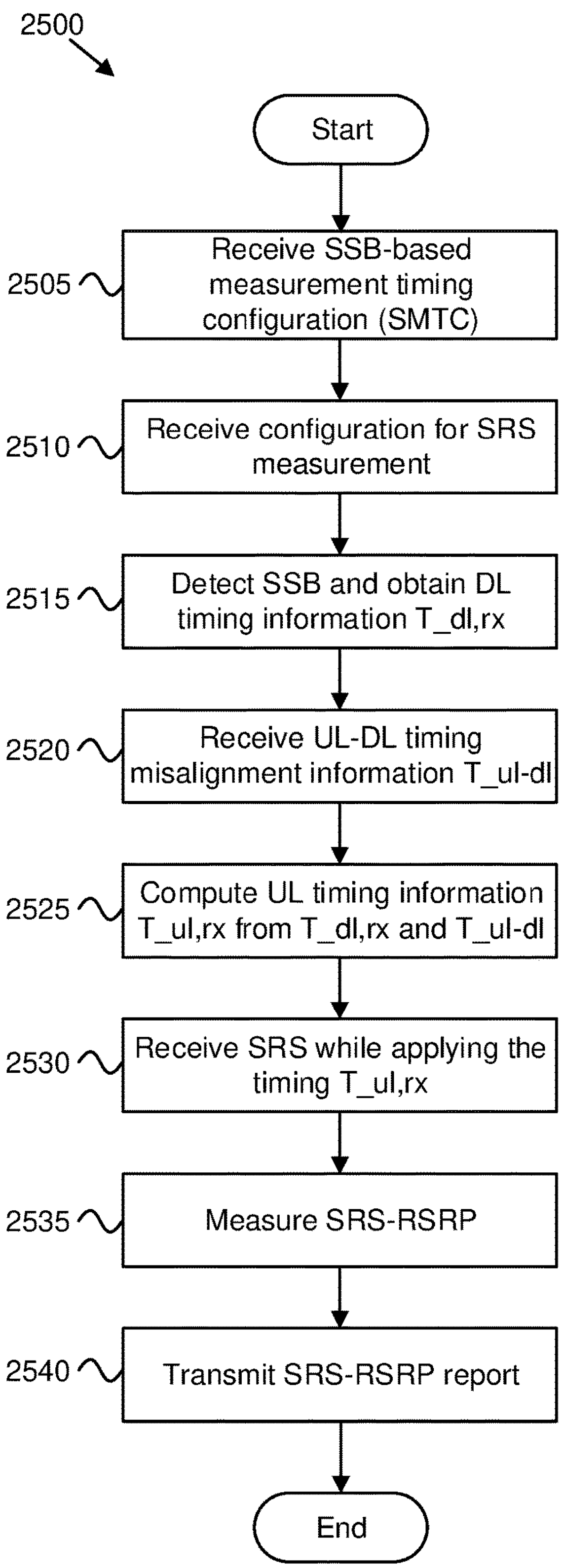
FIG. 25 is a block diagram illustrating an example embodiment of a method for RX IAB node.

FIG. 25 is a block diagram illustrating a method for RX IAB node (victim). In one embodiment, the IAB node receives 2505 an SMTC from the network. The SMTC may be received from a radio resource control (RRC) layer of a parent node or may be produced by a central unit (CU) of an IAB donor connecting the IAB network to a core network.

The IAB node receives 2510 an SRS measurement configuration containing SRS generation and transmission parameters. The configuration may include an SRS seed, resource allocation parameters, hopping information, quasi-collocation ("QCL") information, and so on. Moreover, the configuration may specify the type of measurement and reporting, such as a reference signal received power ("RSRP"). The configuration may further specify that the SRS is for cross-link interference ("CLI") management and may further indicate an association with the SMTC configuration.

The IAB node attempts 2515 to detect SSBs according to the SMTC configuration. If the IAB node detects an SSB, it can then obtain downlink timing information of the entity (e.g., an aggressor node) transmitting the SSB. The IAB node obtains 2520 information of a timing adjustment/misalignment T_(ul−dl). The information may be obtained from the entity transmitting the SSB, from the network, or from a combination thereof. Alternatively, all or some of the information may be obtain by a pre-configuration of the IAB node. The information may contain a value for timing adjustment/misalignment, and/or may contain a case of timing alignment (e.g., Case-1, Case-6, or Case-7, as specified in the standard) or contain an indication of a method to obtain timing alignment information.

Having obtained downlink timing information and a timing adjustment/misalignment value, the IAB node computes 2525 a value of uplink timing. In the case that a TX timing alignment method (Case-6) is employed at the TX IAB node (aggressor node), the uplink timing of the SRS transmission can be directly obtained from the downlink timing of the SSB transmission with a zero timing offset. The IAB node can then apply 2530 the uplink timing for receiving SRS. Next, the IAB node performs 2535 measurements on the SRS and may produce a report according to the received SRS measurement configuration. Finally, the IAB node transmits 2540 the SRS report containing measurement results such as an SRS-RSRP, and the method 2500 ends.

In one embodiment, the report includes a value of signal strength such as an RSRP, SRS-RSRP, RSSI, or the like. The report may be transmitted on a shared channel or a control channel between the IAB node and another node (a parent node of the IAB node, an IAB donor, etc.). For instance, referring to FIG. 22, in one embodiment, the victim node N1 2202 performs measurements on SRS received from aggressor node N2 2204 (see connection 2210), and then transmits a report to the other IAB nodes/donors 2206 connected to victim node N1 2202 (see connections 2215). In such an embodiment, there is no need to communicate timing information on the connections (e.g., lines), but instead, the victim IAB node 2202 can obtain timing from SSB (e.g., over broadcast connection 2205) of the aggressor IAB node 2204 and then use it to perform measurements on SRS (e.g., over broadcast connection 2210) of the aggressor IAB node 2204.

It was proposed earlier that a timing misalignment value could be communicated to the RX IAB node. Different alternatives are possible. In one embodiment, the TX IAB node computes the misalignment value and transmits it to the RX IAB node, for example by broadcasting it. A system information block can be used for this purpose. In another embodiment, the misalignment value can be transmitted to the network, for example through a parent IAB node, and then the network communicates the value to the RX IAB node.

In the case that a TX timing alignment (Case-6) is employed at the TX IAB node (aggressor node), a configuration of the timing alignment for the TX IAB node that indicate a zero timing offset associated with the transmissions of the SSB and the SRS is sufficient. This information can be transmitted to the RX IAB node (victim node) by an IAB-CU in a semi-static manner. No dynamic signaling is required in this case for indicating a timing misalignment between transmissions of the SSB and the SRS from the TX IAB node other than an offset equal to an integer multiple of a symbol time.

If provided by the network such as through a parent node, the timing misalignment information can be sent to the RX IAB node through a semi-static configuration, an indication in a DCI, or other signaling methods.

In a special case, the information provided to the RX IAB node may be one bit indicating whether the uplink and downlink transmissions are aligned. Alternatively, the one bit of information may indicate whether a timing misalignment is below an acceptable threshold. The threshold may be a constant value, a configurable value, or obtained from other parameters. A threshold value may be function of the numerology of uplink and/or downlink transmissions, for example SSB and/or SRS transmissions by the TX IAB node.

In some embodiments, an aggressor node may transmit report containing a timing misalignment by averaging over several values of timing misalignment during an observation window. The duration of the window and/or the frequency of transmitting the report may be specified by the standard or configured by the system. In some embodiments, the aggressor node may send the average timing misalignment to the network, such as to the IAB donor CU. Then, the network can communicate this information to a victim node.

Since there may be multiple values of timing misalignment between uplink and downlink of the TX IAB node, information of specific transmissions may need to be communicated to the RX IAB node. For example, a CLI configuration containing SRS measurement parameters may explicitly associate timing of the SRS configuration to an SMTC, or otherwise contain SMTC information, such that the RX IAB node can obtain downlink timing information from specific SSB transmissions.

In a more general embodiment, an SRS and an STC may be associated such that the timing misalignment can be obtained unambiguously. Alternatively, or additionally, an SRS measurement and an SMTC may be associated with one another.

If an RX IAB node is unable to detect any SSBs in the time intervals indicated by the SMTC, it may request from the network to provide timing misalignment information. Alternatively, the RX IAB node may attempt to perform measurements on the SRS and request timing misalignment information only if the measurements fail. Yet as another alternative, the RX IAB node may assume a timing misalignment value of zero or a fixed value defined by the standard, by a configuration or by a pre-configuration if it is unable to detect any SSBs from the TX IAB node.

In an alternative embodiment, an RX IAB node may decline to transmit a measurement report if it is unable to obtain information of uplink timing alignment associated with the SRS.

The following should be noted throughout the present disclosure:

a. Any parameter discussed in this disclosure may appear, in practice, as a linear function of that parameter in signaling or specifications. For example, $T_{delta}$ may appear as $(N_{delta}+T_{delta}\cdot G_{step})\cdot T_c$ in practice.
b. In any timing assignment for a slot that contains a signal, a timing assignment in the text or in an equation by a sign such as '=' or ':=' or a like may mean that the start time of the slot containing the signal is equal to a determined value such as a right hand side of the equation. Alternatively, the start time of the slot containing the signal may be different from the determined value by an integer multiple of $T_{slot}$, where $T_{slot}$ denotes a slot duration for a given numerology or subcarrier spacing ("SCS"). This is, in general, applicable to all timing assignments in the present disclosure. In some embodiment, the said values may be different by an integer multiple of $T_{symbol}$ rather than an integer multiple of $T_{slot}$, where $T_{symbol}$ denotes a symbol duration for a given numerology or subcarrier spacing ("SCS").
c. Although the entities are referred to as IAB nodes, the same methods can be applied to IAB donors, which are the IAB entities connecting the core network to the IAB network, with minimum or zero modifications.
d. The different steps described for the example embodiments, in the text and in the flowcharts, may be permuted or performed in a different order than the order depicted in the figures.
e. Each configuration may be provided by one or multiple configurations in practice. An earlier configuration may provide a subset of parameters while a later configuration may provide another subset of parameters. Alternatively, a later configuration may override values provided by an earlier configuration or a pre-configuration.
f. A configuration may be provided by a radio resource control ("RRC") signaling, a medium-access control ("MAC") signaling, a physical layer signaling such as a downlink control information ("DCI") message, a combination thereof, or other methods. A configuration may include a pre-configuration, or a semi-static configuration provided by the standard, by the vendor, and/or by the network/operator. Each parameter value received through configuration or indication may override previous values for a similar parameter.
g. Despite frequent references to IAB, the proposed solutions may be applicable to wireless relay nodes and other types of wireless communication entities.
h. It is being discussed in 3GPP RAN to allow a vendor manufacturing IAB systems/devices and an operator deploying the IAB systems/devices to negotiate capabilities of the systems/devices. This means that some of the information assumed to need signaling between entities may readily be available to the devices, for example, by storing the information on a memory unit such as a read-only memory ("ROM"), exchanging the information by proprietary signaling methods, providing the information by a (pre)configuration, or otherwise taking the information into account when creating hardware and/or software of the IAB systems/devices or other entities in the network. In this case, methods described in this disclosure that comprise exchanging the information can be extended to similar methods wherein the information is obtained by those said other methods.

i. In this disclosure, methods for TX and RX timing alignment in IAB systems are proposed. Several embodiments for configuration and signaling are provided for each of the two cases of TX and RX alignment at an IAB node, which are the main candidates for IAB timing alignment for duplexing enhancements in Rel-17. Then, the methods are extended to a unified framework and signaling where different timing alignment methods can be configured, based on the nodes' capabilities, and applied locally based on scheduling needs.

Figure 26:
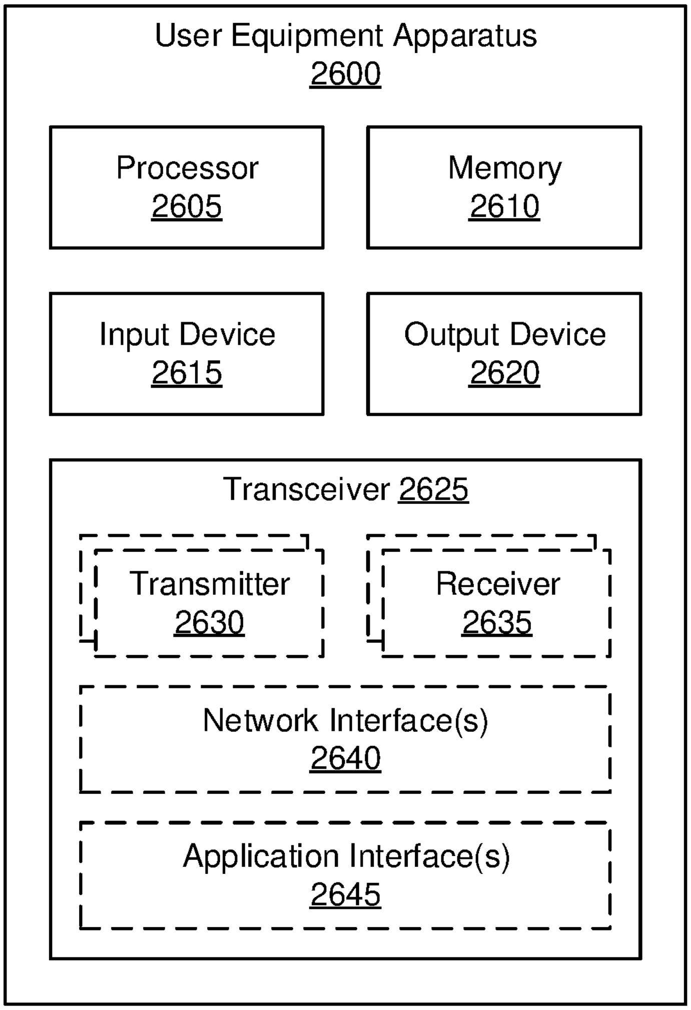
FIG. 26 is a schematic block diagram illustrating one embodiment of an apparatus that may be used for timing alignment in integrated access and backhaul.

FIG. 26 depicts one embodiment of a user equipment apparatus 2600 that may be used for timing alignment in integrated access and backhaul, according to embodiments of the disclosure. The user equipment apparatus 2600 may be one embodiment of the remote unit 105 and/or the UE 205. Furthermore, the user equipment apparatus 2600 may include a processor 2605, a memory 2610, an input device 2615, an output device 2620, a transceiver 2625. In some embodiments, the input device 2615 and the output device 2620 are combined into a single device, such as a touch screen. In certain embodiments, the user equipment apparatus 2600 does not include any input device 2615 and/or output device 2620.

As depicted, the transceiver 2625 includes at least one transmitter 2630 and at least one receiver 2635. Here, the transceiver 2625 communicates with a mobile core network (e.g., a 5GC) via one or more access networks. Additionally, the transceiver 2625 may support at least one network interface 2640. Here, the at least one network interface 2640 facilitates communication with an eNB, gNB, IAB donor, or IAB node (e.g., using the "Uu" interface). Additionally, the at least one network interface 2640 may include an interface used for communications with an AMF, an SMF, and/or a UPF.

In some embodiments, the transceiver 2625 comprises a first transceiver that communicates with a mobile communication network via a first access network and a second transceiver that communicates with the mobile communication network via a second access network. In other embodiments, the transceiver 2625 comprises a first functionality (e.g., modem) for communicating with the mobile communication network via the first access network and a second functionality (e.g., modem) for communicating with the mobile communication network via the second access network.

The processor 2605, in one embodiment, may include any known controller capable of executing computer-readable instructions and/or capable of performing logical operations. For example, the processor 2605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 2605 executes instructions stored in the memory 2610 to perform the methods and routines described herein. The processor 2605 is communicatively coupled to the memory 2610, the input device 2615, the output device 2620, and the transceiver 2625.

The memory 2610, in one embodiment, is a computer readable storage medium. In some embodiments, the memory 2610 includes volatile computer storage media. For example, the memory 2610 may include a RAM, including dynamic RAM ("DRAM"), synchronous dynamic RAM ("SDRAM"), and/or static RAM ("SRAM"). In some embodiments, the memory 2610 includes non-volatile computer storage media. For example, the memory 2610 may include a hard disk drive, a flash memory, or any other suitable non-volatile computer storage device. In some embodiments, the memory 2610 includes both volatile and non-volatile computer storage media. In some embodiments, the memory 2610 stores data relating to quality of service flow selection for a multi-access data connection, for example storing access network information ("ANI"), IP addresses, and the like. In certain embodiments, the memory 2610 also stores program code and related data, such as an operating system ("OS") or other controller algorithms operating on the user equipment apparatus 2600 and one or more software applications.

The input device 2615, in one embodiment, may include any known computer input device including a touch panel, a button, a keyboard, a stylus, a microphone, or the like. In some embodiments, the input device 2615 may be integrated with the output device 2620, for example, as a touchscreen or similar touch-sensitive display. In some embodiments, the input device 2615 includes a touchscreen such that text may be input using a virtual keyboard displayed on the touchscreen and/or by handwriting on the touchscreen. In some embodiments, the input device 2615 includes two or more different devices, such as a keyboard and a touch panel.

The output device 2620, in one embodiment, may include any known electronically controllable display or display device. The output device 2620 may be designed to output visual, audible, and/or haptic signals. In some embodiments, the output device 2620 includes an electronic display capable of outputting visual data to a user. For example, the output device 2620 may include, but is not limited to, a liquid crystal display ("LCD") display, an LED display, an organic light emitting diode ("OLED") display, a projector, or similar display device capable of outputting images, text, or the like to a user. As another, non-limiting, example, the output device 2620 may include a wearable display such as a smart watch, smart glasses, a heads-up display, or the like. Further, the output device 2620 may be a component of a smart phone, a personal digital assistant, a television, a table computer, a notebook (laptop) computer, a personal computer, a vehicle dashboard, or the like.

In certain embodiments, the output device 2620 includes one or more speakers for producing sound. For example, the output device 2620 may produce an audible alert or notification (e.g., a beep or chime). In some embodiments, the output device 2620 includes one or more haptic devices for producing vibrations, motion, or other haptic feedback. In some embodiments, all, or portions of the output device 2620 may be integrated with the input device 2615. For example, the input device 2615 and output device 2620 may form a touchscreen or similar touch-sensitive display. In other embodiments, all, or portions of the output device 2620 may be located near the input device 2615.

As discussed above, the transceiver 2625 communicates with one or more network functions of a mobile communication network via one or more access networks. The transceiver 2625 operates under the control of the processor

2605 to transmit messages, data, and other signals and also to receive messages, data, and other signals. For example, the processor 2605 may selectively activate the transceiver (or portions thereof) at particular times in order to send and receive messages.

The transceiver 2625 may include one or more transmitters 2630 and one or more receivers 2635. Although only one transmitter 2630 and one receiver 2635 are illustrated, the user equipment apparatus 2600 may have any suitable number of transmitters 2630 and receivers 2635. Further, the transmitter(s) 2630 and the receiver(s) 2635 may be any suitable type of transmitters and receivers. In one embodiment, the transceiver 2625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 2625, transmitters 2630, and receivers 2635 may be implemented as physically separate components that access a shared hardware resource and/or software resource, such as for example, the network interface 2640.

In various embodiments, one or more transmitters 2630 and/or one or more receivers 2635 may be implemented and/or integrated into a single hardware component, such as a multi-transceiver chip, a system-on-a-chip, an application-specific integrated circuit ("ASIC"), or other type of hardware component. In certain embodiments, one or more transmitters 2630 and/or one or more receivers 2635 may be implemented and/or integrated into a multi-chip module. In some embodiments, other components such as the network interface 2640 or other hardware components/circuits may be integrated with any number of transmitters 2630 and/or receivers 2635 into a single chip. In such embodiment, the transmitters 2630 and receivers 2635 may be logically configured as a transceiver 2625 that uses one more common control signals or as modular transmitters 2630 and receivers 2635 implemented in the same hardware chip or in a multi-chip module.

Figure 27:
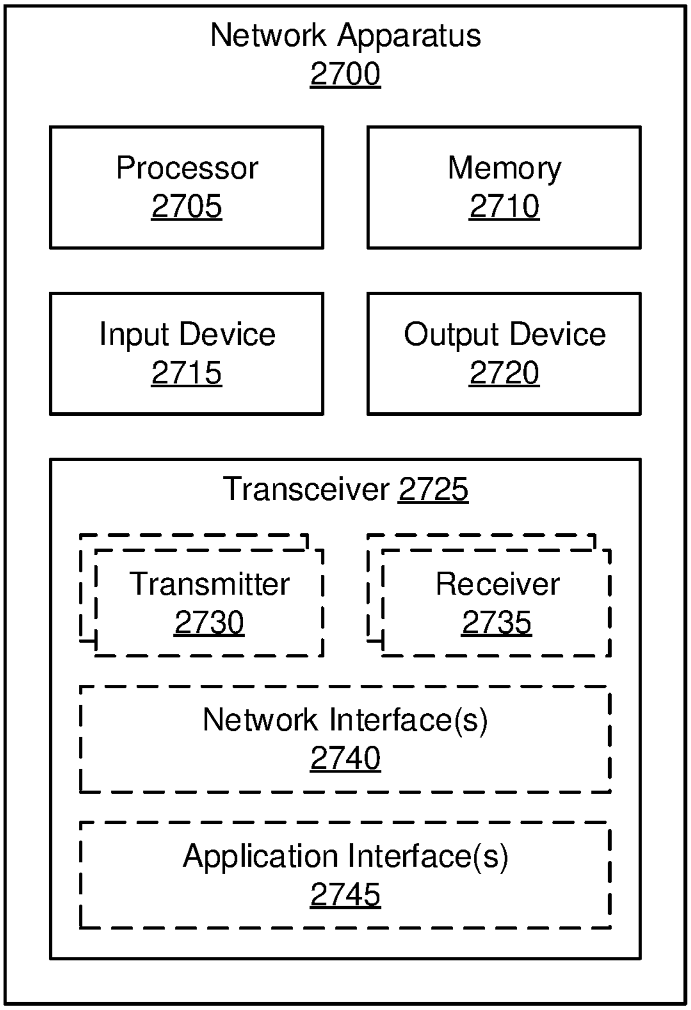
FIG. 27 is a schematic block diagram illustrating another embodiment of an apparatus that may be used for timing alignment in integrated access and backhaul.

FIG. 27 depicts one embodiment of a network equipment apparatus 2700 that may be used for timing alignment in integrated access and backhaul, according to embodiments of the disclosure. In some embodiments, the network equipment apparatus 2700 may implement an SMF. In other embodiments, the network equipment apparatus 2700 may implement other network functions. Furthermore, network equipment apparatus 2700 may include a processor 2705, a memory 2710, an input device 2715, an output device 2720, a transceiver 2725. In some embodiments, the input device 2715 and the output device 2720 are combined into a single device, such as a touch screen. In certain embodiments, the network equipment apparatus 2700 does not include any input device 2715 and/or output device 2720.

As depicted, the transceiver 2725 includes at least one transmitter 2730 and at least one receiver 2735. Here, the transceiver 2725 communicates with one or more remote units 105. Additionally, the transceiver 2725 may support at least one network interface 2740. In some embodiments, the transceiver 2725 supports a first interface for communicating with a RAN node, a second interface for communicating with one or more network functions in a mobile core network (e.g., a 5GC) and a third interface for communicating with a remote unit (e.g., UE).

The processor 2705, in one embodiment, may include any known controller capable of executing computer-readable instructions and/or capable of performing logical operations. For example, the processor 2705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 2705 executes instructions stored in the memory 2710 to perform the methods and routines described herein. The processor 2705 is communicatively coupled to the memory 2710, the input device 2715, the output device 2720, and the first transceiver 2725.

In various embodiments, the network equipment apparatus 2700 operates as an IAB node of a wireless communication network. In such an embodiment, the processor 2705 obtains a first uplink transmission time, a downlink transmission time, and a second uplink transmission time. The processor 2705, in certain embodiments, includes determining a timing alignment mode for the IAB node. The transceiver 2725 transmits an uplink signal from the IAB node according to one of the first uplink transmission time, the downlink transmission time, and the second uplink transmission time based on the timing alignment mode for the IAB node.

In one embodiment, the transceiver 2725 is further configured to, in response to the timing alignment mode for the IAB node comprising a timing advance mode, transmit the uplink signal according to the first uplink transmission time. In some embodiments, the transceiver 2725 is further configured to, in response to the timing alignment mode for the IAB node comprising a transmission timing alignment mode, transmit the uplink signal according to the downlink transmission time. In various embodiments, the transceiver 2725 is further configured to, in response to the timing alignment mode for the IAB node comprising a reception timing mode, transmit the uplink signal according to the second uplink transmission time.

In one embodiment, the processor 2705 is further configured to obtain the first uplink transmission time by obtaining a downlink reception time for the IAB node, receiving a timing advance value and a timing advance offset value for the IAB node, and setting the first uplink transmission time to the downlink reception time minus the timing advance value minus the timing advance offset value.

In one embodiment, the processor 2705 is further configured to obtain the first downlink transmission time by obtaining a downlink reception time for the IAB node, receiving a timing advance value and a timing delta value for the IAB node, and setting the first uplink transmission time to the downlink reception time minus half of the timing advance value minus the timing delta value.

In one embodiment, the processor 2705 is further configured to obtain the second uplink transmission time by obtaining a downlink reception time for the IAB node, receiving a timing advance value and a timing delta value for the IAB node, receiving an additional timing advance value for the IAB node, and setting the second uplink transmission time to the downlink reception time minus an alternative timing advance value, wherein the alternative timing advance value comprises one of the additional timing advance value, the timing advance value plus the additional timing advance value, and half of the timing advance value plus the timing delta value plus the additional timing advance value.

In one embodiment, the processor 2705 is further configured to determine that the timing alignment mode is the timing advance mode by at least one of receiving a first indication indicating that the timing alignment mode is the timing advance mode; receiving a second indication associated with the uplink signal, wherein the second indication indicates that the timing alignment mode is the timing advance; receiving a third indication associated with a first plurality of resources, wherein the third indication indicates that the timing alignment mode is the timing advance mode, the uplink signal scheduled on a second plurality of resources, and the second plurality of resources overlaps with the first plurality of resources; determining that a fourth indication indicating a transmission timing alignment mode or reception timing alignment mode is not received; and determining that an additional timing advance value is not received.

In one embodiment, the processor 2705 is further configured to determine that the timing alignment mode is the transmission timing alignment mode by at least one of receiving a first indication indicating that the timing alignment mode is the transmission timing alignment mode; receiving a second indication associated with the uplink signal, wherein the second indication indicates that the timing alignment mode is the transmission timing alignment mode; receiving a third indication associated with a first plurality of resources, wherein the third indication indicates that the timing alignment mode is the transmission timing alignment mode, the uplink signal scheduled on a second plurality of resources, and the second plurality of resources overlaps with the first plurality of resources; determining that a fourth indication indicating a timing advance mode or reception timing alignment mode is not received; and determining that an additional timing advance value is not received.

In one embodiment, the processor 2705 is further configured to determine that the timing alignment mode is the reception timing alignment mode by at least one of receiving a first indication indicating that the timing alignment mode is the reception timing alignment mode; receiving a second indication associated with the uplink signal, wherein the second indication indicates that the timing alignment mode is the reception timing alignment mode; receiving a third indication associated with a first plurality of resources, wherein the third indication indicates that the timing alignment mode is the reception timing alignment mode, the uplink signal scheduled on a second plurality of resources, and the second plurality of resources overlaps with the first plurality of resources; determining that a fourth indication indicating a timing advance mode or transmission timing alignment mode is not received; receiving an additional timing advance value; receiving an additional timing advance value associated with the uplink signal; and receiving an additional timing advance value associated with a first plurality of resources and determining that the uplink signal is scheduled on a second plurality of resources, the second plurality of resources overlapping with the first plurality of resources.

In one embodiment, in response to determining that a symbol shifting is applicable, the transceiver 2725 is further configured to transmit the uplink signal on a second symbol associated with the symbol number plus one. In various embodiments, in response to determining that the symbol shifting is not applicable, the transceiver 2725 is further configured to transmit the uplink signal on the first symbol. In one embodiment, the processor 2705 is further configured to determine whether the symbol shifting is applicable by at least one of determining that the second uplink transmission time is greater than the downlink reception time and receiving an indication indicating that the symbol shifting is applicable.

The memory 2710, in one embodiment, is a computer readable storage medium. In some embodiments, the memory 2710 includes volatile computer storage media. For example, the memory 2710 may include a RAM, including dynamic RAM ("DRAM"), synchronous dynamic RAM ("SDRAM"), and/or static RAM ("SRAM"). In some embodiments, the memory 2710 includes non-volatile computer storage media. For example, the memory 2710 may include a hard disk drive, a flash memory, or any other suitable non-volatile computer storage device. In some embodiments, the memory 2710 includes both volatile and non-volatile computer storage media. In some embodiments, the memory 2710 stores data relating to quality of service flow selection for a multi-access data connection, for example storing ANI, IP addresses, UE contexts, and the like. In certain embodiments, the memory 2710 also stores program code and related data, such as an operating system ("OS") or other controller algorithms operating on the network equipment apparatus 2700 and one or more software applications.

The input device 2715, in one embodiment, may include any known computer input device including a touch panel, a button, a keyboard, a stylus, a microphone, or the like. In some embodiments, the input device 2715 may be integrated with the output device 2720, for example, as a touchscreen or similar touch-sensitive display. In some embodiments, the input device 2715 includes a touchscreen such that text may be input using a virtual keyboard displayed on the touchscreen and/or by handwriting on the touchscreen. In some embodiments, the input device 2715 includes two or more different devices, such as a keyboard and a touch panel.

The output device 2720, in one embodiment, may include any known electronically controllable display or display device. The output device 2720 may be designed to output visual, audible, and/or haptic signals. In some embodiments, the output device 2720 includes an electronic display capable of outputting visual data to a user. For example, the output device 2720 may include, but is not limited to, an LCD display, an LED display, an OLED display, a projector, or similar display device capable of outputting images, text, or the like to a user. As another, non-limiting, example, the output device 2720 may include a wearable display such as a smart watch, smart glasses, a heads-up display, or the like. Further, the output device 2720 may be a component of a smart phone, a personal digital assistant, a television, a table computer, a notebook (laptop) computer, a personal computer, a vehicle dashboard, or the like.

In certain embodiments, the output device 2720 includes one or more speakers for producing sound. For example, the output device 2720 may produce an audible alert or notification (e.g., a beep or chime). In some embodiments, the output device 2720 includes one or more haptic devices for producing vibrations, motion, or other haptic feedback. In some embodiments, all, or portions of the output device 2720 may be integrated with the input device 2715. For example, the input device 2715 and output device 2720 may form a touchscreen or similar touch-sensitive display. In other embodiments, all, or portions of the output device 2720 may be located near the input device 2715.

As discussed above, the transceiver 2725 may communicate with one or more remote units and/or with one or more interworking functions that provide access to one or more PLMNs. The transceiver 2725 may also communicate with one or more network functions (e.g., in the mobile core network 140). The transceiver 2725 operates under the control of the processor 2705 to transmit messages, data, and other signals and also to receive messages, data, and other signals. For example, the processor 2705 may selectively activate the transceiver (or portions thereof) at particular times in order to send and receive messages.

Figure 28:
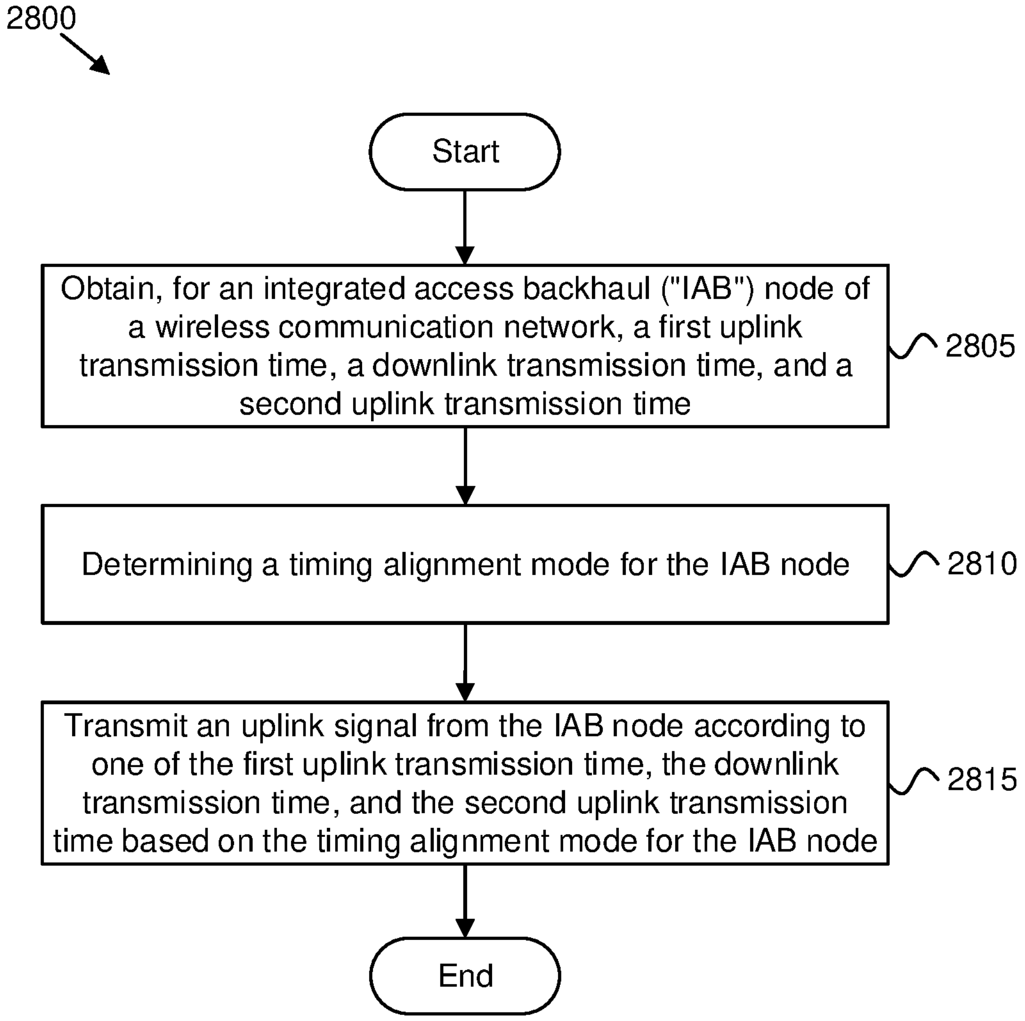
FIG. 28 is a block diagram illustrating one example embodiment of a method for timing alignment in integrated access and backhaul.

The transceiver 2725 may include one or more transmitters 2730 and one or more receivers 2735. In certain embodiments, the one or more transmitters 2730 and/or the one or more receivers 2735 may share transceiver hardware and/or circuitry. For example, the one or more transmitters 2730 and/or the one or more receivers 2735 may share antenna(s), antenna tuner(s), amplifier(s), filter(s), oscillator(s), mixer(s), modulator/demodulator(s), power supply, and the like. In one embodiment, the transceiver 2725 implements multiple logical transceivers using different communication protocols or protocol stacks, while using common physical hardware FIG. 28 depicts one embodiment of a method 2800 for timing alignment in integrated access and backhaul. In one embodiment, the method 2800 may be performed by a wireless network entity, a wireless network node, a network apparatus such as the network equipment apparatus 2700 described above, a processor, a transceiver, an integrated access backhaul node, and/or the like.

In one embodiment, the method 2800 begins and obtains 2805, for an integrated access backhaul ("IAB") node of a wireless communication network, a first uplink transmission time, a downlink transmission time, and a second uplink transmission time. In further embodiments, the method 2800 determines 2810 a timing alignment mode for the IAB node. In certain embodiments, the method 2800 transmits 2815 an uplink signal from the IAB node according to one of the first uplink transmission time, the downlink transmission time, and the second uplink transmission time based on the timing alignment mode for the IAB node, and the method 2800 ends.

Figure 29:
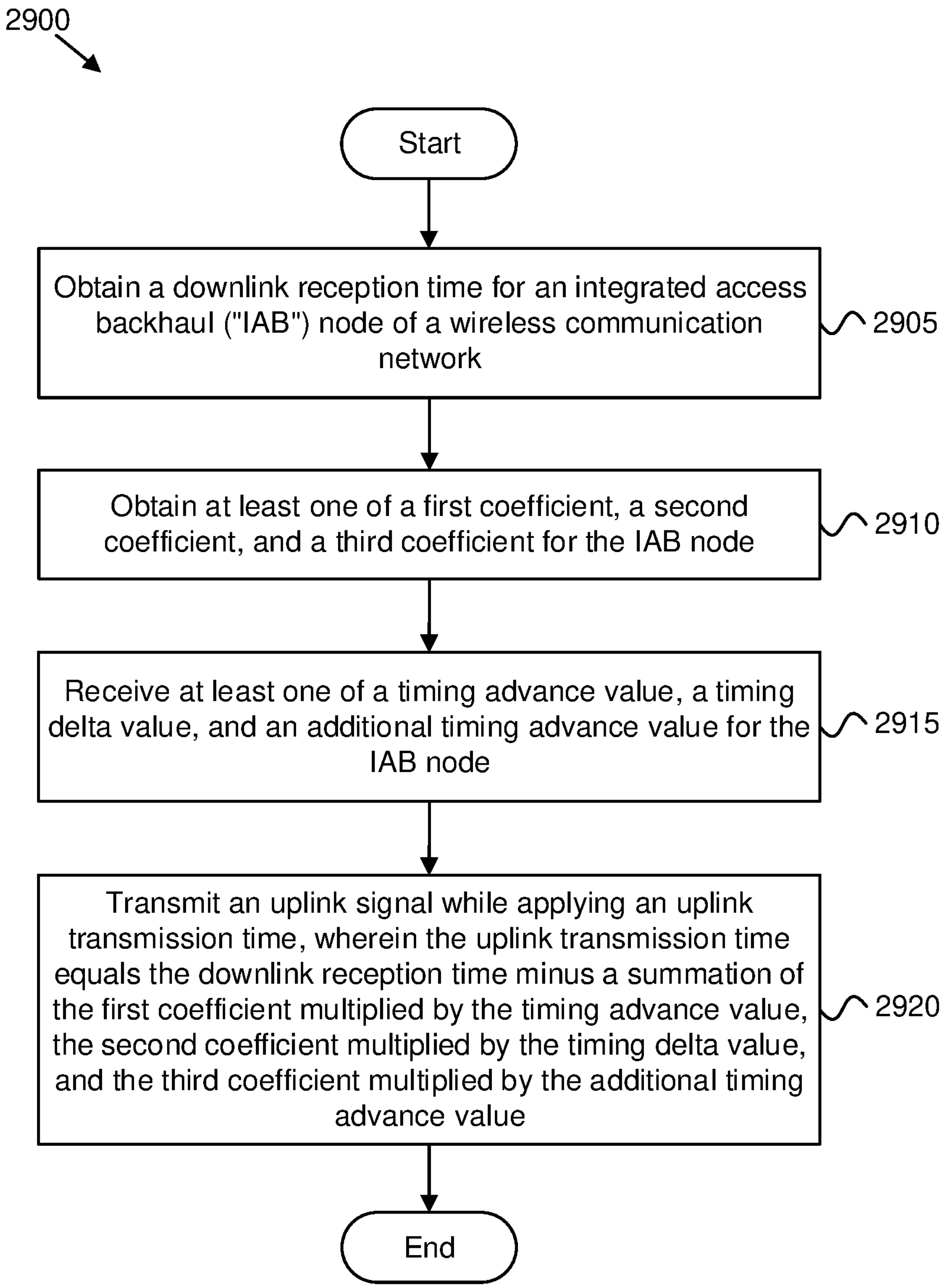
FIG. 29 is a block diagram illustrating one example embodiment of a method for timing alignment in integrated access and backhaul.

FIG. 29 depicts one embodiment of a method 2900 for timing alignment in integrated access and backhaul. In one embodiment, the method 2900 may be performed by a wireless network entity, a wireless network node, a network apparatus such as the network equipment apparatus 2700 described above, a processor, a transceiver, an integrated access backhaul node, and/or the like.

In one embodiment, the method 2900 begins and obtains 2905 a downlink reception time for an integrated access backhaul ("IAB") node of a wireless communication network. In further embodiments, the method 2900 obtains 2910 at least one of a first coefficient, a second coefficient, and a third coefficient for the IAB node. In some embodiments, the method 2900 receives 2915 at least one of a timing advance value, a timing delta value, and an additional timing advance value for the IAB node. In various embodiments, the method 2900 transmits 2920 an uplink signal while applying an uplink transmission time, wherein the uplink transmission time equals the downlink reception time minus a summation of the first coefficient multiplied by the timing advance value, the second coefficient multiplied by the timing delta value, and the third coefficient multiplied by the additional timing advance value, and the method 2900 ends.

Figure 30:
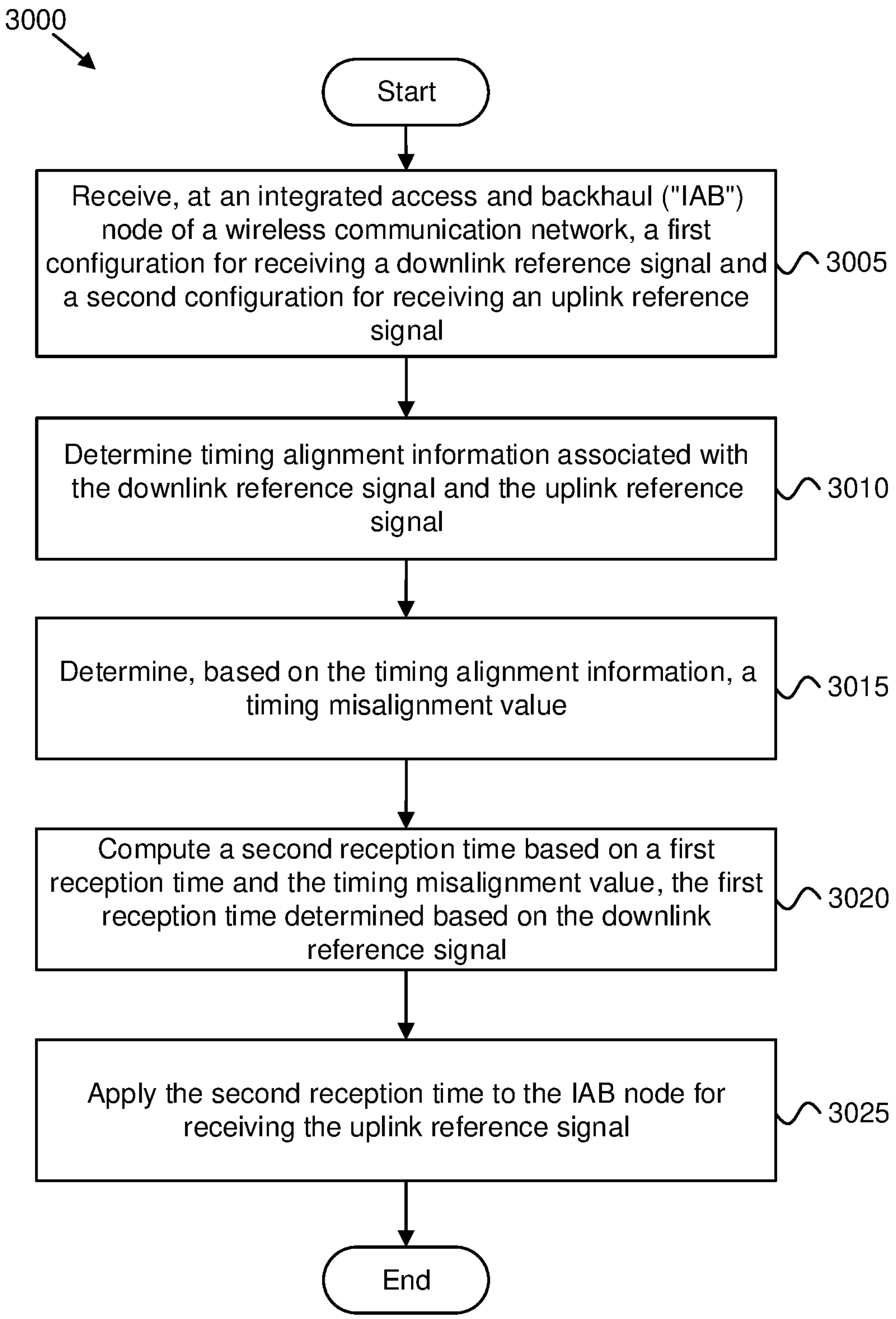
FIG. 30 is a block diagram illustrating one example embodiment of a method for timing alignment in integrated access and backhaul.

FIG. 30 depicts one embodiment of a method 3000 for timing alignment in integrated access and backhaul. In one embodiment, the method 3000 may be performed by a wireless network entity, a wireless network node, a network apparatus such as the network equipment apparatus 2700 described above, a processor, a transceiver, an integrated access backhaul node, and/or the like.

In one embodiment, the method 3000 begins and receives 3005, at an integrated access and backhaul ("IAB") node of a wireless communication network, a first configuration for receiving a downlink reference signal and a second configuration for receiving an uplink reference signal. In further embodiments, the method 3000 determines 3010 timing alignment information associated with the downlink reference signal and the uplink reference signal.

In one embodiment, the method 3000 determines 3015, based on the timing alignment information, a timing misalignment value. In further embodiments, the method 3000 computes 3020 a second reception time based on a first reception time and the timing misalignment value, the first reception time determined based on the downlink reference signal. In one embodiment, the method 3000 applies 3025 the second reception time to the IAB node for receiving the uplink reference signal, and the method 3000 ends.

Figure 31:
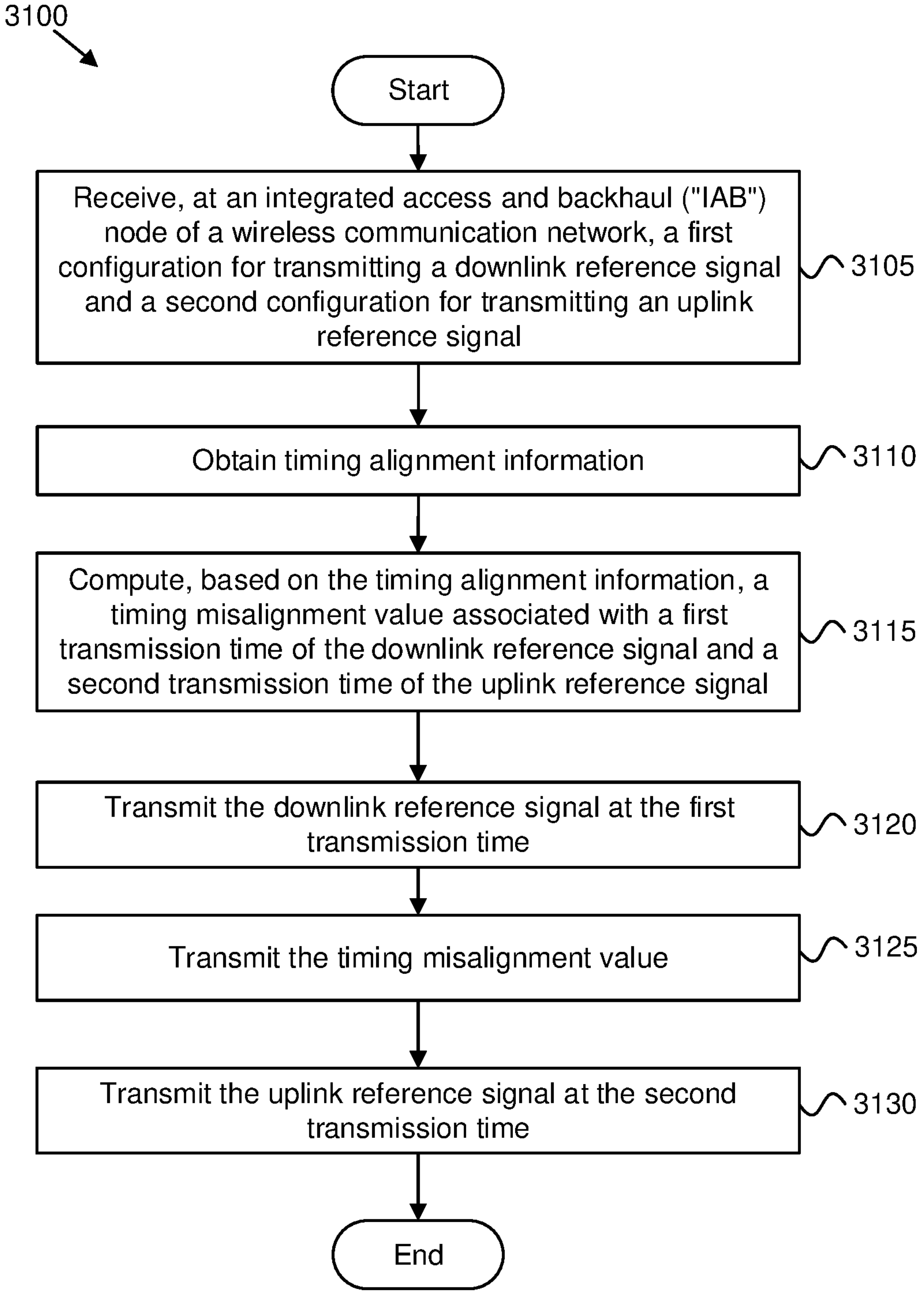
FIG. 31 is a block diagram illustrating one example embodiment of a method for timing alignment in integrated access and backhaul.

FIG. 31 depicts one embodiment of a method 3100 for timing alignment in integrated access and backhaul. In one embodiment, the method 3100 may be performed by a wireless network entity, a wireless network node, a network apparatus such as the network equipment apparatus 2700 described above, a processor, a transceiver, an integrated access backhaul node, and/or the like.

In one embodiment, the method 3100 begins and receives 3105, at an integrated access and backhaul ("IAB") node of a wireless communication network, a first configuration for transmitting a downlink reference signal and a second configuration for transmitting an uplink reference signal. In further embodiments, the method 3100 obtains 3110 timing alignment information.

In one embodiment, the method 3100 computes 3115, based on the timing alignment information, a timing misalignment value associated with a first transmission time of the downlink reference signal and a second transmission time of the uplink reference signal. In further embodiments, the method 3100 transmits 3120 the downlink reference signal at the first transmission time. In one embodiment, the method 3125 transmits 3125 the timing misalignment value. In further embodiments, the method 3100 transmits 3130 the uplink reference signal at the second transmission time, and the method 3100 ends.

A first method is disclosed for timing alignment in integrated access and backhaul. In one embodiment, the first method includes obtaining, for an integrated access backhaul ("IAB") node of a wireless communication network, a first uplink transmission time, a downlink transmission time, and a second uplink transmission time. The first method, in certain embodiments, includes determining a timing alignment mode for the IAB node. The first method, in various embodiments, includes transmitting an uplink signal from the IAB node according to one of the first uplink transmission time, the downlink transmission time, and the second uplink transmission time based on the timing alignment mode for the IAB node.

In one embodiment, the first method includes, in response to the timing alignment mode for the IAB node comprising a timing advance mode, transmitting the uplink signal according to the first uplink transmission time. In some embodiments, the first method includes, in response to the timing alignment mode for the IAB node comprising a transmission timing alignment mode, transmitting the uplink signal according to the downlink transmission time. In various embodiments, the first method includes, in response to the timing alignment mode for the IAB node comprising a reception timing mode, transmitting the uplink signal according to the second uplink transmission time.

In one embodiment, obtaining the first uplink transmission time comprises obtaining a downlink reception time for the IAB node, receiving a timing advance value and a timing advance offset value for the IAB node, and setting the first uplink transmission time to the downlink reception time minus the timing advance value minus the timing advance offset value.

In one embodiment, obtaining the first downlink transmission time comprises obtaining a downlink reception time for the IAB node, receiving a timing advance value and a timing delta value for the IAB node, and setting the first uplink transmission time to the downlink reception time minus half of the timing advance value minus the timing delta value.

In one embodiment, obtaining the second uplink transmission time comprises obtaining a downlink reception time for the IAB node, receiving a timing advance value and a timing delta value for the IAB node, receiving an additional timing advance value for the IAB node, and setting the second uplink transmission time to the downlink reception time minus an alternative timing advance value, wherein the alternative timing advance value comprises one of the additional timing advance value, the timing advance value plus the additional timing advance value, and half of the timing advance value plus the timing delta value plus the additional timing advance value.

In one embodiment, determining that the timing alignment mode is the timing advance mode comprises at least one of receiving a first indication indicating that the timing alignment mode is the timing advance mode; receiving a second indication associated with the uplink signal, wherein the second indication indicates that the timing alignment mode is the timing advance; receiving a third indication associated with a first plurality of resources, wherein the third indication indicates that the timing alignment mode is the timing advance mode, the uplink signal scheduled on a second plurality of resources, and the second plurality of resources overlaps with the first plurality of resources; determining that a fourth indication indicating a transmission timing alignment mode or reception timing alignment mode is not received; and determining that an additional timing advance value is not received.

In one embodiment, determining that the timing alignment mode is the transmission timing alignment mode comprises at least one of receiving a first indication indicating that the timing alignment mode is the transmission timing alignment mode; receiving a second indication associated with the uplink signal, wherein the second indication indicates that the timing alignment mode is the transmission timing alignment mode; receiving a third indication associated with a first plurality of resources, wherein the third indication indicates that the timing alignment mode is the transmission timing alignment mode, the uplink signal scheduled on a second plurality of resources, and the second plurality of resources overlaps with the first plurality of resources; determining that a fourth indication indicating a timing advance mode or reception timing alignment mode is not received; and determining that an additional timing advance value is not received.

In one embodiment, determining that the timing alignment mode is the reception timing alignment mode comprises at least one of receiving a first indication indicating that the timing alignment mode is the reception timing alignment mode; receiving a second indication associated with the uplink signal, wherein the second indication indicates that the timing alignment mode is the reception timing alignment mode; receiving a third indication associated with a first plurality of resources, wherein the third indication indicates that the timing alignment mode is the reception timing alignment mode, the uplink signal scheduled on a second plurality of resources, and the second plurality of resources overlaps with the first plurality of resources; determining that a fourth indication indicating a timing advance mode or transmission timing alignment mode is not received; receiving an additional timing advance value; receiving an additional timing advance value associated with the uplink signal; and receiving an additional timing advance value associated with a first plurality of resources and determining that the uplink signal is scheduled on a second plurality of resources, the second plurality of resources overlapping with the first plurality of resources.

In one embodiment, the uplink signal is scheduled on a first symbol and the first symbol associated with a symbol number. In one embodiment, in response to determining that a symbol shifting is applicable, the first method includes transmitting the uplink signal on a second symbol associated with the symbol number plus one. In various embodiments, in response to determining that the symbol shifting is not applicable, the first method includes transmitting the uplink signal on the first symbol.

In one embodiment, determining whether the symbol shifting is applicable comprises at least one of determining that the second uplink transmission time is greater than the downlink reception time and receiving an indication indicating that the symbol shifting is applicable. In one embodiment, the IAB node comprises a mobile terminal ("MT") function for determining the timing alignment mode for the IAB node and transmitting the uplink signal from the IAB node.

A second method is disclosed for timing alignment in integrated access and backhaul. In one embodiment, a second method includes obtaining a downlink reception time for an integrated access backhaul ("IAB") node of a wireless communication network. In further embodiments, the second method includes obtaining at least one of a first coefficient, a second coefficient, and a third coefficient for the IAB node. In some embodiments, the second method includes receiving at least one of a timing advance value, a timing delta value, and an additional timing advance value for the IAB node. In one embodiment, the second method includes transmitting an uplink signal while applying an uplink transmission time, wherein the uplink transmission time equals the downlink reception time minus a summation of the first coefficient multiplied by the timing advance value, the second coefficient multiplied by the timing delta value, and the third coefficient multiplied by the additional timing advance value.

A first apparatus is disclosed for timing alignment in integrated access and backhaul. In one embodiment, the first apparatus includes a processor that obtains, for an integrated access backhaul ("IAB") node of a wireless communication network, a first uplink transmission time, a downlink transmission time, and a second uplink transmission time. The processor, in certain embodiments, includes determining a timing alignment mode for the IAB node. The first apparatus, in various embodiments, includes a transceiver that transmits an uplink signal from the IAB node according to one of the first uplink transmission time, the downlink transmission time, and the second uplink transmission time based on the timing alignment mode for the IAB node.

In one embodiment, the transceiver is further configured to, in response to the timing alignment mode for the IAB node comprising a timing advance mode, transmit the uplink signal according to the first uplink transmission time. In some embodiments, the transceiver is further configured to, in response to the timing alignment mode for the IAB node comprising a transmission timing alignment mode, transmit the uplink signal according to the downlink transmission time. In various embodiments, the transceiver is further configured to, in response to the timing alignment mode for the IAB node comprising a reception timing mode, transmit the uplink signal according to the second uplink transmission time.

In one embodiment, the processor is further configured to obtain the first uplink transmission time by obtaining a downlink reception time for the IAB node, receiving a timing advance value and a timing advance offset value for the IAB node, and setting the first uplink transmission time to the downlink reception time minus the timing advance value minus the timing advance offset value.

In one embodiment, the processor is further configured to obtain the first downlink transmission time by obtaining a downlink reception time for the IAB node, receiving a timing advance value and a timing delta value for the IAB node, and setting the first uplink transmission time to the downlink reception time minus half of the timing advance value minus the timing delta value.

In one embodiment, the processor is further configured to obtain the second uplink transmission time by obtaining a downlink reception time for the IAB node, receiving a timing advance value and a timing delta value for the IAB node, receiving an additional timing advance value for the IAB node, and setting the second uplink transmission time to the downlink reception time minus an alternative timing advance value, wherein the alternative timing advance value comprises one of the additional timing advance value, the timing advance value plus the additional timing advance value, and half of the timing advance value plus the timing delta value plus the additional timing advance value.

In one embodiment, the processor is further configured to determine that the timing alignment mode is the timing advance mode by at least one of receiving a first indication indicating that the timing alignment mode is the timing advance mode; receiving a second indication associated with the uplink signal, wherein the second indication indicates that the timing alignment mode is the timing advance; receiving a third indication associated with a first plurality of resources, wherein the third indication indicates that the timing alignment mode is the timing advance mode, the uplink signal scheduled on a second plurality of resources, and the second plurality of resources overlaps with the first plurality of resources; determining that a fourth indication indicating a transmission timing alignment mode or reception timing alignment mode is not received; and determining that an additional timing advance value is not received.

In one embodiment, the processor is further configured to determine that the timing alignment mode is the transmission timing alignment mode by at least one of receiving a first indication indicating that the timing alignment mode is the transmission timing alignment mode; receiving a second indication associated with the uplink signal, wherein the second indication indicates that the timing alignment mode is the transmission timing alignment mode; receiving a third indication associated with a first plurality of resources, wherein the third indication indicates that the timing alignment mode is the transmission timing alignment mode, the uplink signal scheduled on a second plurality of resources, and the second plurality of resources overlaps with the first plurality of resources; determining that a fourth indication indicating a timing advance mode or reception timing alignment mode is not received; and determining that an additional timing advance value is not received.

In one embodiment, the processor is further configured to determine that the timing alignment mode is the reception timing alignment mode by at least one of receiving a first indication indicating that the timing alignment mode is the reception timing alignment mode; receiving a second indication associated with the uplink signal, wherein the second indication indicates that the timing alignment mode is the reception timing alignment mode; receiving a third indication associated with a first plurality of resources, wherein the third indication indicates that the timing alignment mode is the reception timing alignment mode, the uplink signal scheduled on a second plurality of resources, and the second plurality of resources overlaps with the first plurality of resources; determining that a fourth indication indicating a timing advance mode or transmission timing alignment mode is not received; receiving an additional timing advance value; receiving an additional timing advance value associated with the uplink signal; and receiving an additional timing advance value associated with a first plurality of resources and determining that the uplink signal is scheduled on a second plurality of resources, the second plurality of resources overlapping with the first plurality of resources.

In one embodiment, the uplink signal is scheduled on a first symbol and the first symbol associated with a symbol number. In one embodiment, in response to determining that a symbol shifting is applicable, the transceiver is further configured to transmit the uplink signal on a second symbol associated with the symbol number plus one. In various embodiments, in response to determining that the symbol shifting is not applicable, the transceiver is further configured to transmit the uplink signal on the first symbol.

In one embodiment, the processor is further configured to determine whether the symbol shifting is applicable by at least one of determining that the second uplink transmission time is greater than the downlink reception time and receiving an indication indicating that the symbol shifting is applicable. In one embodiment, the IAB node comprises a mobile terminal ("MT") function for determining the timing alignment mode for the IAB node and transmitting the uplink signal from the IAB node.

A second apparatus is disclosed for timing alignment in integrated access and backhaul. In one embodiment, a second apparatus includes a processor that is configured to obtain a downlink reception time for an integrated access backhaul ("IAB") node of a wireless communication network. In further embodiments, the processor is configured to obtain at least one of a first coefficient, a second coefficient, and a third coefficient for the IAB node. In some embodiments, the processor is configured to receive at least one of a timing advance value, a timing delta value, and an additional timing advance value for the IAB node. In one embodiment, the second apparatus includes a transceiver that is configured to transmit an uplink signal while applying an uplink transmission time, wherein the uplink transmission time equals the downlink reception time minus a summation of the first coefficient multiplied by the timing advance value, the second coefficient multiplied by the timing delta value, and the third coefficient multiplied by the additional timing advance value.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An Integrated Access and Backhaul (IAB) node, comprising:
- at least one memory; and
- at least one processor coupled with the at least one memory and configured to cause the IAB node to:
  - determine a timing alignment mode for the IAB node from a plurality of different timing alignment modes comprising a timing advance mode, a transmission timing alignment mode, and a reception timing alignment mode, wherein each timing alignment mode corresponds to a different timing relationship between uplink and downlink transmissions of the IAB node, wherein the timing advance mode corresponds to a first uplink transmission time determined based on a timing advance value, the transmission timing alignment mode corresponds to a downlink transmission time of a distributed unit (DU) of the IAB node, and the reception timing alignment mode corresponds to a second uplink transmission time being determined based on an additional timing advance offset value received by the IAB node; and
  - obtain, based on the timing alignment mode, one of the first uplink transmission time, the downlink transmission time, or the second uplink transmission time for transmitting an uplink signal, wherein the timing alignment mode is associated with a transmission-timing.

2. The IAB node of claim 1, wherein the at least one processor is configured to cause the IAB node to, in response to the timing alignment mode for the IAB node comprising the transmission timing alignment mode, transmit the uplink signal according to the downlink transmission time.

3. The IAB node of claim 1, wherein the at least one processor is configured to cause the IAB node to, in response to the timing alignment mode for the IAB node comprising the reception timing alignment mode, transmit the uplink signal according to the second uplink transmission time.

4. The IAB node of claim 1, wherein obtaining the second uplink transmission time comprises:
- obtaining a downlink reception time for the IAB node;
- receiving the timing advance value and a timing delta value for the IAB node;
- receiving the additional timing advance offset value for the IAB node; and
- setting the second uplink transmission time to the downlink reception time minus an alternative timing advance value, wherein the alternative timing advance value comprises one of:
  - the additional timing advance offset value;
  - the timing advance value plus the additional timing advance offset value; or
  - half of the timing advance value plus the timing delta value plus the additional timing advance offset value.

5. The IAB node of claim 1, wherein determining that the timing alignment mode is the timing advance mode comprises at least one of:
- receiving a first indication indicating that the timing alignment mode is the timing advance mode;
- receiving a second indication associated with the uplink signal, wherein the second indication indicates that the timing alignment mode is the timing advance mode;
- receiving a third indication associated with a first plurality of resources, wherein the third indication indicates that the timing alignment mode is the timing advance mode, the uplink signal is scheduled on a second plurality of resources, and the second plurality of resources overlaps with the first plurality of resources;
- determining that a fourth indication indicating the transmission timing alignment mode or the reception timing alignment mode is not received; or determining that an additional timing advance offset value is not received.

6. The IAB node of claim 1, wherein determining that the timing alignment mode is the transmission timing alignment mode comprises at least one of:
- receiving a first indication indicating that the timing alignment mode is the transmission timing alignment mode;
- receiving a second indication associated with the uplink signal, wherein the second indication indicates that the timing alignment mode is the transmission timing alignment mode;
- receiving a third indication associated with a first plurality of resources, wherein the third indication indicates that the timing alignment mode is the transmission timing alignment mode, the uplink signal is scheduled on a second plurality of resources, and the second plurality of resources overlaps with the first plurality of resources;
- determining that a fourth indication indicating the timing advance mode or the reception timing alignment mode is not received; or determining that an additional timing advance offset value is not received.

7. The IAB node of claim 1, wherein determining that the timing alignment mode is the reception timing alignment mode comprises at least one of:
- receiving a first indication indicating that the timing alignment mode is the reception timing alignment mode;
- receiving a second indication associated with the uplink signal, wherein the second indication indicates that the timing alignment mode is the reception timing alignment mode;
- receiving a third indication associated with a first plurality of resources, wherein the third indication indicates that the timing alignment mode is the reception timing alignment mode, the uplink signal is scheduled on a second plurality of resources, and the second plurality of resources overlaps with the first plurality of resources;
- determining that a fourth indication indicating the timing advance mode or the transmission timing alignment mode is not received;
- receiving the additional timing advance offset value;
- receiving the additional timing advance offset value associated with the uplink signal; or receiving the additional timing advance offset value associated with a first plurality of resources and determining that the uplink signal is scheduled on a second plurality of resources, the second plurality of resources overlapping with the first plurality of resources.

8. The IAB node of claim 1, wherein the uplink signal is scheduled on a first symbol, the first symbol associated with a symbol number, and wherein the at least one processor is configured to cause the IAB node to:

in response to determining that a symbol shifting is applicable, transmit the uplink signal on a second symbol associated with the symbol number plus one; and in response to determining that the symbol shifting is not applicable, transmit the uplink signal on the first symbol.

9. The IAB node of claim 8, wherein determining whether the symbol shifting is applicable comprises at least one of:

determining that the second uplink transmission time is greater than a downlink reception time; or receiving an indication indicating that the symbol shifting is applicable.

10. An Integrated Access and Backhaul (IAB) node, comprising:

at least one memory; and at least one processor coupled with the at least one memory and configured to cause the IAB node to:

obtain a downlink reception time;

obtain a first coefficient, a second coefficient, and a third coefficient;

receive a timing advance value, a timing delta value, and an additional timing advance value for the IAB node;

determine a timing alignment mode for the IAB node from a plurality of different timing alignment modes comprising a timing advance mode, a transmission timing alignment mode, and a reception timing alignment mode, wherein each timing alignment mode corresponds to a different timing relationship between uplink and downlink transmissions of the IAB node, wherein the transmission timing alignment mode corresponds to the third coefficient being zero, and wherein the reception timing alignment mode corresponds to the third coefficient being non-zero; and transmit an uplink signal using an uplink transmission time that is determined based on the timing alignment mode, wherein the uplink transmission time equals the downlink reception time minus a summation of the first coefficient multiplied by the timing advance value, the second coefficient multiplied by the timing delta value, and the third coefficient multiplied by the additional timing advance value, and wherein the timing alignment mode is associated with a transmission-timing.

11. A method performed by an Integrated Access and Backhaul (IAB) node, comprising:

determining a timing alignment mode for the IAB node from a plurality of different timing alignment modes comprising a timing advance mode, a transmission timing alignment mode, er and a reception timing alignment mode, wherein each timing alignment mode corresponds to a different timing relationship between uplink and downlink transmissions of the IAB node, wherein the timing advance mode corresponds to a first uplink transmission time determined based on a timing advance value, the transmission timing alignment mode corresponds to a downlink transmission time of a distributed unit (DU) of the IAB node, and the reception timing alignment mode corresponds to a second uplink transmission time being determined based on an additional timing advance offset value received by the IAB node; and obtaining, based on the timing alignment mode, one of the first uplink transmission time, the downlink transmission time, or the second uplink transmission time for transmitting an uplink signal, wherein the timing alignment mode is associated with a transmission-timing.

12. The method of claim 11, further comprising, in response to the timing alignment mode for the IAB node comprising the transmission timing alignment mode, transmitting the uplink signal according to the downlink transmission time.

13. The method of claim 11, further comprising, in response to the timing alignment mode for the IAB node comprising the reception timing alignment mode, transmitting the uplink signal according to the second uplink transmission time.

14. The method of claim 11, further comprising obtaining the second uplink transmission time by:

obtaining a downlink reception time for the IAB node;

receiving the timing advance value and a timing delta value for the IAB node;

receiving the additional timing advance offset value for the IAB node; and setting the second uplink transmission time to the downlink reception time minus an alternative timing advance value, wherein the alternative timing advance value comprises one of:

the additional timing advance offset value;

the timing advance value plus the additional timing advance offset value; or half of the timing advance value plus the timing delta value plus the additional timing advance offset value.

15. The method of claim 11, further comprising determining that the timing alignment mode is the timing advance mode by at least one of:

receiving a first indication indicating that the timing alignment mode is the timing advance mode;

receiving a second indication associated with the uplink signal, wherein the second indication indicates that the timing alignment mode is the timing advance mode;

receiving a third indication associated with a first plurality of resources, wherein the third indication indicates that the timing alignment mode is the timing advance mode, the uplink signal is scheduled on a second plurality of resources, and the second plurality of resources overlaps with the first plurality of resources;

determining that a fourth indication indicating the transmission timing alignment mode or the reception timing alignment mode is not received; or determining that an additional timing advance offset value is not received.

16. The method of claim 11, further comprising determining that the timing alignment mode is the transmission timing alignment mode by at least one of:

receiving a first indication indicating that the timing alignment mode is the transmission timing alignment mode;

receiving a second indication associated with the uplink signal, wherein the second indication indicates that the timing alignment mode is the transmission timing alignment mode;

receiving a third indication associated with a first plurality of resources, wherein the third indication indicates that the timing alignment mode is the transmission timing alignment mode, the uplink signal is scheduled on a second plurality of resources, and the second plurality of resources overlaps with the first plurality of resources;

determining that a fourth indication indicating the timing advance mode or the reception timing alignment mode is not received; or determining that an additional timing advance offset value is not received.

17. The method of claim 11, further comprising determining that the timing alignment mode is the reception timing alignment mode by at least one of:

receiving a first indication indicating that the timing alignment mode is the reception timing alignment mode;

receiving a second indication associated with the uplink signal, wherein the second indication indicates that the timing alignment mode is the reception timing alignment mode;

receiving a third indication associated with a first plurality of resources, wherein the third indication indicates that the timing alignment mode is the reception timing alignment mode, the uplink signal is scheduled on a second plurality of resources, and the second plurality of resources overlaps with the first plurality of resources;

determining that a fourth indication indicating the timing advance mode or the transmission timing alignment mode is not received;

receiving the additional timing advance offset value;

receiving the additional timing advance offset value associated with the uplink signal; or receiving the additional timing advance offset value associated with the first plurality of resources and determining that the uplink signal is scheduled on a second plurality of resources, the second plurality of resources overlapping with the first plurality of resources.

18. The method of claim 11, wherein the uplink signal is scheduled on a first symbol, the first symbol associated with a symbol number, and the method further comprises:

in response to determining that a symbol shifting is applicable, transmitting the uplink signal on a second symbol associated with the symbol number plus one; and in response to determining that the symbol shifting is not applicable, transmitting the uplink signal on the first symbol.

19. The method of claim 18, further comprising determining whether the symbol shifting is applicable by at least one of:

determining that the second uplink transmission time is greater than a downlink reception time; or receiving an indication indicating that the symbol shifting is applicable.

20. A method performed by an Integrated Access and Backhaul (IAB) node, the method comprising:

obtaining a downlink reception time;

obtaining a first coefficient, a second coefficient, and a third coefficient;

receiving a timing advance value, a timing delta value, and an additional timing advance value for the IAB node;

determining a timing alignment mode for the IAB node from a plurality of different timing alignment modes comprising a timing advance mode, a transmission timing alignment mode, and a reception timing alignment mode, wherein each timing alignment mode corresponds to a different timing relationship between uplink and downlink transmissions of the IAB node, wherein the transmission timing alignment mode corresponds to the third coefficient being zero, and wherein the reception timing alignment mode corresponds to the third coefficient being non-zero; and transmitting an uplink signal using an uplink transmission time that is determined based on the timing alignment mode, wherein the uplink transmission time equals the downlink reception time minus a summation of the first coefficient multiplied by the timing advance value, the second coefficient multiplied by the timing delta value, and the third coefficient multiplied by the additional timing advance value, and wherein the timing alignment mode is associated with a transmission-timing.

* * * * *